United States Patent
Ohyama

(10) Patent No.: US 11,402,657 B2
(45) Date of Patent: Aug. 2, 2022

(54) INFORMATION PROCESSING DEVICE FOR DISPLAY DEVICE, INFORMATION PROCESSING METHOD FOR DISPLAY DEVICE, AND PROGRAM FOR DISPLAY DEVICE

(71) Applicant: NATIONAL INSTITUTE OF ADVANCED INDUSTRIAL SCIENCE AND TECHNOLOGY, Tokyo (JP)

(72) Inventor: Junji Ohyama, Tsukuba (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 155 days.

(21) Appl. No.: 16/330,615

(22) PCT Filed: Aug. 22, 2017

(86) PCT No.: PCT/JP2017/029918
§ 371 (c)(1),
(2) Date: Aug. 31, 2021

(87) PCT Pub. No.: WO2018/051743
PCT Pub. Date: Mar. 22, 2018

(65) Prior Publication Data
US 2021/0385431 A1     Dec. 9, 2021

(30) Foreign Application Priority Data
Sep. 16, 2016   (JP) .............................. JP2016-181835

(51) Int. Cl.
*H04N 13/32*     (2018.01)
*H04N 13/194*    (2018.01)
(Continued)

(52) U.S. Cl.
CPC .......... *G02B 30/29* (2020.01); *H04N 13/122* (2018.05); *H04N 13/194* (2018.05); *H04N 13/32* (2018.05);
(Continued)

(58) Field of Classification Search
CPC .... G02B 30/29; H04N 13/122; H04N 13/194; H04N 13/32; H04N 13/388; H04N 13/398; G09G 3/20; G09F 19/12; G09F 9/30
(Continued)

(56) References Cited

U.S. PATENT DOCUMENTS

2005/0248972 A1* 11/2005 Kondo ................. H04N 13/363
                                                  348/E13.058
2007/0009222 A1* 1/2007 Koo ..................... H04N 13/395
                                                  348/E13.057
(Continued)

FOREIGN PATENT DOCUMENTS

JP    H11-109287 A    4/1999
JP    2000-131783 A   5/2000
(Continued)

OTHER PUBLICATIONS

International Search Report dated Nov. 14, 2017 from the corresponding International Application No. PCT/JP2017/029918 and English translation.

*Primary Examiner* — Tung T Vo
(74) *Attorney, Agent, or Firm* — Lucas & Mercanti, LLP

(57) ABSTRACT

The present invention provides an information processing device and the like for a display device to represent, on the display device, a three-dimensional spatial representation that can be seen from a wide viewpoint direction. The display device includes a refraction means for refracting light and having a circle-shaped cross section; an arrange-
(Continued)

ment support means for arranging and supporting a plurality of the refraction means in a convex shape with respect to a viewpoint side, and an image forming means for forming a formed-image on an opposite side surface to the viewpoint side with respect to the refraction means. The information processing device extracts an image data of a display element image displayed on each of the refraction means so as to look like three-dimensional spatial representation, from a three-dimensional spatial representation data for three-dimensional-spatially representing a display target, and generates a formed-image data for forming the formed-image in the opposite side to the viewpoint side of the predetermined refraction means so that the display element image can be displayed by a light having passed through the predetermined refraction means.

10 Claims, 48 Drawing Sheets

(51) Int. Cl.
*G02B 30/29* (2020.01)
*H04N 13/122* (2018.01)
*H04N 13/388* (2018.01)
*H04N 13/398* (2018.01)

(52) U.S. Cl.
CPC ......... *H04N 13/388* (2018.05); *H04N 13/398* (2018.05)

(58) Field of Classification Search
USPC .......................................................... 348/51
See application file for complete search history.

(56) References Cited

U.S. PATENT DOCUMENTS

| | | | |
|---|---|---|---|
| 2011/0069157 A1* | 3/2011 | Ito | H04N 13/32 348/51 |
| 2012/0200681 A1* | 8/2012 | Yoshida | G02B 30/30 348/55 |
| 2020/0137378 A1* | 4/2020 | Mall | H04N 13/327 |
| 2021/0218951 A1* | 7/2021 | Yano | G03B 35/22 |
| 2022/0050371 A1* | 2/2022 | Nakamura | G09F 19/18 |

FOREIGN PATENT DOCUMENTS

| | | |
|---|---|---|
| JP | 2000-305041 A | 11/2000 |
| JP | 2001-272934 A | 10/2001 |
| JP | 2004-177709 A | 6/2004 |
| JP | 2010-072477 A | 4/2010 |

* cited by examiner

INFORMATION PROCESSING DEVICE FOR DISPLAY DEVICE, INFORMATION PROCESSING METHOD FOR DISPLAY DEVICE, AND PROGRAM FOR DISPLAY DEVICE

CROSS REFERENCE TO RELATED APPLICATION

This Application is a 371 of PCT/JP2017/029918 filed on Aug. 22, 2017 which, in turn, claimed the priority of Japanese Patent Application No. 2016-181835 filed on Sep. 16, 2016, both applications are incorporated herein by reference.

TECHNICAL FIELD

The present invention relates to techniques for an information processing device for a display device, an information processing method for the display device, and a program for the display device.

BACKGROUND ART

In public spaces such as roads and plazas, public facilities such as station premises, event venues, stadiums, and commercial facilities such as supermarkets and malls, it is preferable that many people who are at various positions with respect to a display device can see the display image for easy viewing. For example, Patent Literature 1 discloses a display including a cylindrical lenticular lens centering on a light source and transparent light control mean, which forms a transparent image contracted in the horizontal direction for each lens constituting the lenticular lens in this transparent light control means.

CITATION LIST

Patent Literature
Patent Literature 1: JP2001-272934A

SUMMARY OF INVENTION

Problem to be Solved by the Invention

However, in the prior art like Patent Literature 1, since each lens of the lenticular lens is a single convex structure having a flat surface, when the viewing angle exceeds a predetermined value, reflection of light from the inside of the lens occurs (internal reflection) on the flat surface of the lens, so there was a problem that a sufficient viewing angle could not be secured. For this reason, since only the image in the center portion of the display can be displayed sufficiently, it was difficult to make it possible to confirm the visual representation in which the three dimensional space actually seems to exist by representing with a wide space visible from the range of change of the wide viewpoint direction.

Hence, it is an object of the present invention to provide, for example, an information processing device and the like for a display device to represent, on the display device, a three-dimensional spatial representation that can be seen from a wide viewpoint direction.

Means for Solving the Problem

To solve the above problem, the invention according to claim 1 is characterized in that an information processing device for a display device, in which the display device includes a refraction means for refracting light and having a circle-shaped cross section; an arrangement support means for arranging and supporting a plurality of the refraction means in a convex shape with respect to a viewpoint side; and an image forming means for forming a formed-image on an opposite side surface to the viewpoint side with respect to the refraction means, the information processing device for the display device including: an extracting means for extracting an image data of a display element image displayed on each of the refraction means so as to look like three-dimensional spatial representation, from a three-dimensional spatial representation data for three-dimensional-spatially representing a display target in the display device; and an image generating means for generating a formed-image data for forming the formed-image in the opposite side to the viewpoint side of the predetermined refraction means so that the display element image can be displayed by a light having passed through the predetermined refraction means; in which the three-dimensional spatial representation data includes an angle data of an angle defined by a normal direction of the convex shape in the predetermined refraction means and a predetermined viewpoint direction of the viewpoint side, and a plane image data in which the display target can be seen from the predetermined viewpoint direction depending on the angle.

The invention according to claim 2 is the information processing device for the display device according to claim 1, in which the extracting means extracts, as a region image data, each region image corresponding to each of the predetermined refraction means from the plane image data among the three-dimensional spatial representation data, the image generating means transforms each of the region image so as to conform to the shape of the opposite side surface of the predetermined refraction means, arranges each of the transformed region image at a position depending on the angle corresponding to each of the region image, and generates the formed-image data for forming the formed-image of the predetermined refraction means.

The invention according to claim 3 is the information processing device for the display device according to claim 1 or 2, in which the extracting means extracts the image data of the display element image depending on the size of the refraction means.

The invention according to claim 4 is the information processing device for the display device according to any one of claims 1 to 3, further including an original data generating means for generating the three-dimensional spatial representation data for representing a three-dimensional space in the display device from a solid object in real space or a 3DCG data.

The invention according to claim 5 is the information processing device for the display device according to any one of claims 1 to 4, further including an image acquiring means for acquiring an image data of a photographed image obtained by photographing the three-dimensional spatial representation displayed by the generated formed-image data from a predetermined photographing direction; and an image adjusting means for adjusting the formed-image data in accordance with difference between data of the photographed image and the photographing direction, and the angle data and the plane image data of the three-dimensional spatial representation.

The invention according to claim 6 is the information processing device for the display device according to claim 5, in which the image adjusting means adjusts the formed-image data by adjusting the image data of the display element image extracted by the extracting means.

The invention according to claim 7 is the information processing device for the display device according to claim 5 or 6, in which the image adjusting means adjusts the formed-image data by adjusting a forming manner in the formed-image.

The invention according to claim 8 is the information processing device for the display device according to any one of claims 1 to 7, in which the image forming means forms the formed-image from an image printed based on the formed-image data.

The invention according to claim 9 is characterized in that an information processing method for a display device, in which the display device includes a refraction means for refracting light and having a circle-shaped cross section; an arrangement support means for arranging and supporting a plurality of the refraction means in a convex shape with respect to a viewpoint side; and an image forming means for forming a formed-image on an opposite side surface to the viewpoint side with respect to the refraction means, the information processing method including: an extracting step of extracting an image data of a display element image displayed on each of the refraction means so as to look like three-dimensional spatial representation, from a three-dimensional spatial representation data for three-dimensional-spatially representing a display target in the display device; and an image generating step of generating a formed-image data for forming the formed-image in the opposite side to the viewpoint side of the predetermined refraction means so that the display element image can be displayed by a light having passed through the predetermined refraction means; in which the three-dimensional spatial representation data includes an angle data of an angle defined by a normal direction of the convex shape in the predetermined refraction means and a predetermined viewpoint direction of the viewpoint side, and a plane image data in which the display target can be seen from the predetermined viewpoint direction depending on the angle.

The invention according to claim 10 is characterized in that program for a display device, in which the display device includes a refraction means for refracting light and having a circle-shaped cross section; an arrangement support means for arranging and supporting a plurality of the refraction means in a convex shape with respect to a viewpoint side; and an image forming means for forming a formed-image on an opposite side surface to the viewpoint side with respect to the refraction means, the program causing a computer to function as: an extracting means for extracting an image data of a display element image displayed on each of the refraction means so as to look like three-dimensional spatial representation, from a three-dimensional spatial representation data for three-dimensional-spatially representing a display target in the display device; and an image generating means for generating a formed-image data for forming the formed-image in the opposite side to the viewpoint side of the predetermined refraction means so that the display element image can be displayed by a light having passed through the predetermined refraction means; in which the three-dimensional spatial representation data includes an angle data of an angle defined by a normal direction of the convex shape in the predetermined refraction means and a predetermined viewpoint direction of the viewpoint side, and a plane image data in which the display target can be seen from the predetermined viewpoint direction depending on the angle.

Effect of the Invention

According to the present invention, in the display device capable of confirming the visual representation in which the three dimensional space seems to exist by representing with a wide space visible from the range of change of the wide viewpoint direction, by providing the information processing device that generates formed-image data to be input to the display device from three-dimensional spatial representation data desired to be represented by the display device, it is possible to easily realize the visual representation in which the three dimensional space actually seems to exist in the display device.

DESCRIPTION OF EMBODIMENTS

An embodiment of the present invention will be described using FIG. 1. Incidentally, FIG. 1 is a schematic diagram schematically showing an example configuration of a display system S according to an embodiment.

Figure 1:
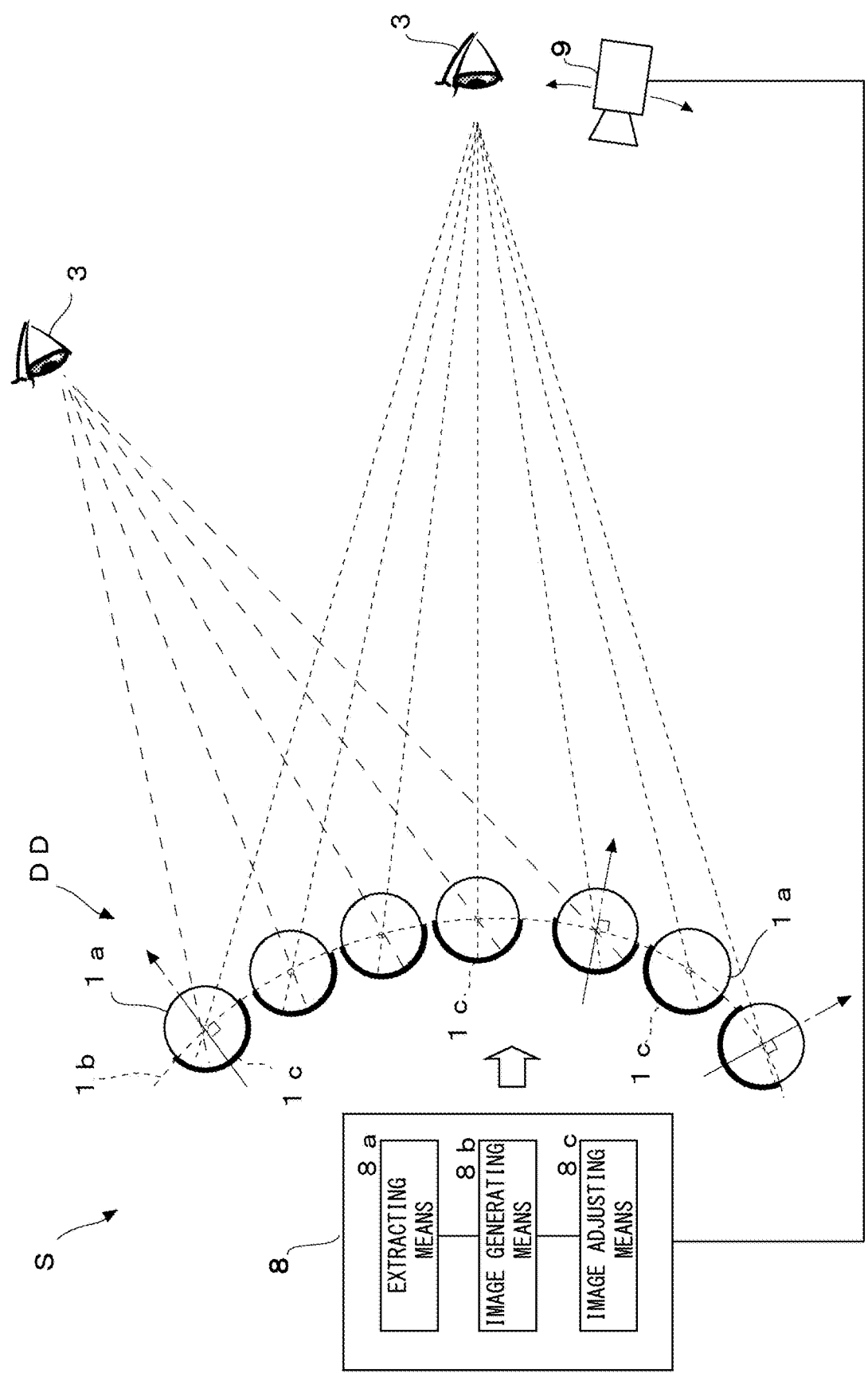
FIG. 1 is a schematic diagram schematically showing an example configuration of a display system according to an embodiment.

As shown in FIG. 1, the display system S includes a display device DD, an information processing device 8 for the display device, and a photographing device 9 (an example of photographing means).

The display device DD has a plurality of refraction means 1a, an arrangement support means 1b, and an image forming means 1c. The refraction means 1a refracts light and magnifies an image. The arrangement support means 1b arranges and supports each refraction means 1a. The image forming means 1c forms an image on the refraction means 1a.

The refraction means 1a has, for example, a circular-shaped cross section. An example of the refraction means 1a includes, for example, a spherical ball, lenses of round column shape, ellipsoid, cone, etc. with a circular-shaped cross section. The circular shape is a circle-shape having a substantially constant curvature.

Figure 3A:
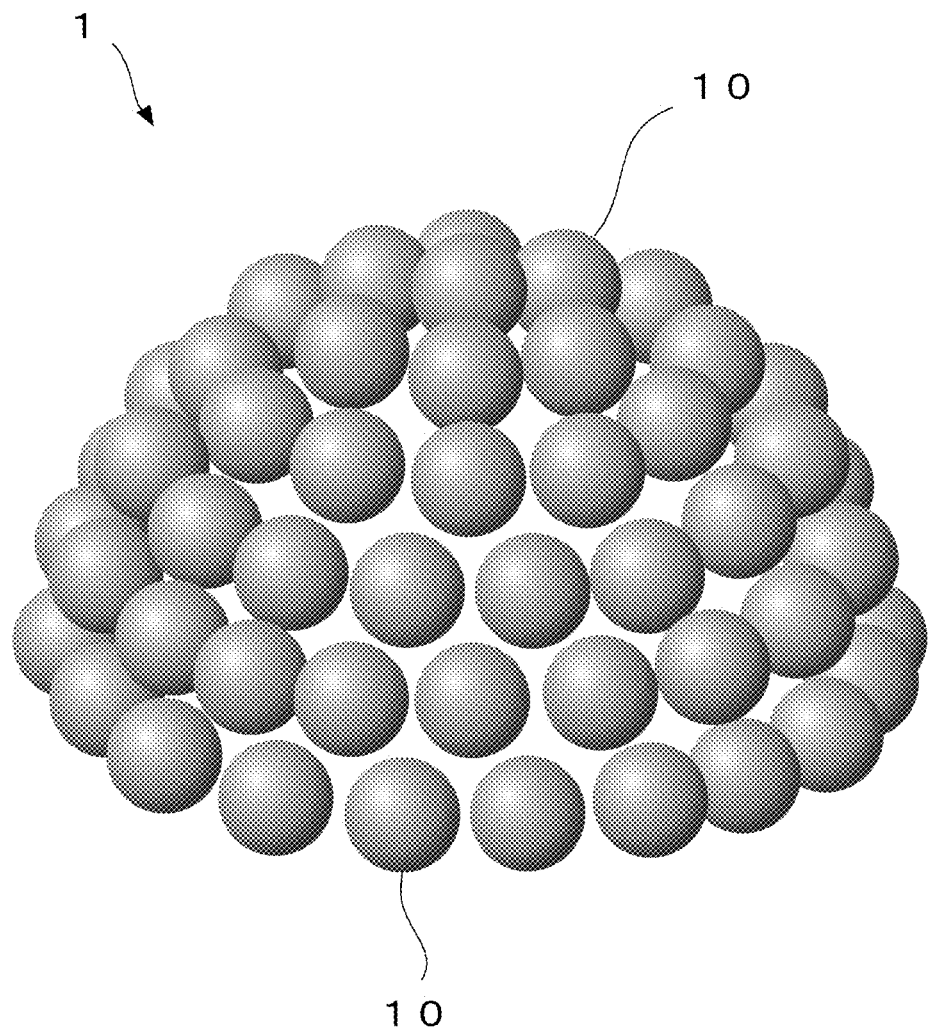
FIG. 3A is a schematic diagram showing an example in which the refraction means in FIG. 2A is stereoscopically arranged.

The arrangement support means 1b arranges each refraction means 1a in a convex shape with respect to a viewpoint 3 side. Stereoscopically, for example, as shown in FIG. 3A, each ball lens is arranged on a curved surface having a spherical surface shape. In the case that the refraction means 1a is a round column lens, each round column lens in the same direction is arranged on a curved surface of a cylindrical surface-form. Incidentally, in case of lenses having a conical shape or a truncated conical shape, lenses are arranged on a curved surface of a truncated conical side face. Incidentally, the viewpoint 3 is outside the display device DD.

Herein, an example of the convex shape of the arrangement support means 1b includes a spherical surface shape having a substantially constant curvature and a cylindrical surface shape having a circular-shaped cross section in a plane perpendicular to the axis of the cylinder. Moreover, the spherical surface shape is a curved surface forming a part of a spherical surface such as a whole spherical surface, a semispherical surface, etc., and is a curved surface having a substantially constant curvature. The cylindrical surface shape is a curved surface forming a part of a cylindrical surface such as a full cylinder, a half cylinder, a ¼ cylinder, etc., and the cross-sectional shape by a plane perpendicular to the axial direction of the cylinder is a circle whose curvature is substantially constant. Incidentally, it may be a curved surface shape etc. whose curvature is not necessarily constant.

An example of viewpoint 3 includes human eyes, cameras, eyes of robots, etc. In addition, the distance between the display device DD and the viewpoint 3 is also various, and may be seen approaching or leaving the display device DD. The viewpoint direction of the viewpoint 3 is also various, and the refraction means 1a may be seen.

The image forming means 1c forms a formed-image on the opposite side surface to the viewpoint 3 with respect to the refraction means 1a. An example of the image forming means 1c includes a display means for displaying an image, an image display means such as a screen or the like for displaying out an image by projection light projected from an image projection means such as a projector, etc.

The display means is preferably a liquid crystal display or an organic EL (Electro Luminescence) display, etc. having a shape along the shape of the surface of the refraction means 1a. For example, it includes a display having a hemispherical surface, a display having a half cylindrical-shape, etc.

The image display means is, for example, a transmission type screen, formed on the hemispherical surface of a ball lens, or formed on the half cylindrical surface of a round column lens. Incidentally, image display means and display means will be described later.

Moreover, in the case that an image is directly drawn on the refraction means 1a, the image formation unit 1c may form an image with ink, etc. In case of attaching to the refraction means 1a, the image forming means 1c forms an image with a film made of resin, paper, metal, etc. The image forming means 1c may be composed of a transmissive film printed with image and a backlight.

The information processing device 8 has an extracting means 8a, an image generating means 8b, and an image adjusting means 8c.

The extracting means 8a extracts an image data of a display element image displayed on each of the refraction means 1a so as to look like three-dimensional spatial representation, from a three-dimensional spatial representation data for three-dimensional-spatially representing a display target in the display device DD.

The three-dimensional spatial representation shows a representation in which each point of the display content and lines, surfaces or solids as a set of the points appear to be arranged at a desired position in a desired angle in the three-dimensional space expressed by the display device.

Three-dimensional spatial representation that makes it appear that there is a real three-dimensional space becomes possible by allowing the wide area of the space that is the representation target to be able to confirm the representation target from the range of change in the wide viewpoint direction.

By realizing representation like a three dimensional space viewed from different viewpoint directions in a narrow angular range, it is possible to express the perception of depth due to parallax when viewed with both eyes; it is sometimes generally called three-dimensional sense, three-dimensional representation or stereo image. The three-dimensional spatial representation is a spatial representation that can grasp the whole image of the layout and the object shape in the space three-dimensionally by changing the wide viewpoint direction that allows the same part to be confirmed from a considerably different angle such as a side face or an upper part, by wrapping around a certain space from a state viewing a certain space from the front direction; it refers to the effect different from the three-dimensional representation by the general perception of depth.

The three-dimensional spatial representation is also referred to as representation of three-dimensional spatial design.

An example of display targets includes a solid object in real space, for example, human body, person's face, objects, landscape, buildings, products such as accessories and clothes and cars, natural objects such as flora and fauna and stones, processed objects thereof, characters, etc. Moreover, an example of display targets may include an imaginary solid object created in CG (Computer Graphics), etc.

An example of three-dimensional spatial representation includes a three-dimensional representation in which the plane appears to rotate in the space, a three-dimensional representation that appears to have a different plane standing in the viewing direction, a representation that solid object are placed, etc.

The three-dimensional spatial representation may be any representation that can confirm a wide range of space in response to a wide viewpoint change; it can represent spaces in which the space represented by the viewpoint direction is different, which does not exist in the real world. An example of it includes a representation in which planes of different arrangements appears to exist in space according to changes in viewpoint direction, a representation in which a plane perpendicular to the viewpoint direction in space appears to disposes always in the front direction with respect to any viewpoint direction, a representation in which the solid, the face, the arrangement of points, the shape, color, etc. in the space being represented changes little by little in accordance with the viewpoint direction, etc. Moreover, the three-dimensional spatial representation may change with time. An example of it includes a representation that a solid object and a display surface appear to be rotating or deforming with time in space, a representation in which an image drawn on the surface or plane of a solid object changes like a movie, etc.

The three-dimensional spatial representation may be described in, for example, an orthogonal coordinate system or may be described in a polar coordinate system.

The three-dimensional spatial representation data is, when describing the information of the three-dimensional spatial representation described in some form on a display device, angle data of the viewpoint direction with respect to the display device and data described by image data when seeing the three-dimensional spatial representation from the angle.

As an example of the three-dimensional spatial representation, in the case where in a cylindrical shape display device the three-dimensional spatial representation can be confirmed by viewing the side surface of the cylinder from the viewpoint direction of 360 degrees left and right, the three-dimensional spatial representation data may be image data described by two-dimensional parameters when viewing the space represented by the display device from a certain viewpoint direction and angle data in which the viewpoint direction is described by one parameter.

As an example of the three-dimensional spatial representation, in the case where in a sphere shape display device the three-dimensional spatial representation can be confirmed by looking around the sphere from the viewpoint direction of 360 degrees left and right or up and down, the three-dimensional spatial representation data may be image data described by two-dimensional parameters when viewing the space represented by the display device from a certain viewpoint direction and angle data in which the viewpoint direction is described by two parameters.

An example of the three-dimensional spatial representation includes data having an angle data of an angle defined by a normal direction of a convex shape of a predetermined refraction means 1a and a predetermined viewpoint direction on the viewpoint 3 side, and an image data of a plane image whose display target can be seen from a predetermined viewpoint direction depending on the angle. The angle data and the image data of the plane image correspond to each other. In addition, the three-dimensional spatial representation data may be generated from three-dimensional CG data (3DCG data).

The three-dimensional spatial representation data may be a representation in which solid objects appear to be in space, a representation in which different images appear to be on plane of different arrangements in space according to the viewpoint direction, or a representation in which a plane perpendicular to the viewpoint direction in space appears to disposes always in the front direction with respect to any viewpoint direction. Moreover, the three-dimensional spatial representation data may change with time. For example, it may cause the solid object and the display surface to appear to be rotating or deforming by changing the space arrangement with time, or the solid surface or image to be view as a moving image by changing the color or brightness with time.

Specifically, the extracting means 8a extracts each region image corresponding to predetermined refraction means as region image data from the angle data and plane image data corresponding to the angle among the plane image data.

The image generating unit 8b generates a formed-image data for forming the formed-image in the opposite side to the viewpoint 3 side of the predetermined refraction means 1a so that the display element image can be displayed by a light having passed through the predetermined refraction means 1a.

The display element image is an image seen by the refraction means 1a from the viewpoint 3 side. For example, the display element image is a circle-shape image seen by each ball lens from the viewpoint 3 side or a rectangular image seen by each round column lens from the viewpoint 3 side. These display element images are synthesized, and the three-dimensional spatial representation such as a solid object appears in the display device DD. Incidentally, the region image appears as a display element image at the viewpoint through the refraction means 1a. The image data for the display element image is image data (region image data) of the region image.

Specifically, the image generating means 8b deforms each region image so as to match the shape of the surface opposite side to the predetermined refraction means, arranges the deformed region images at positions depending on the angles corresponding to each of the region images, and generates a formed-image data for forming the formed-image of the predetermined refraction means.

The image adjusting means 8c adjusts the formed-image data in accordance with difference between the data of the photographed image photographed by the photographing device 9 and the photographed angle and the three-dimensional spatial representation data composed of the plane image data and the angle data. For example, the image adjusting means 8c adjusts the formed-image data so that the difference between the data of the photographed image and the photographed angle, and the three-dimensional spatial representation data composed of the plane image data and the angle data is reduced, by adjusting the region image data of the display element image extracted by the extracting means. More specifically, the image adjusting means 8c may adjust the formed-image data so that the difference between the data of the photographed image and the photographed angle, and the three-dimensional spatial representation data composed of the plane image data and the angle data is reduced, by adjusting the region image extracted by the extracting means 8a.

The image adjusting means 8c may adjust the formed-image data so that the difference between the data of the photographed image and the photographed angle, and the three-dimensional spatial representation data composed of the plane image data and the angle data decreases, by adjusting the manner of formation for forming in the formed-image. More specifically, the image adjusting means 8c may adjust the formed-image data so that the difference between the data of the photographed image and the photographed angle, and the three-dimensional spatial representation data composed of the plane image data and the angle data decreases, by adjusting the manner of deformation by the image generating means 8b or adjusting the manner of arrangement.

The photographing device 9 photographs the display device DD in which the three-dimensional spatial representation is displayed by the generated formed-image data. An example of the photographing device 9 includes a digital camera having a photographing element such as a CCD (Charge Coupled Device) image sensor or a CMOS (Complementary Metal Oxide Semiconductor) image sensor, etc. The photographing device 9 photographs a still image or a moving image. The photographing device 9 is movable, and photographs the display device DD in which images are displayed from various viewpoint directions. Incidentally, the distance between the display device DD and the photographing device 9 may also be movable. There may be a plurality of photographing devices 9.

As described above, according to the display system S of the present embodiment, the region image data of the display element image displayed on each refraction means 1a is extracted so as to look like a three-dimensional representation from three-dimensional spatial representation data composed of plane image data and angle data in which display target can be seen from a predetermined viewpoint direction, and the formed-image data formed on the basis of it is generated. Since the generated formed-image data is sent from the information processing device 8 to the display device DD having a refraction means 1a for refracting light and having a circle-shaped cross section, a formed-image for displaying a desired display element image is formed on the image forming means 1c of the display device DD, and a desired display element image is displayed on the viewpoint side of each refraction means 1a of the display device DD, it is possible to represent a three-dimensional spatial representation that can be seen from a wide viewpoint direction in the display device DD.

The visual representation in which the three-dimensional space seems to exist can be confirmed from the three-dimensional spatial representation to be display target by the display device DD and the information processing device 8. The information processing device 8 extracts region image data of a display element image displayed on each refraction means 1*a* when viewing each refraction means 1*a* from a predetermined viewpoint direction. From the extracted region image data, formed-image data to be formed on the opposite side to the viewpoint side is generated so as to obtain a desired display element image (when each refraction means is viewed from a predetermined viewpoint direction). The display device DD displays a display element image from the viewpoint 3 side through refraction means 1*a* for refracting light and having a circle-shaped cross section based on the input formed-image. It is possible to represent a three-dimensional space composed of display element images displayed on the respective refraction means 1*a* by the arrangement support means 1*b* for arranging and supporting a plurality of the refraction means 1*a* in a convex shape with respect to a viewpoint 3 side. By the information processing device 8, it is stably represented in the display device DD using a wide space visible from a wide viewpoint direction, and it is possible to easily realize a visual representation in which a three-dimensional space actually seems to exist.

Example 1

Next, a specific example corresponding to the above-described embodiment will be described using the drawings. The example described below is an example in which the present application is applied to the display system S in the case of having the image forming means 1*c* set in the opposite side to the viewpoint side with respect to the refraction means, and having the image display means for displaying out an image seen from the viewpoint side, on the back surface of a projection surface onto which projection light from an image projection means is projected.

[1. Configuration and Functions of Display Device]

(1.1 Outline of Configuration and Functions of Display Device)

First, an outline of a configuration and functions of a display device will be described using FIG. 2A to FIG. 3B.

Figure 2A:
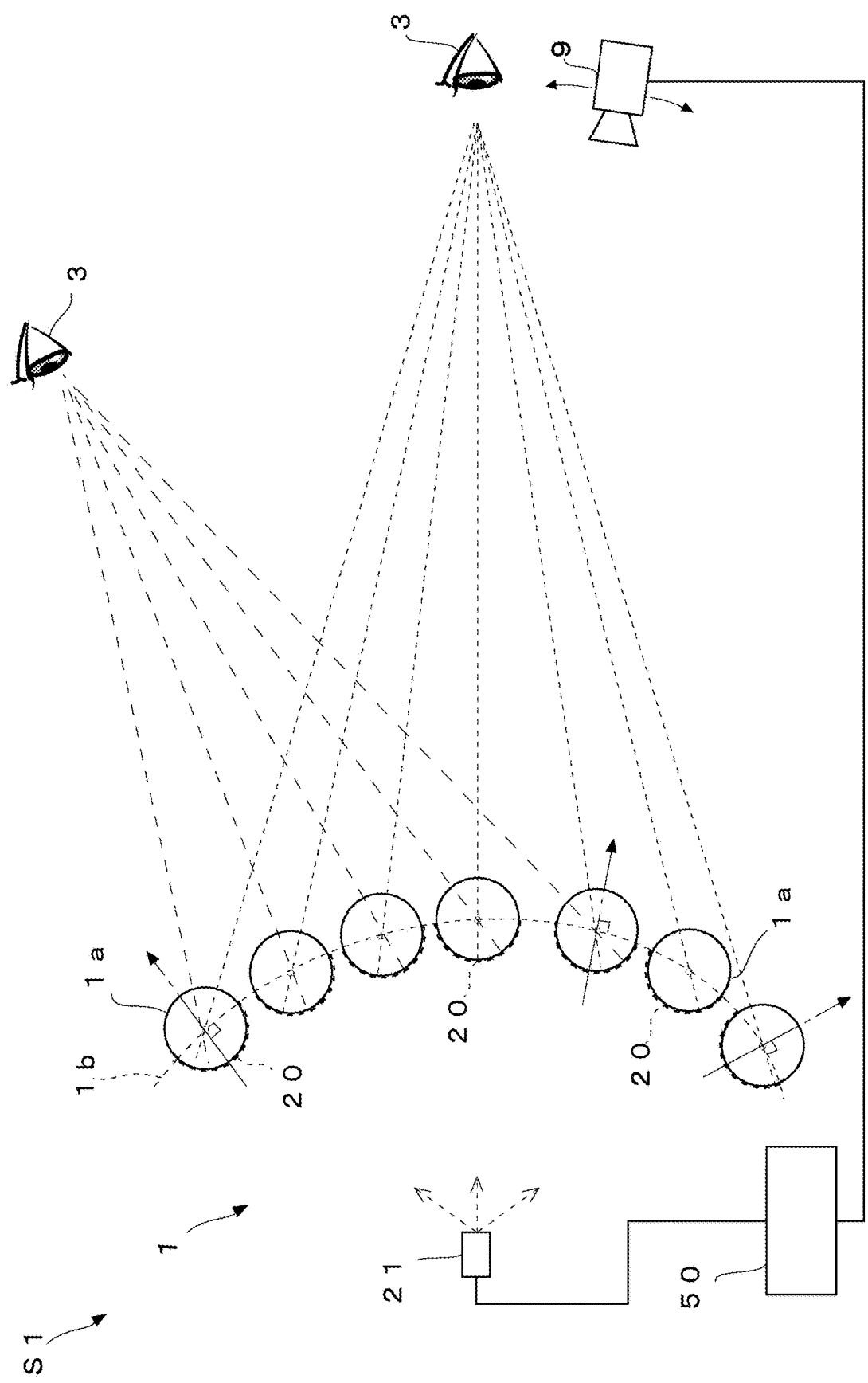
FIG. 2A is a schematic diagram schematically showing an example configuration of a display system of the first example.
Figure 2B:
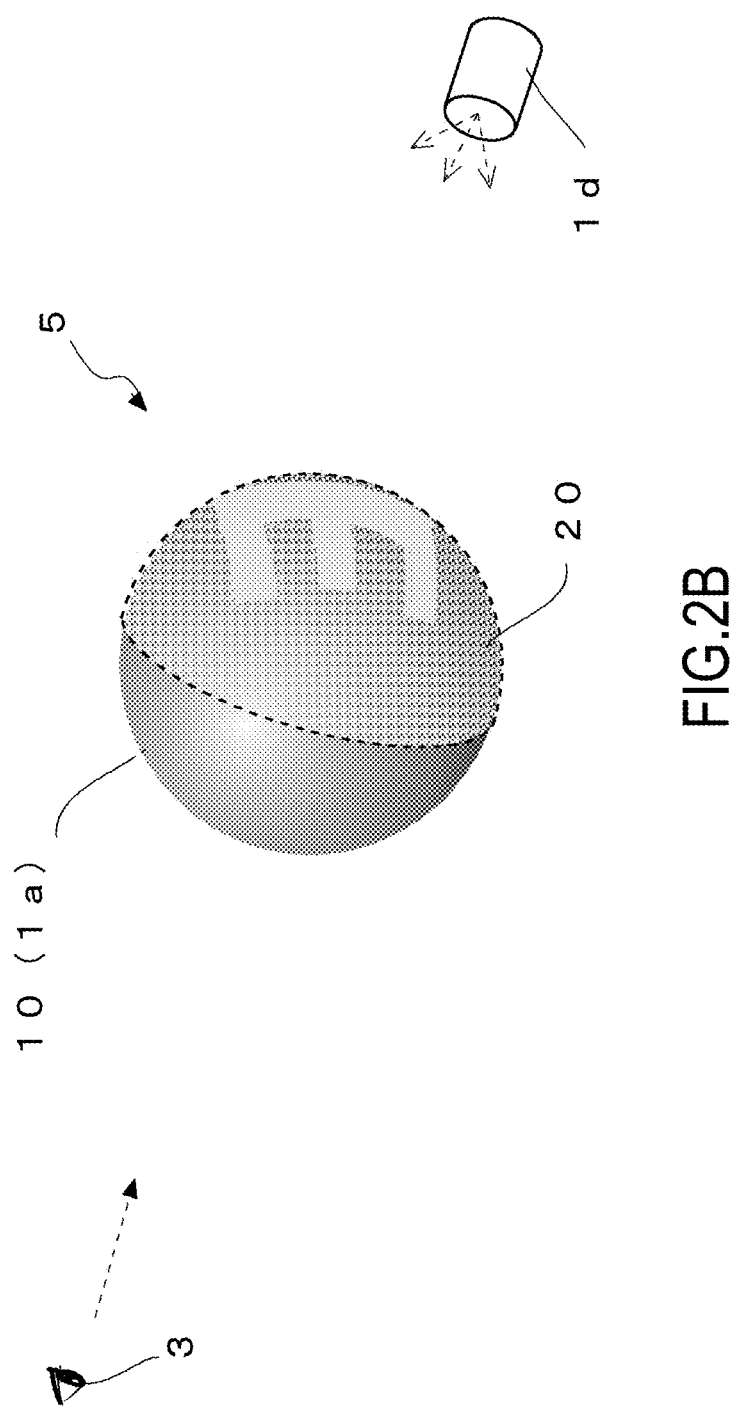
FIG. 2B is a schematic diagram showing an example of the refraction means in FIG. 1.
Figure 3B:
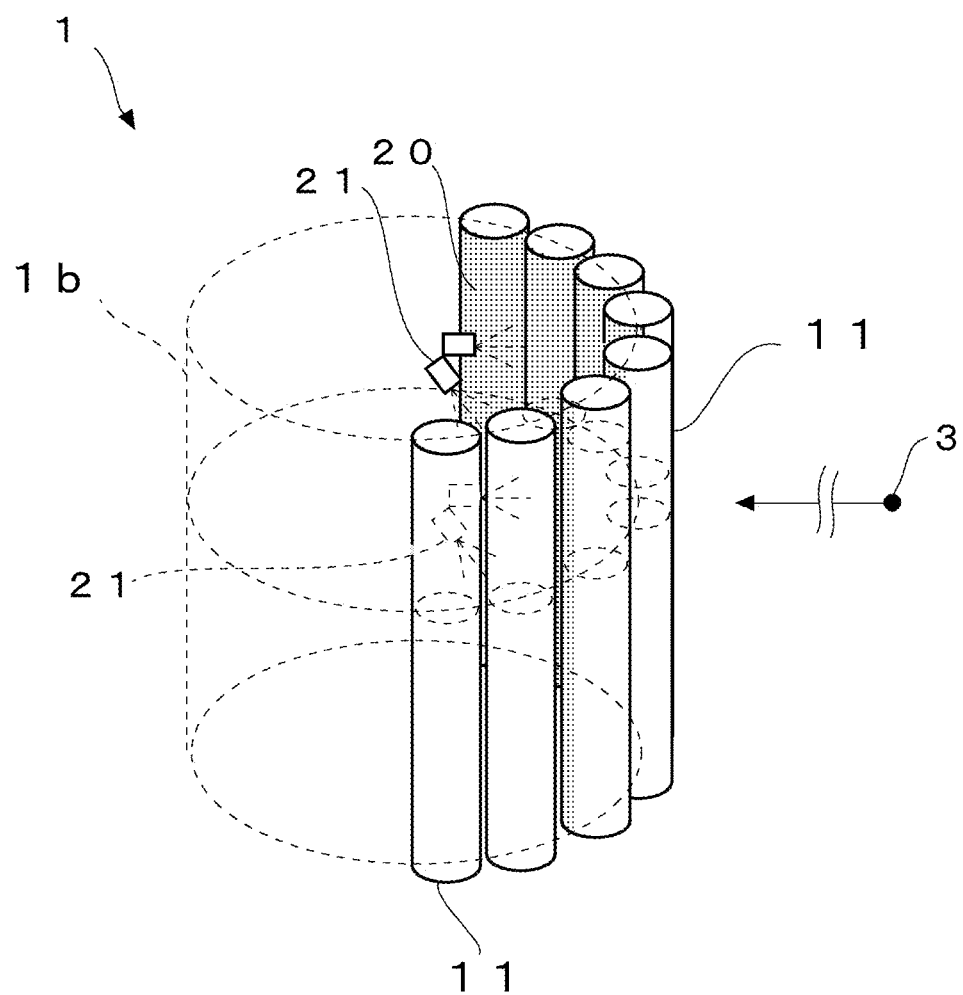
FIG. 3B is a schematic diagram showing an example in which the refraction means in FIG. 2A is stereoscopically arranged.

FIG. 2A is a schematic diagram schematically showing an example configuration of a display system S1 of this example. FIG. 2B is a schematic diagram showing an example of the refraction means. FIG. 3A and FIG. 3B are schematic diagrams showing an example in which the refraction means is stereoscopically arranged.

As shown in FIG. 2A, the display system S1 of the present example includes a display device 1, a control device 50 (an example of an information processing device), and a photographing device 9.

The display device 1 of the present example includes refraction means 1*a*, arrangement support means 1*b* for supporting and arranging each refraction means 1*a*, and image display means 20 as an example of image forming means 1*c*.

An example of the refraction means 1*a* includes, for example, a spherical ball lens as shown in FIG. 2B.

The arrangement support means 1*b* arranges each refraction means 1*a* in a convex shape with respect to a viewpoint 3 side as shown in FIG. 2A. Stereoscopically, for example, as shown in FIG. 3A, each ball lens 10 (an example of the refraction means 1*a*) is arranged on a curved surface having a spherical surface shape. As shown in FIG. 3B, in the case that the refraction means 1*a* is a round column lens 11, each round column lens 11 in the same direction is arranged on a curved surface of a cylindrical surface-form. Incidentally, in case of lenses having a conical shape or a truncated conical shape, lenses are arranged on a curved surface of a truncated conical side face. Incidentally, the viewpoint 3 is outside the display device 1.

Incidentally, as shown in FIG. 3B, in case of the viewpoint 3 (the viewpoint direction of the viewpoint 3 is parallel to the bottom surface of the round column lens 11), the cross section of the round column lens 11 has a circular shape and the shape of the cross section of the round column lens 11 is the same.

As shown in FIG. 3A and FIG. 3B, FIG. 2A is also a sectional view describing each refraction means 1*a* arranged stereoscopically in a certain cross section from a certain viewpoint 3. Moreover, FIG. 2A is also a sectional view describing, in a certain section, a ball lens 10 arranged on a curved surface having a cylindrical surface shape which is one example of each refraction means 1*a* arranged stereoscopically.

The image display means 20, as shown in FIG. 2A, is set in an opposite side to the viewpoint 3 side with respect to the refraction means 1*a*. For example, the image display means 20 is provided on the opposite side surface of the refraction means 1*a*. The image display means 20 is an example of the image forming means for forming a formed-image on the opposite side surface to the viewpoint side with respect to the refraction means.

The image display means 20 is, for example, a screen that displays out an image by projection light projected from the image projection means 21. The projection light projected from the image projection means 21 is projected on the projection surface of the screen, and a projection image is formed. The image display means 20 is a transmission type screen that displays out a mirror image of the projection image as seen from the back surface side, on the back surface of the screen surface.

Herein, the projection light output (or projected) from the image projection means 21 is an image formed on the projection surface by being projected on the projection surface of the image display means 20. The projection image may vary depending on the shape of the projection surface of the image display means 20, the projection light of the image projection means 21 and the positional relationship (distance, direction, etc.) between the two means.

As shown in FIG. 2B, for example, by applying the surface treatment to the hemispherical surface of the ball lens 10, the image display means 20 which is a transmission type screen is formed therein. In the case that the transmission type screen as shown in FIG. 2B is formed on the hemispherical surface of the ball lens 10, the image display means 20 displays out the image which can be seen from the viewpoint 3 side, on the back surface of the projection surface on which the projection light is projected.

As shown in FIG. 2A, the image display means 20 is set in the opposite side to the viewpoint 3 side with respect to the refraction means 1*a*. That is, the image display means 20 is provided inside the display device 1 with respect to the viewpoint 3 outside the display device 1. As shown in FIG. 2B, by the projection light projected from the image projection means 21 onto the image display means 20, a formed-image 5 (mirror image of character "E" in FIG. B2) is formed on the surface of the refraction means 1*a* on the opposite side to the viewpoint 3 side with respect to the refraction means 1a such as the ball lens 10. In the case that the image display means 20 is provided on the surface of the refraction means in the opposite side by surface treatment, etc., the image displayed out on the back side of the projection plane of the image projection means 20 (the image seen in the normal image of the letter "E" as seen from the viewpoint 3 side) becomes the formed-image 5. In this case, the projection image of the projection surface of the image display means 20 is also the image 5 (an image seen as a mirror image of the letter "E" when seeing from the opposite side from the viewpoint 3).

As shown in FIG. 2A, the image display means 20 is provided so that the part to be the center of the formed-image 5 faces in the normal line direction of the convex shape formed by the arrangement support means 1b. That is, each of the refraction means 1a is supported by the arrangement support means 1b so that the central part of the image display means 20 (the part to be the center of the formed-image) faces in the normal direction of the convex shape. The line connecting the center part of the image display means 20 and the central part of the refraction means 1a is a vertical direction with respect to the convex shaped surface of the arrangement support means 1b.

The light of the formed-image 5 formed on the surface of the refraction means 1a on the opposite side to the viewing point 3 side passes through the inside of the refraction means 1a, refracts as it exits from the refraction means 1a, and reaches the viewpoint 3. A part of the formed-image 5 corresponding to the direction of the viewpoint 3 (partial formed-image) is enlarged by the refraction means 1a. Herein, these partial formed-images appear as enlarged images (display element images) from the viewpoint side in each refraction means 1a of the display device 1; Three-dimensional spatial representation such as solid objects and plane images matched with the viewpoint direction can be seen by synthesizing the display element images in the refraction means 1a of the display device 1 seen from the viewpoint side. Incidentally, the partial formed-image corresponds to a region image described later.

The image projection means 21 (an example of the image forming means) is connected to the control device 50 and is controlled by the control device 50 (an example of the information processing device for the display device). The image projection means 21 outputs (or projects) the projection light directed toward the refraction means 1 from the opposite side to the viewpoint 3 with respect to the refraction means 1a. The projection image is formed on the projection surface of the image display means 20 by the projection light output from the image projection means 21. The light of the projection image passes through the image display means 20 and the image is displayed out on the back side of the projection surface. The formed-image is formed on the surface of the refraction means 1a by the light of the image displayed out. In this manner, the image display means 20 and the image projection means 21 are examples of the image forming means for forming a formed-image on an opposite side surface to the viewpoint side with respect to the refraction means.

The control device 50 generates image data of the projection image formed on the projection surface of the image display means 20 by the projection light output from the image projection means 21. The control device 50 controls the image projection means 21 so as to output the projection light such that the projection image is formed on the projection surface of the image display means 20, from the image projection means 21.

Moreover, in the case that the projection image of the projection surface of each image display means 20 forms the same or similar formed-image 5 in all the refraction means 1a by the projection light from the image projection means 21, the same or similar images are displayed on the display device 1, even if viewpoint 3 is changed.

Herein, an example of each of the adjacent refraction means 1a in the refraction means 1a arranged on a convex-shaped curved surface includes the other refraction means 1a which is the nearest in each direction centered on the refraction means 1a and the other refraction means 1a which is the second nearest.

To the control device 50 is connected photographing device 9 for photographing images of the display device 1 in which images are displayed.

(1.2 Configuration and Functions of Refraction Means)

Next, the configuration and functions of the refraction means 1a will be described in detail.

The refraction means 1a is a lens made of a material which refracts and transmits light such as glass, plastic, etc. Since the color of the refraction means 1a is only required to transmit light, it is not limited to being transparent but may be colored glass, etc.

At least a part of the refraction means 1a has a circular-shaped cross section.

The solid three-dimensional shape of the refraction means 1a is a sphere-shape, a column, an ellipsoid, a cone-shape, etc. For example, an example of the refraction means 1a includes a ball lens, a round column lens, etc. Furthermore, the solid three-dimensional shape of the refraction means 1a may be a shape in which a column bulges like a barrel, a shape in which a column is constricted like a Japanese drum tsudzumi, or a shape in which a vertex side of a cone-shape is cut.

Herein, the circular shape as the shape of the cross section of the refraction means 1a is not limited to a perfect circle and may be somewhat distorted. For example, as viewed from the viewpoint 3, the shape of the image displayed by the display device 1 may be deformed or distorted from the perfect circle to the extent that it can be recognized as the image in the case of a perfect circle as the entire display device 1.

Figure 4A:
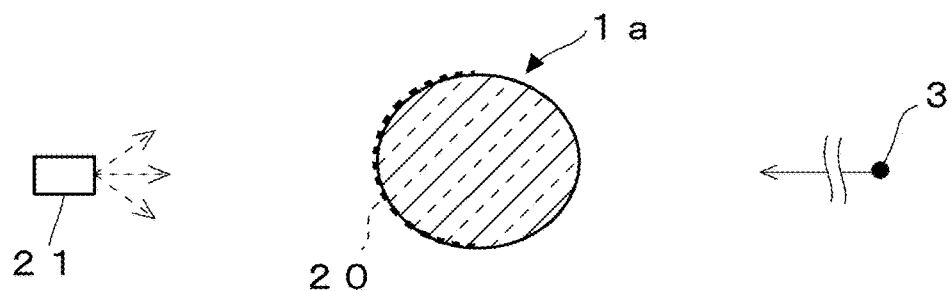
FIG. 4A is a schematic diagram showing a modified example of shapes of the refraction means.
Figure 4B:
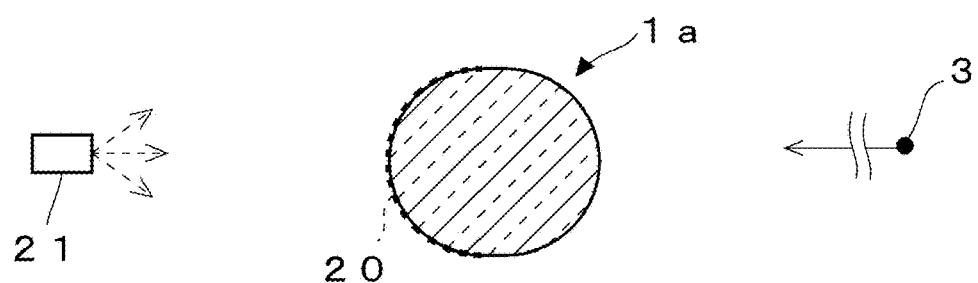
FIG. 4B is a schematic diagram showing a modified example of shapes of the refraction means.
Figure 4C:
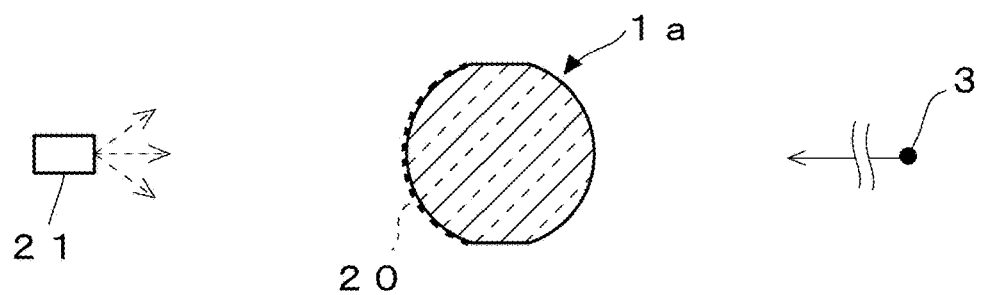
FIG. 4C is a schematic diagram showing a modified example of shapes of the refraction means.
Figure 4D:
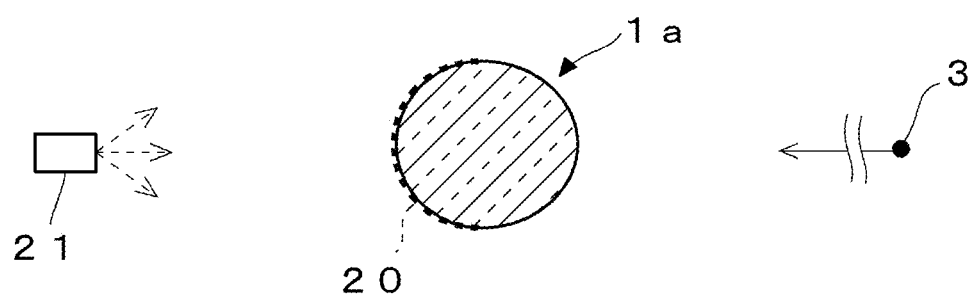
FIG. 4D is a schematic diagram showing a modified example of shapes of the refraction means.

Furthermore, as shown in FIGS. 4A to 4D, the circular shape of the cross section of the refraction means 1a may be a biconvex structure such as a somewhat ellipse-shape, to the extent that the influence of reflection inside the refraction means (internal reflection) is not concerned with the way of the image displayed by the display device 1 looks from the viewpoint 3. For example, as shown in FIG. 4A, the refraction means 1a may be an ellipsoid, the axis of the ellipsoid may face the viewpoint 3, and the circular shape of the section of the refraction means 1a may be somewhat elliptical. In addition, as shown in FIG. 4B, the refraction means 1a may be a lens having a shape in which a thin disk is sandwiched between two hemispheres, and the circular shape of the cross section of the refraction means 1a may sandwich the rectangle between the semicircles. As shown in FIG. 4C, a part of the ball lens is cut, and the circular shape of the cross section of the refraction means 1a may be a shape in which a part of a circle is cut away. As shown in FIG. 4D, with respect to a viewpoint 3 side, the curvature of the curved surface of the refraction means 1a on the near side and the curved surface of the refraction means 1a on the far side may be somewhat different.

(1.3 Configuration and Functions of Arrangement Support Means)

Next, the configuration and functions of the arrangement support means 1b will be described in detail using FIGS. 5A to 8 B.

The arrangement support means 1b has a material which can define the arrangement by connecting the refraction means 1a such as a ball lens of resin, clay, etc.

Incidentally, the refraction means 1a flexibly coupled with adhesive may be placed on a support base having a convex surface. In this case, the arrangement support means 1b is adhesive and a supporting base. In addition, the arrangement support means 1b may support the refraction means 1a of attaching the image display means 20 by embedding it in about half a plastic material. In the case where the shape of the refraction means 1a is a rod-like shape such as a column, an ellipsoid, or a cone-shape, the arrangement support means 1b may be a support base into which the refraction means 1a is inserted and fixed.

Next, an arrangement example of the refraction means 1a will be described.

Figure 5A:
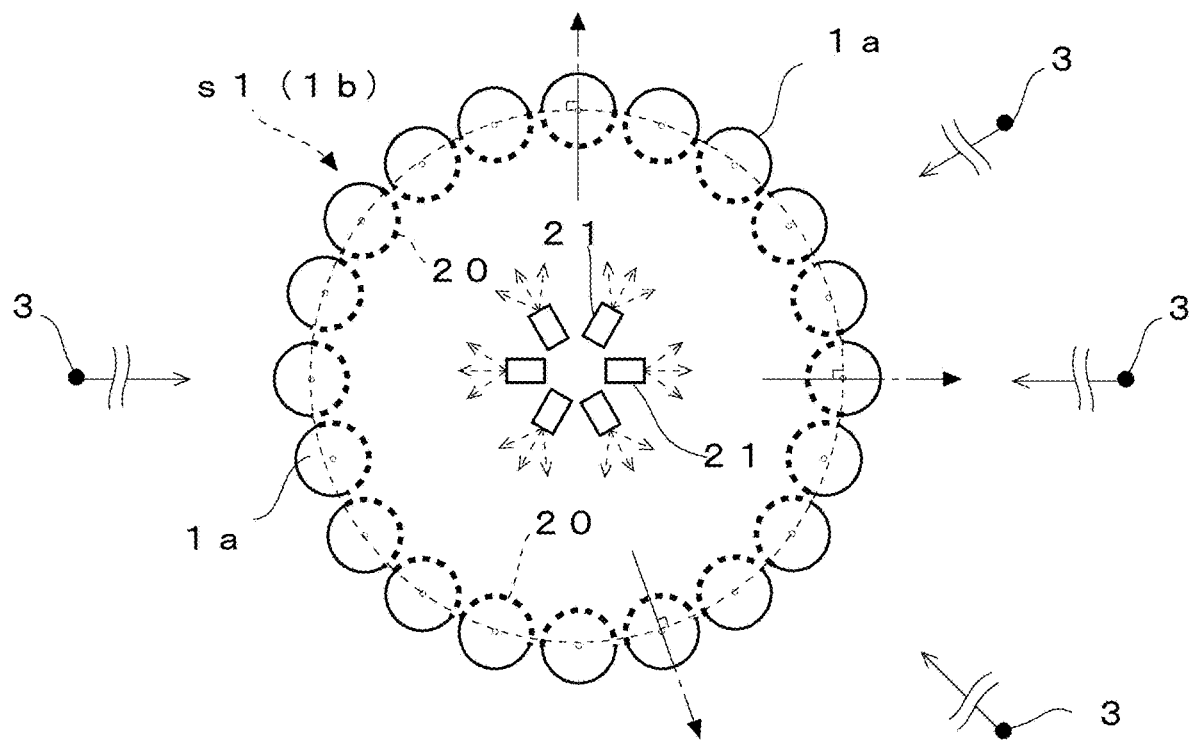
FIG. 5A is a schematic diagram showing an example of arrangements of the refraction means.

The arrangement support means 1b arranges the plurality of refraction means 1a in a convex shape with respect to the viewpoint 3 side. For example, as shown in FIG. 5A, the refraction means 1a may be arranged in a circular shape s1. In this case, the three-dimensional arrangement of each refraction means 1a is a sphere-shape, a hemisphere-shape, a round column-shape, an ellipsoid, etc. In the case of a hemisphere-shape, a round column-shape and an ellipsoid, the circular shape s1 is arranged at a certain cutting plane.

As shown in FIG. 5A, the direction of the formed-image formed on the surface of the refraction means 1a by the image display means 20 is the vertical direction with respect to the arrangement shape (circular shape s1) of the refraction means 1a. That is, each of the refraction means 1a is arranged so that the part to be the center of the formed-image (for example, the central part of the image display means 20) can face in the normal direction of the convex shape.

Figure 5B:
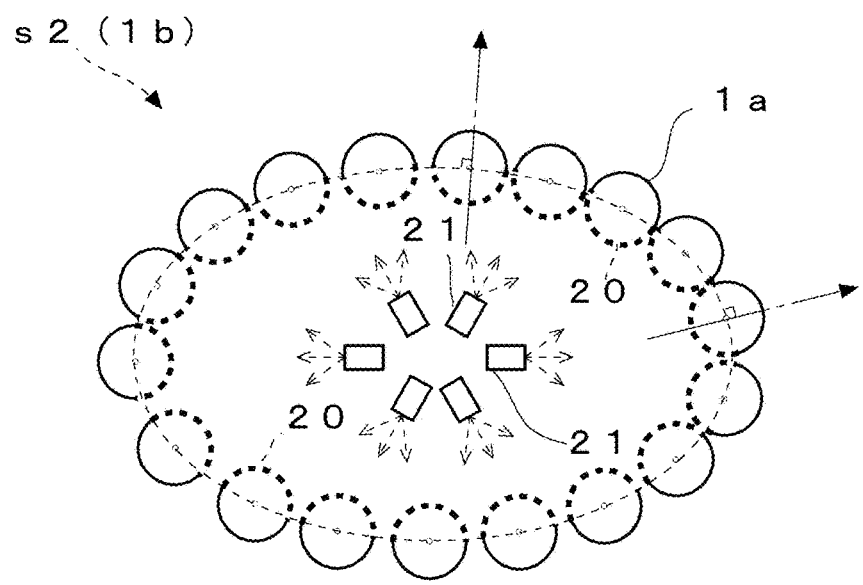
FIG. 5B is a schematic diagram showing an example of arrangements of the refraction means.

In addition, as shown in FIG. 5B, the refraction means 1a may be arranged in an elliptical shape s2. In this case, the three-dimensional arrangement of each refraction means 1a is, for example, an elliptic column-shape, an ellipsoid, etc. It is an arrangement of elliptical shape s2 at a certain cutting plane of an elliptic column-shape or an ellipsoid. As shown in FIG. 5B, the direction of the formed-image formed on the surface of the refraction means 1a by the image display means 20 is the vertical direction with respect to the arrangement shape (elliptical shape s2) of the refraction means 1a. That is, each of the refraction means 1a is arranged so that the part to be the center of the formed-image (for example, the central part of the image display means 20) can face in the normal direction of the convex shape.

Figure 6A:
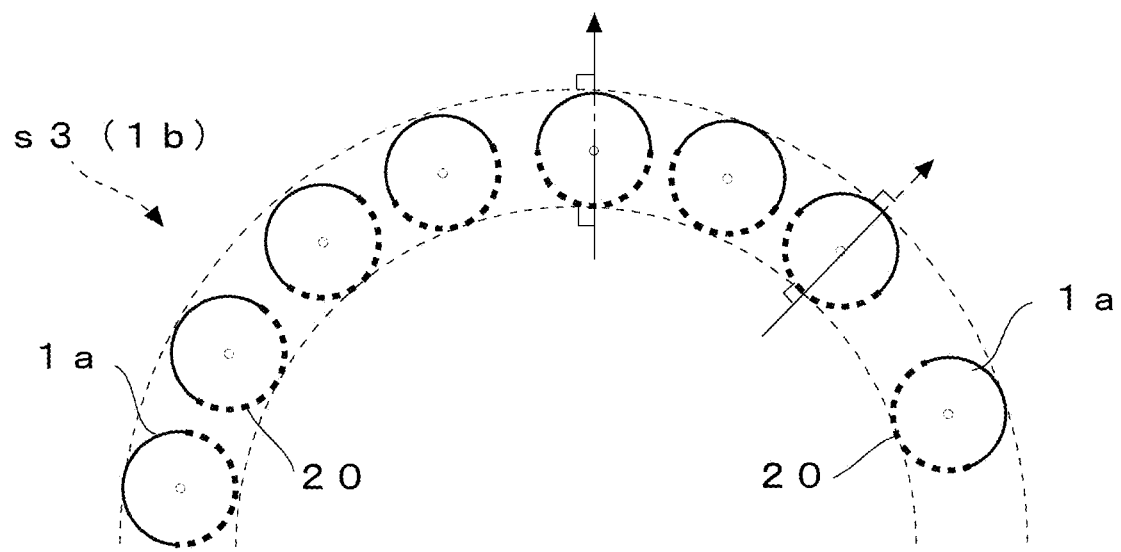
FIG. 6A is a schematic diagram showing an example of arrangements of the refraction means.

In addition, as shown in FIG. 6A, the convex shape is not limited to the shape passing through the center of each refraction means 1a, but it may be set to a shape s3 which is inscribed or circumscribes each of the refraction means 1a. As shown in FIG. 6A, the direction of the formed-image formed on the surface of the refraction means 1a by the image display means 20 is the vertical direction with respect to the shape s3 inscribed or circumscribed.

In addition, the convex shape (shape s3) may not be a closed shape as shown in FIGS. 5A and 5B but may be an open shape as shown in FIG. 6A. That is, the convex shape may not be a closed convex shape such as a closed circular shape or a closed elliptical shape, but may be a part shape of these.

Figure 6B:
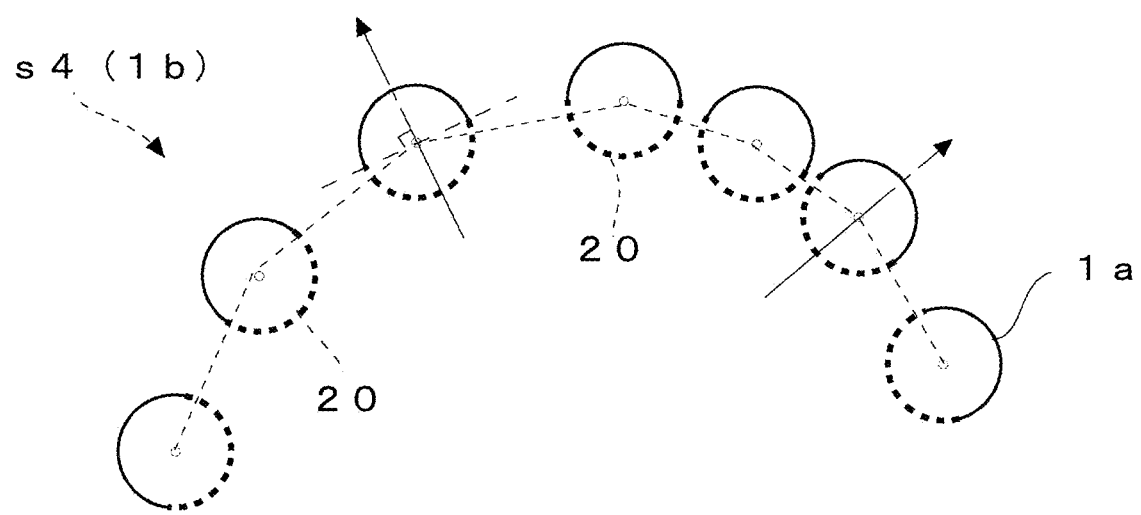
FIG. 6B is a schematic diagram showing an example of arrangements of the refraction means.

In addition, as shown in FIG. 6B, the convex shape may be a polygon s4 formed by connecting the vicinity of the center of each refraction means 1a with a straight line. That is, the three-dimensional arrangement of the refraction means 1a may be a convex polyhedron whose vertex is the vicinity of the center of each refraction means 1a.

As shown in FIG. 6B, the direction of the formed-image formed on the surface of the refraction means 1a by the image display means 20 is the vertical direction with respect to one face coming in contact with the polygon at the vertex of the polygon.

In addition, as shown in FIG. 6B, each of the refraction means 1a may not be arranged at regular intervals.

Figure 7A:
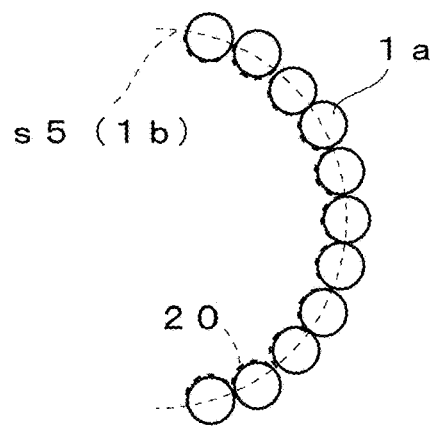
FIG. 7A is a schematic diagram showing an example of arrangements of the refraction means.
Figure 7B:
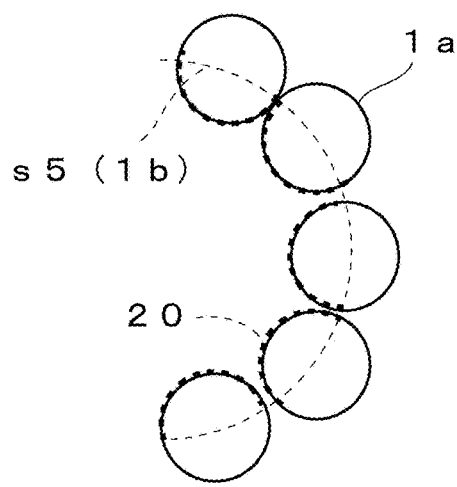
FIG. 7B is a schematic diagram showing an example of arrangements of the refraction means.

In addition, as shown in FIG. 7A, each of the small refraction means 1a (for example, a ball lens having a small diameter) may be arranged in the same convex shape s5 by the arrangement support means 1b, and as shown in FIG. 7B, each of the large refraction means 1a (for example, a ball lens having a large diameter) may be arranged. As shown in FIG. 7A, in the case of the small refraction means 1a, the resolution of the three-dimensional spatial representation displayed by the display device 1 is increased.

Figure 7C:
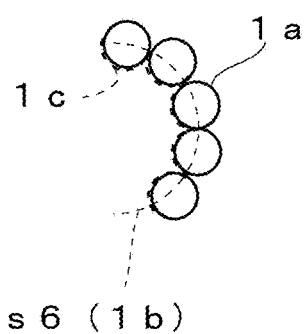
FIG. 7C is a schematic diagram showing an example of arrangements of the refraction means.

In addition, the size of the convex shape in which the refraction means 1a is arranged by the arrangement support means 1b depends on the size of the display device 1. For example, as shown in FIG. 7C, when the size of the display device 1 becomes small, the curvature of the convex shape s6 becomes large. FIG. 7C shows an example in which the radius of the arrangement support means 1b is small using individual refraction means 1a of the same size as in FIG. 7A. In this case, the three-dimensional spatial representation displayed on the display device 1 in FIG. 7C becomes the same three-dimensional spatial representation, although the size of the displayed three-dimensional spatial representation become small in matching the size of the display device 1 as compared with FIG. 7A.

Figure 8A:
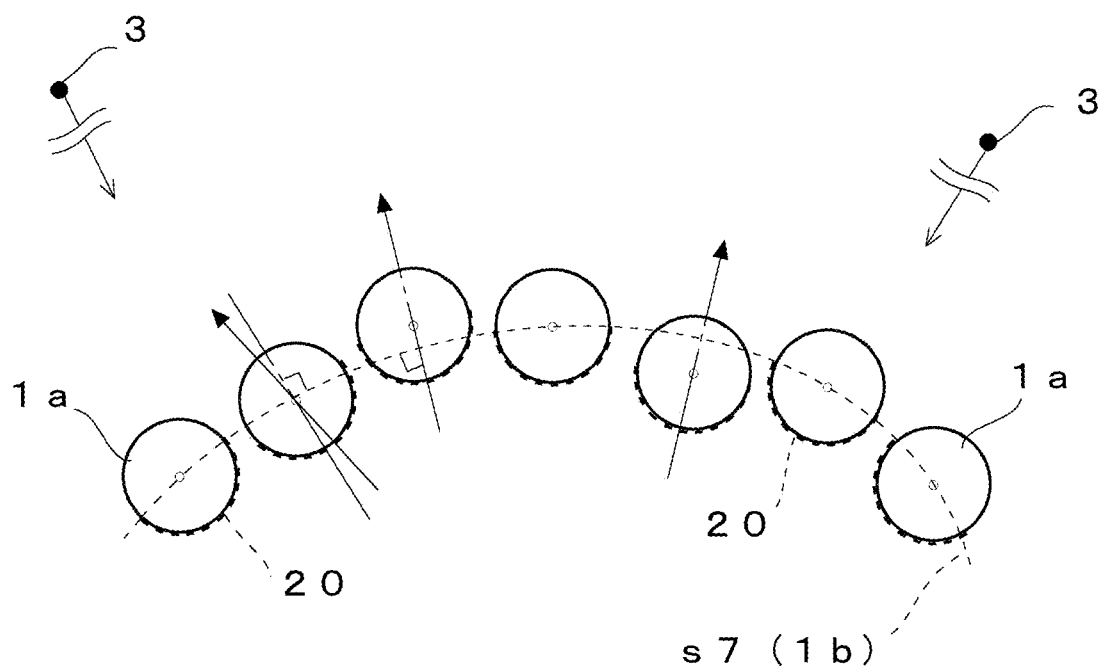
FIG. 8A is a schematic diagram showing an example of arrangements of the refraction means.

In addition, as shown in FIG. 8A, all of the refraction means 1a may not necessarily be arranged on the line of the convex shape s7 formed by the arrangement support means 1b. For example, some of the refraction means 1a may be arranged on the viewpoint 3 side (outside the display device 1) or may be installed on the inside opposite to the viewpoint 3 side (the inside of the display device 1), rather than the convex shape s7 on the design of the display device 1.

In these cases, in the three-dimensional spatial representation of the display device 1, the part of the image participated by some of the refraction means 1a may not be the shape of the design that was previously planned before the creation. In this case, in the entire three-dimensional spatial representation displayed by the display device 1, the part of the image participated by some of the image display means 20 become a three-dimensional spatial representation shifted.

In addition, as shown in FIG. 8A, the direction of the formed-image formed on the surface of the refraction means 1a by all the image display means 20 may not be necessarily accurately perpendicular to the convex shape s7 in the design of the display device 1. The part of the image involving participated by some of the image display means 20 as described above may not be in accordance with the direction not be the shape of the design that was previously planned before the creation. In this case, in the entire three-dimensional spatial representation displayed by the display device 1, the part of the image participated by some of the image display means 20 become a three-dimensional spatial representation shifted.

Incidentally, that the part to be the center of the formed-image can face in the normal direction of the convex shape may mean that the direction of the formed-image formed on the surface of the refraction means 1a by the image display means 20 is not necessarily perpendicular precisely to the convex shape s7 on the design of the display device 1, and that the direction of the formed-image formed on the surface of the refraction means 1a by the image display means 20 may be deviated from the vertical, to the extent that it can be recognized, in the whole of the display device 1, as a three-dimensional spatial representation in the case where the direction of the formed-image formed on the surface of the refraction means 1a by each image display means 20 is accurately vertical.

Figure 8B:
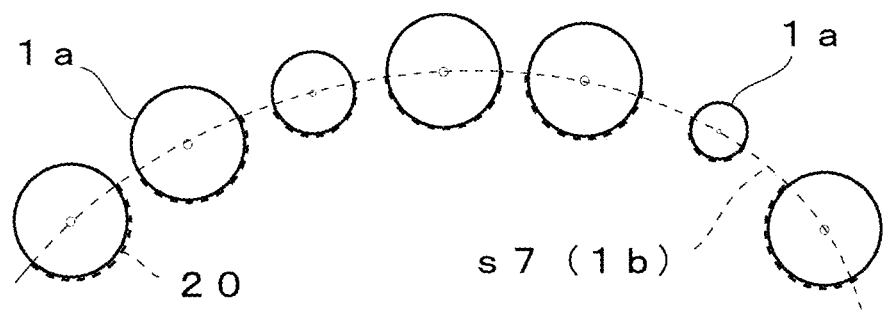
FIG. 8B is a schematic diagram showing an example of arrangements of the refraction means.

In addition, as shown in FIG. 8B, the sizes of the refraction means 1a may be different from each other. For example, as viewed from the viewpoint 3, the sizes of the refraction means 1a may be different from each other to the extent that it can be recognized, in the whole of the display device 1, as a three-dimensional spatial representation in the case where the sizes of the refraction means 1a are the same.

Incidentally, the cross-sectional area of some of the refraction means 1a may be reduced depending on what cross section to grasp the display device 1 in which the ball lens 10 as shown in FIG. 3A is three-dimensionally arranged.

In addition, the refractive index of the refraction means 1a may be different from each other. For example, the refractive indices of each refraction means 1a may be different from each other to the extent that it can be recognized, in the whole of the display device 1, as a three-dimensional spatial representation in the case where the refractive indexes of each refraction means 1a are the same, as viewed from the viewpoint 3.

Incidentally, when each of the refraction means 1a is arranged so that the part to be the center of the formed-image formed by each image forming means can face in the normal direction of the convex shape, the cross-sectional shape of each refraction means 1a from the viewpoint 3 have the same shape. That is, in particular, in the case that the refraction means 1a is a solid having directionality such as a c round column-shape, an ellipsoid, a cone-shape, etc., each refraction means 1a is arranged such that the directions of each refraction means 1a are substantially aligned. Incidentally, it is sufficient if the three-dimensional spatial representation in which formed-images are synthesized can be recognized in the entire display device 1 by viewing each formed-image 5 from the viewpoint 3, although it is not necessary that the cross-sectional shapes of each refraction means 1a are exactly the same.

In addition, the convex shape in which the refraction means 1a is arranged by the arrangement support means 1b may be a shape formed by joining a spherical surface shape and a cylindrical surface shape. For example, the entire shape of the display device 1 may be a shape in which the cylindrical surface is sandwiched by two hemispherical surfaces. As described above, the three-dimensional arrangement of each refraction means 1a may be a combination of a spherical surface, a semi-spherical surface, a cylindrical surface, an ellipsoidal surface, etc.

Incidentally, the entire shape of the display device 1 may be a combination of a plurality of convex shapes. In this case, the joint portion between the convex shape and the convex shape may not necessarily have a convex shape. For example, convex shapes may be formed in four directions like four leaves.

In addition, regarding the arrangement of the refraction means 1a, the spherical shape may be similar to a spherical surface, as long as it may be convex shape. Regarding the arrangement of the refraction means 1a as well, the cylindrical surface shape may be similar to the cylindrical surface, such as a shape in which a cylindrical surface bulges like a barrel, a shape in which a cylindrical surface is constricted like a Japanese drum tsudzumi, or a shape in which a vertex side of a cone-shape is cut.

(1.4 Configuration and Functions of Image Display Means)

Next, the configuration and functions of the image display means 20 will be described in detail using FIGS. 9A to 10.

The image display means 20 has, for example, a function of a transmission type screen. The image display means 20 is set in by applying a process or a surface treatment of making the surface opposite to the viewpoint 3 side of the refraction means 1a translucent, sticking a translucent sheet (for example, a film of matte polyester, etc.) on the surface opposite to the viewpoint 3 side of the refraction means 1a, or apply translucent paint. The surface on the opposite side of the refraction means 1a is surface-treated with grinding sand, chemicals or the like, and then by the occurrence of fine irregularities it become like a ground glass or a cloudy glass.

For example, as shown in FIG. 2, an image display means 20 having hemisphere shape is formed by applying surface treatment to the hemisphere surface of the ball lens 10.

The image display means 20 may be a translucent screen such as vinyl or acrylic resin, glass or the like.

The image display means 20 may have a function of displaying out an image on the back surface of the projection surface on which the projection light is projected, there is little reflection of light on the projection surface on which the projection light is projected, and the image display means 20 may emit the scattering light from the back surface thereof. The image displayed out on the image display means 20 is magnified by the refraction means 1a and can be seen from the viewpoint 3 side.

Figure 9A:
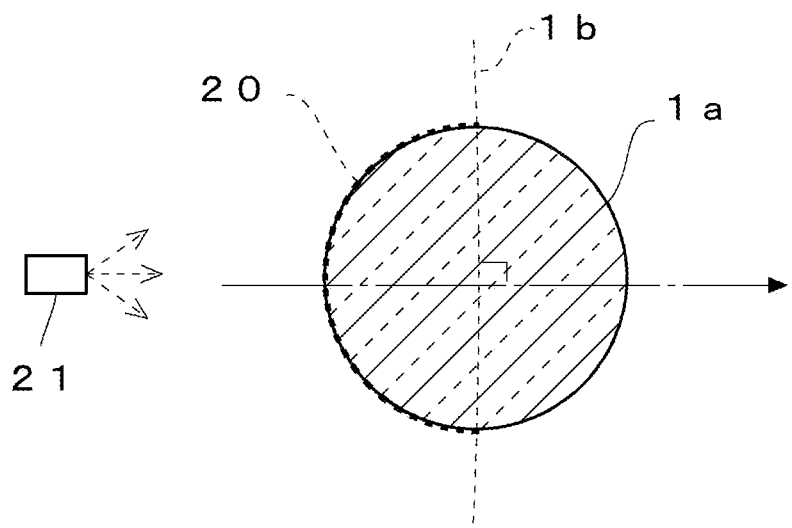
FIG. 9A is a schematic diagram showing an example of the image display means.

As shown in FIG. 9A, the image display means 20 may be provided so as to cover the half-face of the refraction means 1a made of a transparent material. Incidentally, FIG. 9A is a schematic diagram showing a cross section in a case where the image display means 20 is formed hemi-spherically on the surface of the transparent ball lens 10. The round column lens may be a cross section in the case that an image display means 20 having a half cylindrical surface shape is provided.

The line connecting the center part of the hemispherical image display means 20 and the central part of the ball lens 10 is a vertical direction with respect to the convex shaped surface of the arrangement support means 1b. In addition, in case of round column lens, the line connecting the center line of the round column lens and the center line of the image display means 20 having a half cylindrical surface shape is a vertical direction with respect to the convex shaped surface of the arrangement support means 1b.

Figure 9B:
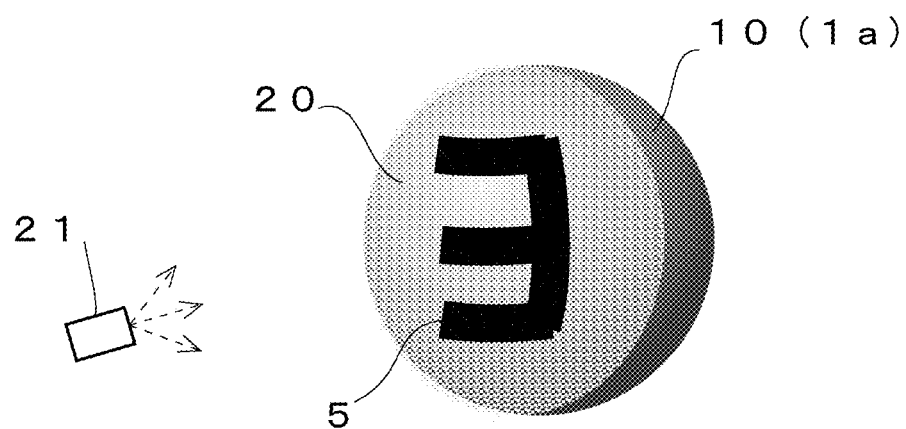
FIG. 9B is a schematic diagram showing an example of the image display means.

As shown in FIG. 9B, projection light is projected from the image projection means 21 onto the surface of the ball lens 10 provided with hemispherical image display means 20, and the formed-image 5 is formed. Incidentally, when the formed-image 5 formed on the surface of the ball lens 10 is viewed from the side where the formed-image 5 is formed, the formed-image 5 is a mirror image.

In addition, the center part of the formed-image is not necessarily the center of the image "E" itself. After the ball lenses 10 are fixed to the ball lenses 10 by the arrangement support means 1b, the center part of the image is the position where the normal line of the convex surface formed by the arrangement support means 1b passes through the center part of the ball lens 10 and intersects with the surface of the ball lens 10 on the opposite side to the viewing point 3 side.

Figure 10A:
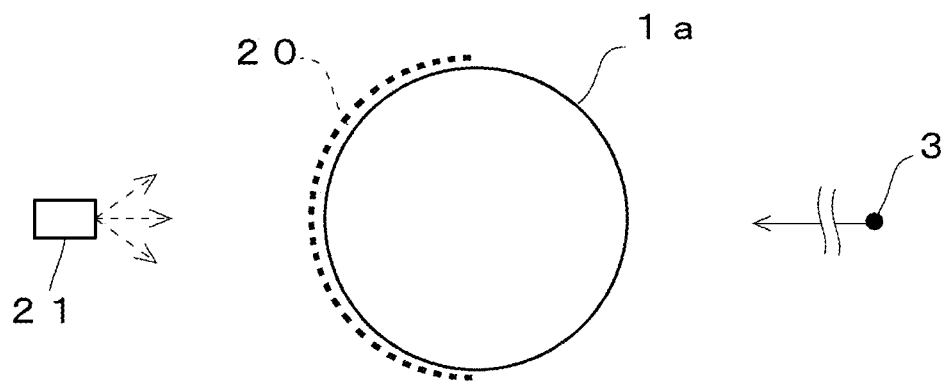
FIG. 10A is a schematic diagram showing a modified example of the image display means.
Figure 10B:
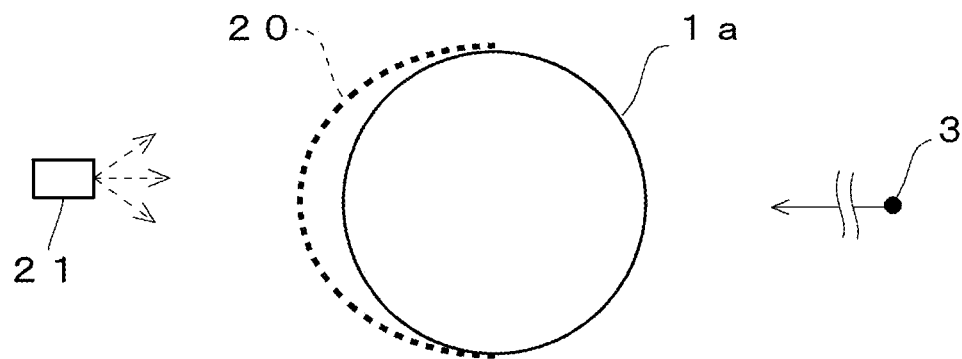
FIG. 10B is a schematic diagram showing a modified example of the image display means.

As shown in FIG. 10A, the image display means 20 may be provided so as not to be in close contact with the refraction means 1a but with a gap with the refraction means 1a. As shown in FIG. 10B, the image display means 20 may not have a shape along the shape of the surface of the refraction means 1a. In the case where the cross-sectional shape of the refraction means 1a is a circular shape, the sectional shape of the image display means 20 is not limited to a circular shape and may be an elliptical shape. The projection light is projected from the image projection means 21 onto the projection surface of the image display means 20, and then an image is displayed out on the back side of the projection surface of the image projection means 20. Then the displayed-out image may be seen from the viewpoint 3 side through the refraction means 1a.

Figure 11A:
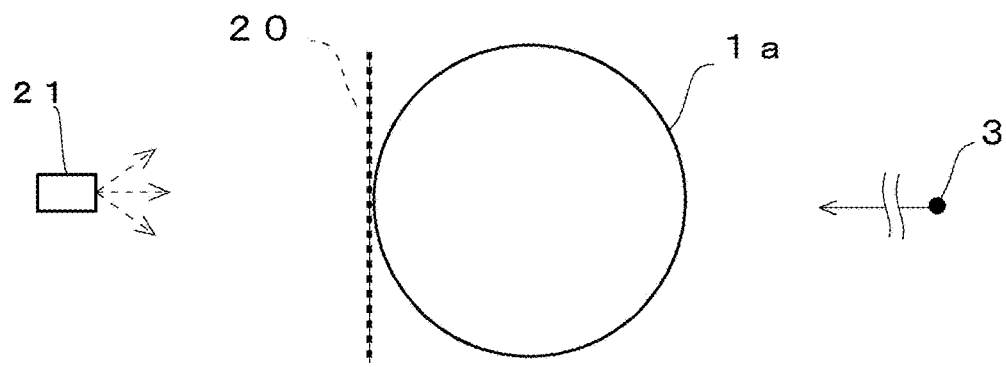
FIG. 11A is a schematic diagram showing a modified example of the image display means.
Figure 11B:
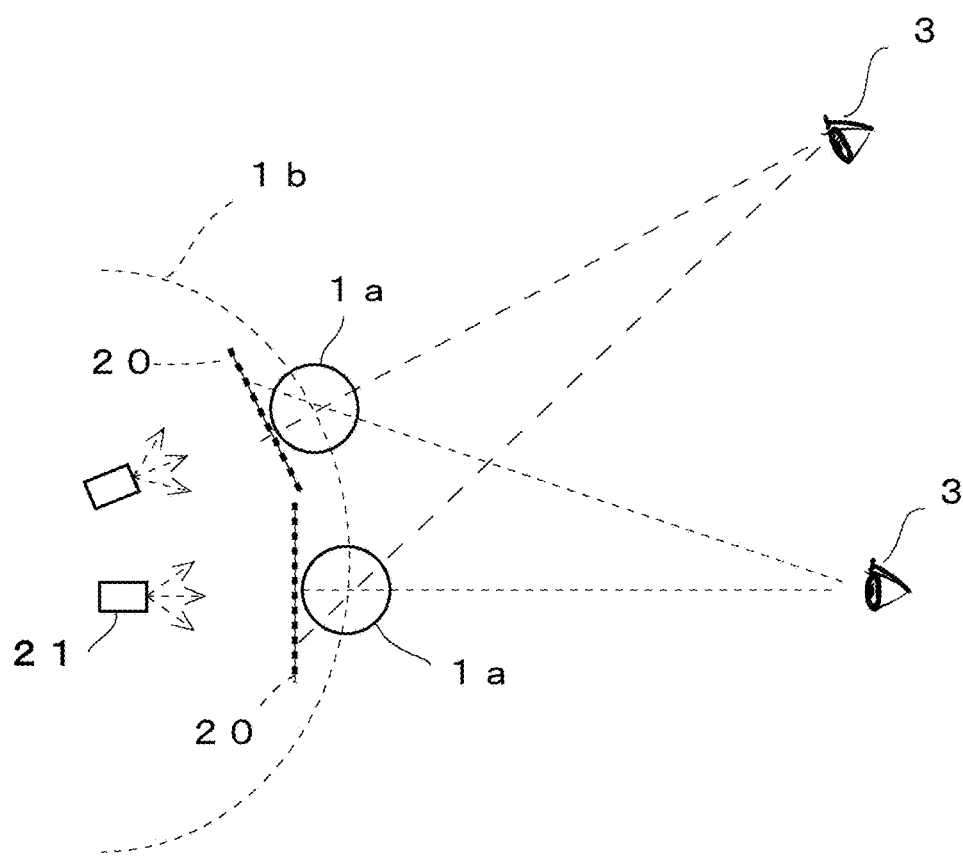
FIG. 11B is a schematic diagram showing a modified example of the image display means.

As shown in FIG. 11A, the shape of the image display means 20 may be a flat surface. As shown in FIG. 11B, by enlarging the flat image display means 20 to be larger than the size of the cross-sectional shape of the refraction means 1a, the viewing angle at which the formed-image can be seen is widened.

Figure 11C:
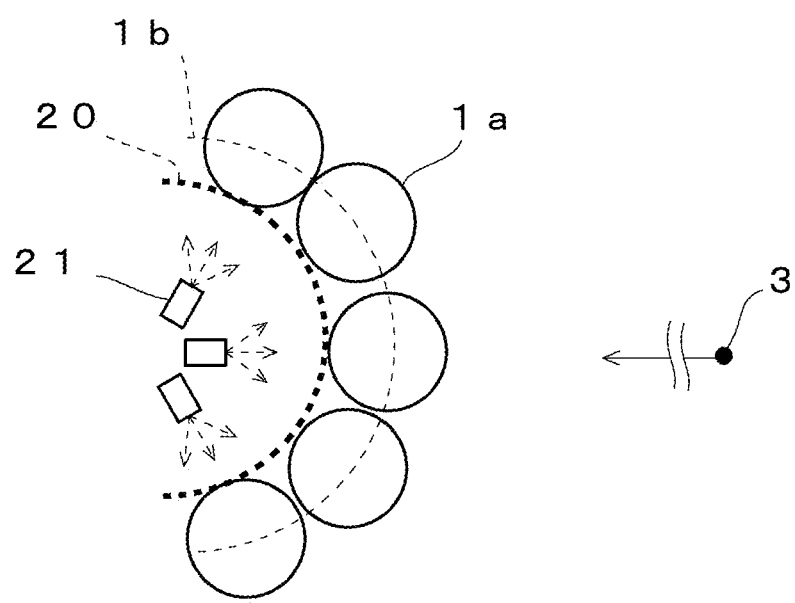
FIG. 11C is a schematic diagram showing a modified example of the image display means.

As shown in FIG. 11C, the image display means 20 may be formed integrally on the opposite side to the viewpoint 3 side with respect to each refraction means 1a. For example, in the case that each refraction means 1a is arranged in a spherical surface shape, the image display means 20 has a spherical surface shape, and in the case that each refraction means 1a is arranged in a cylindrical shape, the image display means 20 has a cylindrical shape.

Figure 12A:
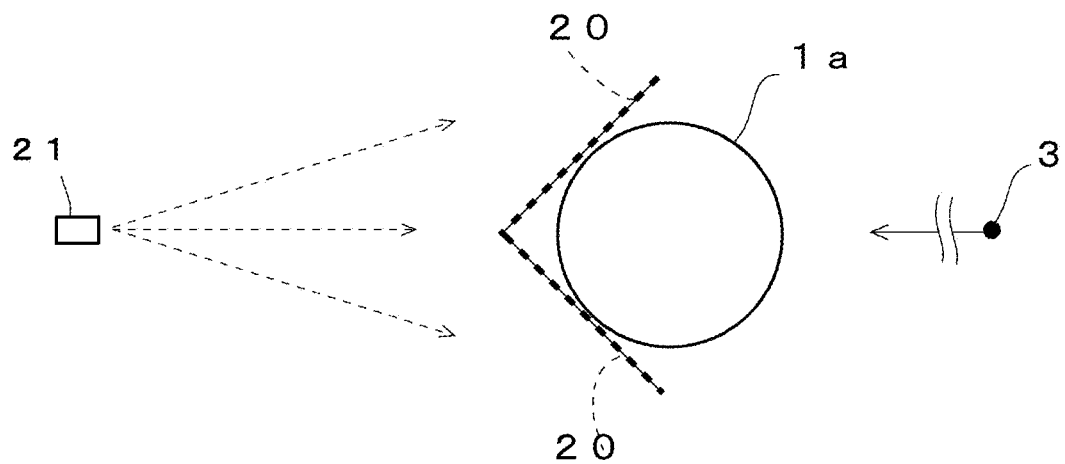
FIG. 12A is a schematic diagram showing a modified example of the image display means.
Figure 12B:
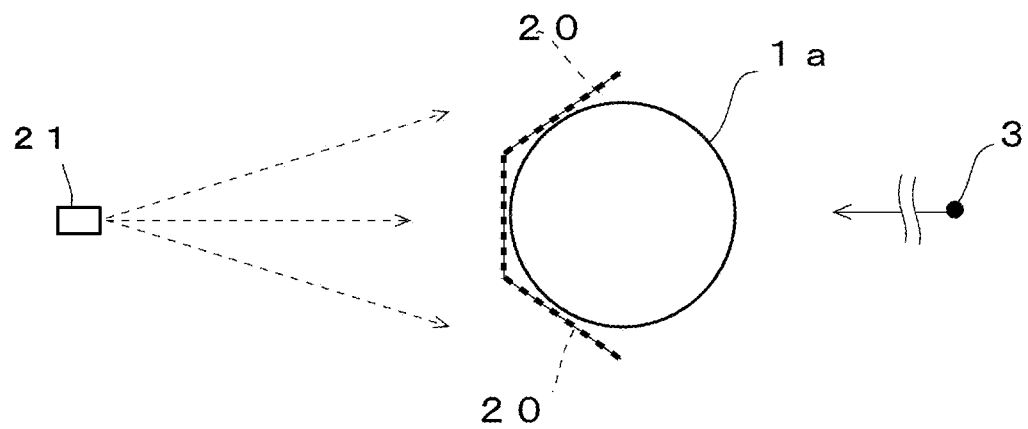
FIG. 12B is a schematic diagram showing a modified example of the image display means.

As shown in FIGS. 12A and 12B, the image display means 20 may be composed of a plurality of planes.

As shown in FIGS. 4A to 4D, the image display means 20 is provided on the surface of the refraction means 1a on the opposite side to the viewing point 3.

(1.5 Configuration and Functions of Control Device and Image Projection Means)

Figure 13:
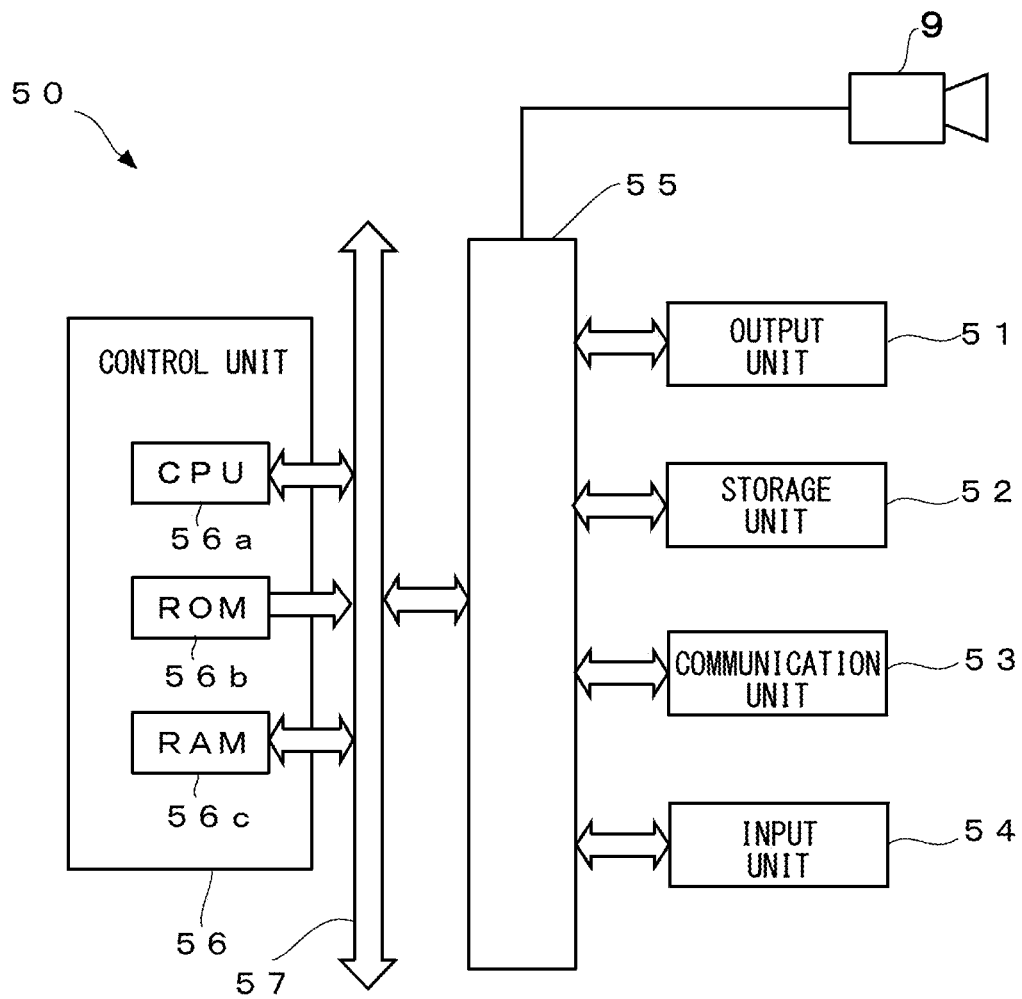
FIG. 13 is a block diagram schematically showing an example configuration of a control device.

Next, the configuration and functions of the control device 50 and the image projection means 21 will be described in detail using FIGS. 13 to 14.

The control device 50 of an example of the information processing device 8 has the function of a computer. The control device 50 includes an output unit 51, a storage unit 52, a communication unit 53, an input unit 54, an input/output interface unit 55, and a control unit 56. The control unit 56 and the input/output interface unit 55 are connected electrically via a system bus 57. Moreover, the control device 50 is connected to the image projection means 21 and the photographing device 9 by wired or wireless connection. The control device 50 acquires image data of a photographed image photographed from a certain distance in a certain viewpoint direction from the photographing device 9 in the three-dimensional space expression displayed on the display device 1.

Incidentally, the control device 50 may control the position of the imaging device 9. For example, it controls the photographing direction (viewpoint direction) of the photographing device 9 and the photographing distance (viewpoint distance) from the display device 1 to the photographing device 9. Instead of controlling the position of the photographing device 9, the control device 50 may specify the photographing direction and the photographing distance in which the photographing device 9 is installed from the photographed image. The photographing device 9 may be set in advance in a predetermined photographing direction and photographing distance and the photographing device 9 may photograph the displayed three-dimensional spatial representation of the display device 1 as an image. The photographing device 9 may be provided with a GPS (Global Positioning System) and a gyro sensor, and photographing direction and the photographing distance of the photographing device 9 may be specified.

The output unit 51 outputs the formed-image data to each of the image display means 20 arranged in the respective refraction units. A printer for printing a formed-image may be connected to the output unit 51. Incidentally, a formed-image may be directly printed on the surface of the refraction means. A formed-image may be printed on a film made of resin, paper, metal or the like, and the film on which the formed-image is printed may be pasted on the surface of the refraction means.

The storage unit 52 is composed of, for example, a hard disk drive, a solid state drive, etc. The storage unit 52 stores the three-dimensional spatial representation data to be displayed on the display device 1.

In addition, the storage unit 52 stores various programs such as an operating system, and various files. The storage unit 52 stores programs to be executed by the control device 50 such as an image generation program, an image adjustment program, etc. Incidentally, the three-dimensional spatial representation data and the various programs may be available from, for example, another server device over the network, or may be recorded in a recording medium and read via a drive device.

The communication unit 53 controls the state of communications with an external device. The control device 50 may be connected to a network such as the Internet wirelessly or by wire via the communication unit 53.

The input unit 54 is, for example, a connector for receiving a signal, etc.

The input/output interface unit 55 conducts interface processing between the output unit 51 and the memory unit 52 etc., and the control unit 56.

The control unit 56 has, for example a CPU (Central Processing Unit) 56a, a ROM (Read Only Memory) 56b, and a RAM (Random Access Memory) 56c. When the CPU 56a reads and executes various programs stored in the ROM 56b or the memory unit 52, the control unit 56 generates image data of a projection picture, or transmits control data or image data of projection light that forms the projection picture on the projection surface of the image display means 20 to the image projection means 21.

The control device 50 may be connected from the outside of the display device 1 or may be installed inside the display device 1. The control device 50 may be a personal computer, a smartphone, a tablet terminal, etc., and may be connected to the image projection means 21 such as a projector and transmit the control data of projection light and the image data to be projected.

The image projection means 21 is, for example, a projector which projects an image on a projection surface. For example, the projector is a CRT (Cathode Ray Tube) projector, a liquid crystal projector, a DMD (Digital Mirror Device) projector, a LCOS (Liquid Crystal On Silicon) projector, a GLV (Grating Light Valve), etc. The image projection means 21 may be a liquid crystal display or an organic EL (Electro Luminescence) display, etc. These displays may be curved, flat, or flexible. The image projection means 21 may project the image on the projection surface by scanning the laser light.

The projector which is one example of the image projection means 21 has a light source lamp, a transmission type or reflection type picture unit, a projection lens, an interface, etc. The interface of the projector is connected to the output unit 53 of the control device 50. The projector acquires formed-image data from the control device 50 via the interface.

The control device 50 may control ON/OFF of the power supply of the image projection unit 21, the projection direction, etc. Moreover, the control device 50 generates a projection image by calculating the projection lens of the image projection means 21, the angle of projection light projected from the image projection means 21 to the image display means 20, the shape of the image display means 20, the surface shape of the refraction means, etc. The control device 50 may generate the image data of the projection image so that a formed-image designed to display the display image on the display device 1 is formed on the surface of the refraction means, and may control the projection light of the image projection means 21 so that the projection image is formed on the projection surface of the image display means 20. The function of controlling the projection light of the image projection means 21 may be provided in the image projection means 21 so that the projection image is formed on the projection surface of the image display means 20.

Figure 14:
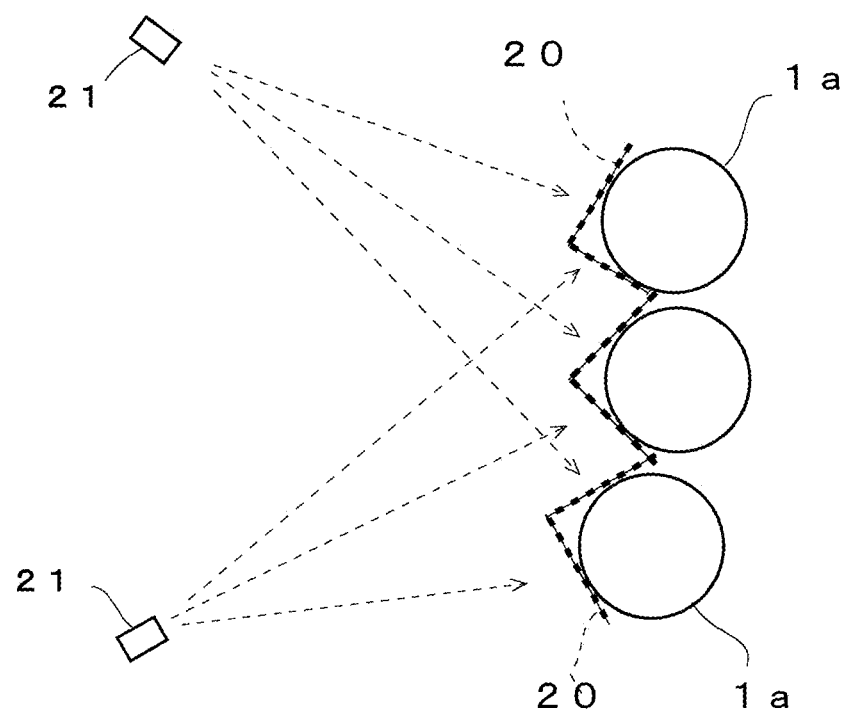
FIG. 14 is a schematic diagram showing a modified example of the image display means.

As shown in FIG. 14, the plurality of image projection means 21 may project the projection light on each surface of the image display means 20 from a plurality of directions (a predetermined part or a predetermined region of the image display means 20). The formed-image of the corresponding surface in the refraction means 1a is formed by the projection image displayed out on each surface of the image display means 20. Incidentally, each surface may be a predetermined part on the curved surface. Even for the image display means 20 having a hemispherical surface shape or curved surface shape, the plurality of image projection means 21 may project the projection light from a plurality of directions onto a predetermined part on the projection surface of the image display means 20.

Herein, the same or similar images in the respective refraction means 1a may be somewhat different; it is sufficient if the three-dimensional spatial representation of the display device 1 can be recognized in the entire partial image of the respective refraction means 1a as viewed from the viewpoint 3.

[2. Operation of Display Device]

Next, the operation of the display device will be described using the drawings.

(2.1 Light Path in Refraction Means)

First, the light path of the refraction means will be described using FIGS. 15, 16A and 16B.

Figure 15:
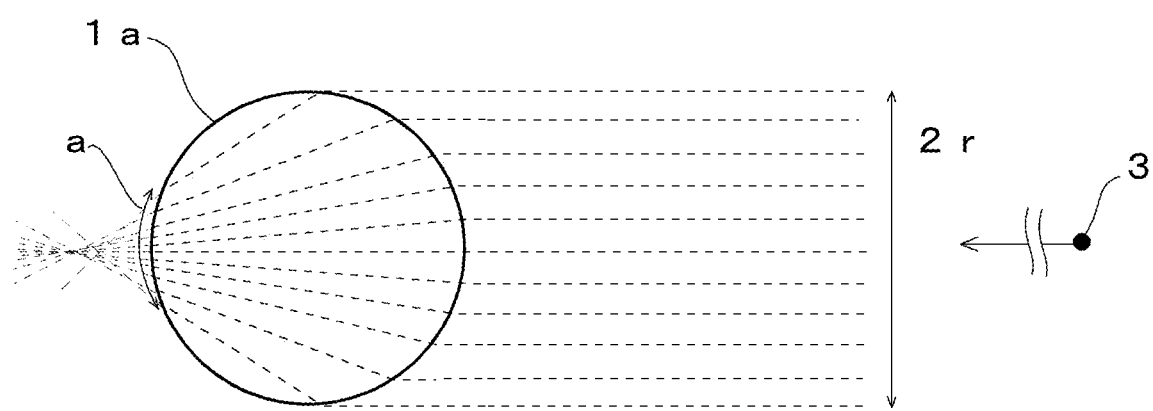
FIG. 15 is a schematic diagram showing an example of light path in the refraction means.

FIG. 15 is a schematic diagram showing an example of light path in the refraction means. FIG. 16A is a schematic diagram showing an example of reflection in a lens having a single convex structure.

Herein, as shown in FIG. 15, consider the case where the size of the refraction means 1a is sufficiently smaller than the distance from the viewpoint 3 to the refraction means 1a. In this case, the distance from the viewpoint 3 to the refraction means 1a can be regarded as infinity (In comparison with the distance between the refraction means 1a and the viewpoint 3, in the case that the refraction means 1a is not small, it is not a parallel light path as shown in FIG. 15, but since the effect is similar, the light path will be explained with reference to FIG. 15).

In the light path (width 2r) of the refraction means 1a having the radius r in section, the parallel light path is refracted by the refraction means 1a, reaches the circular arc portion (length a) of the refraction means 1a on the opposite side to the viewpoint 3 side, and comes out outside the refraction means 1a. Incidentally, since the cross-sectional shape of the refraction means 1a is circular shape, even if the visual direction of the viewpoint 3 is shifted, the same light path is obtained.

Figure 16A:
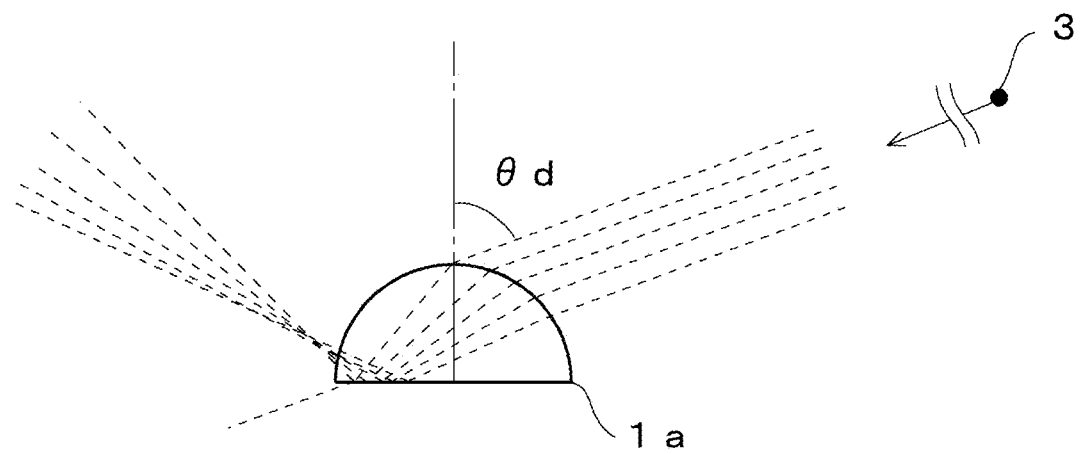
FIG. 16A is a schematic diagram showing an example of reflection in a lens having a single convex structure.
Figure 16B:
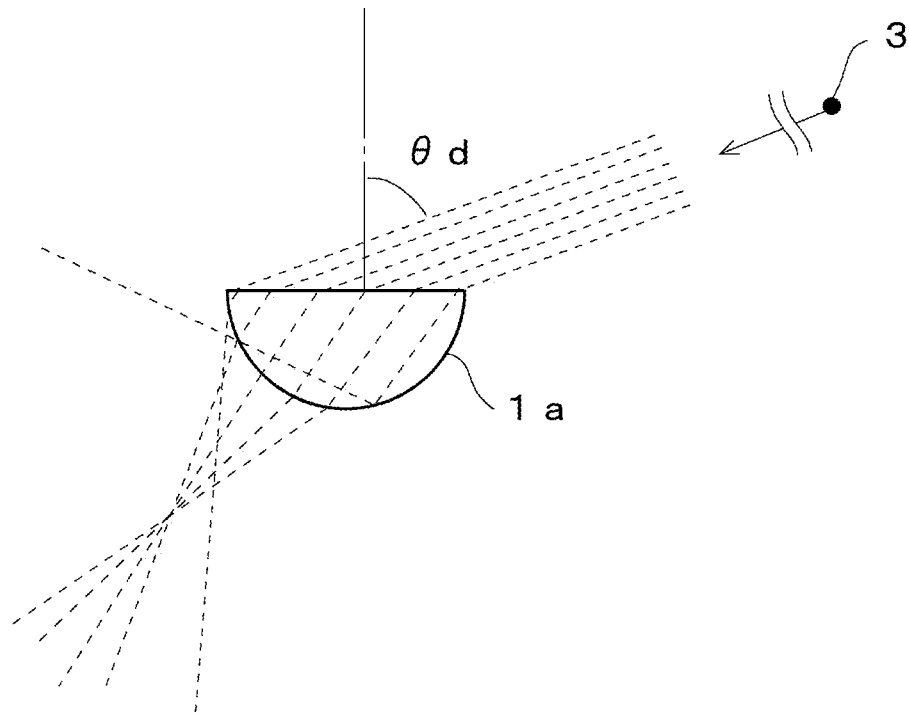
FIG. 16B is a schematic diagram showing an example of reflection in a lens having a single convex structure.

On the other hand, as shown in FIGS. 16A and 16B, in the case that the cross-sectional shape of the refraction means is a semicircle, as the angle θd of the viewing point 3 increases with respect to the normal direction, reflection inside the refraction means (internal reflection) occurs. That is, in the case of a lens having a single convex structure, external light can be seen from the viewpoint 3.

However, as shown in FIG. 15, if the sectional shape of the refraction means 1a is circular shape, there is no reflection inside the refraction means 1a of light incident into the refraction means 1a.

Incidentally, since the arc of the length a is expanded to the width 2 r, the enlargement ratio of the refraction means 1a can be set to approximately 2 r/a.

(2.2 Appearance of Image from Viewpoint)

Figure 17:
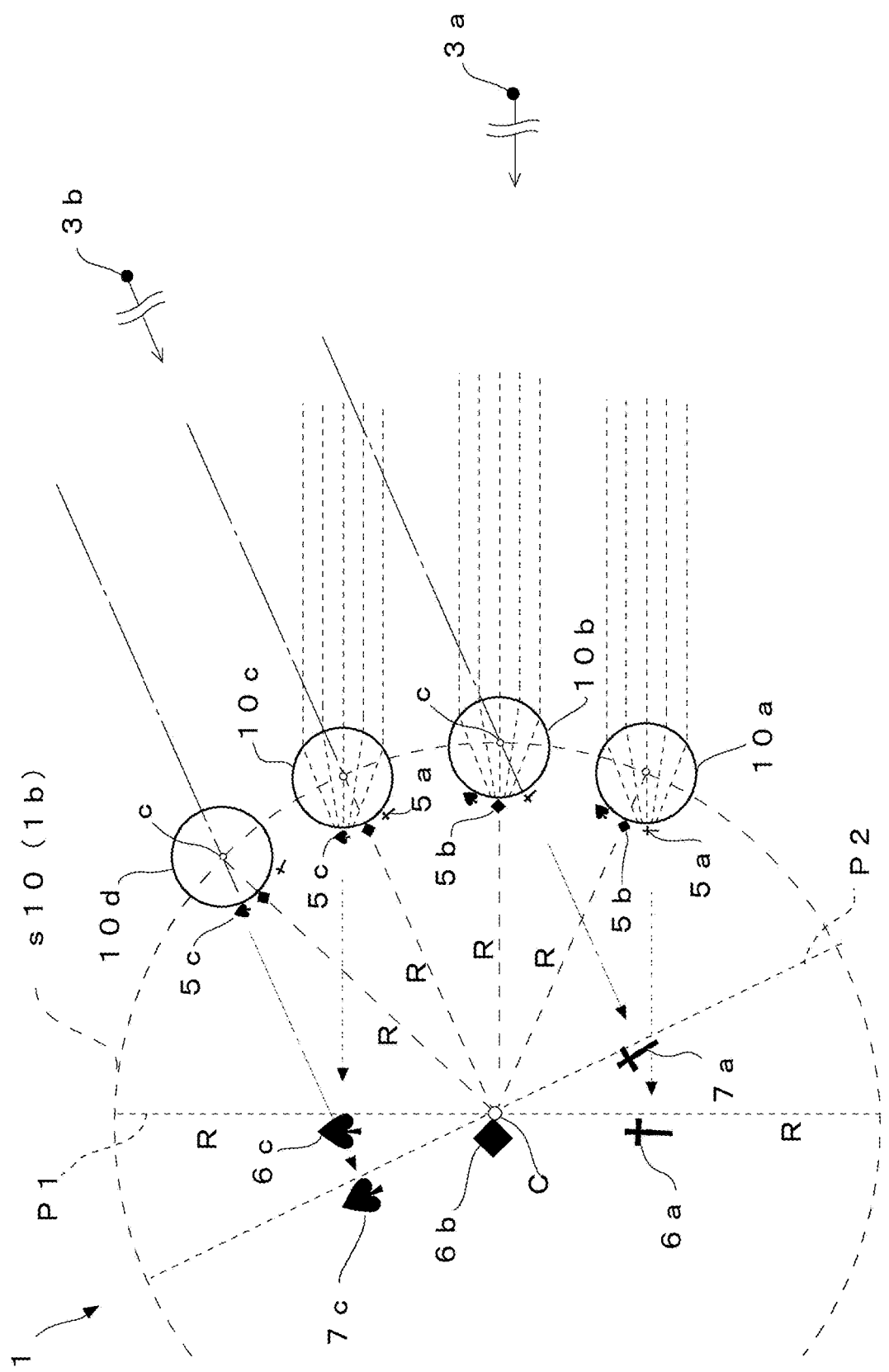
FIG. 17 is a schematic diagram showing an example of relationship between viewpoint and image of each refraction means.
Figure 18:
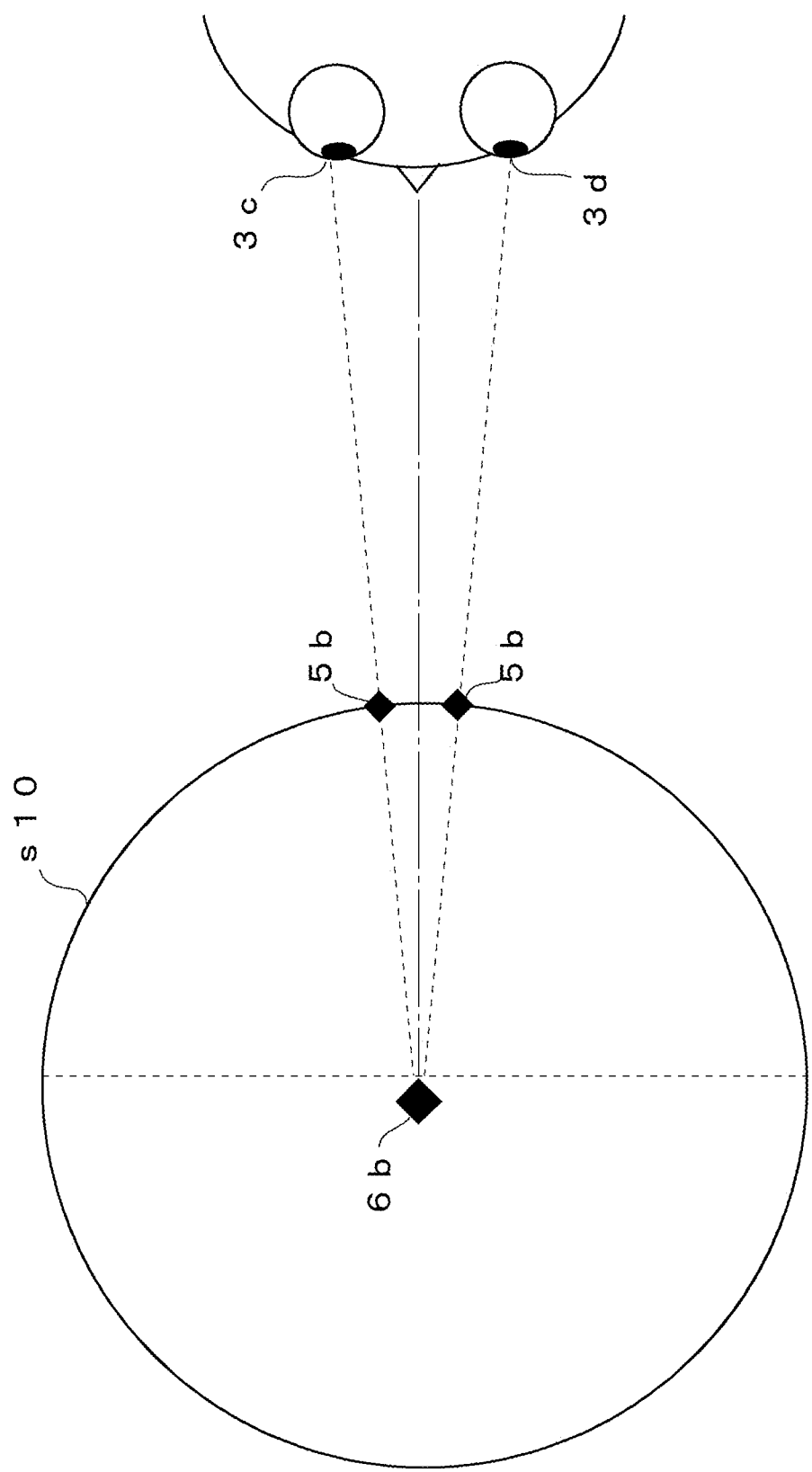
FIG. 18 is a schematic diagram showing an example of relationship between parallax and image.

Next, appearances of the image from each viewpoint will be described using FIGS. 17 and 18. FIG. FIG. 17 is a schematic diagram showing an example of relationship between viewpoint and image of each refraction means. FIG. 18 is a schematic diagram showing an example of relationship between parallax and image.

As shown in FIG. 17, it is assumed that the refraction means 10a, 10b, 10c, 10d are arranged in a circle-shape s10 (an example of a convex shape) with a radius R of the center C by the arrangement support means 1b. The distance between the center c of the refraction means 10a, 10b, 10c, 10d and the center C of the arrangement is R. Incidentally, in the case that the distance between the viewpoint and the lens is not particularly large as compared with the size of the lens or the diameter of the arrangement, the line connecting the viewpoint and each lens becomes radial.

It is assumed that partial image 5a of dagger, partial image 5b of diamond, and partial image 5c of spade are lined up in each refraction means 10a, 10b, 10c, 10d, which is a partial image of a formed-image arranged in the order of dagger, diamond, and spade which are symbols. In this example, it is assumed that the part to be the center of the formed-image is the diamond partial image 5b. Incidentally, the formed-image arranged in the order of dagger, diamond, and spade is formed by being displayed out on the projection surface of the image display means 20 by projection light projected from the image projection means 21. In addition, in the case of the display means described later, the formed-image arranged in the order of dagger, diamond, and spade as the symbol is formed by being displayed on the display surface of the display means.

The partial image 5b of the diamond which is the center part of the formed-image is on the line connecting the center c of the refraction means and the center C of the arrangement of the refraction means. The line connecting the partial image 5 b of the diamond which is the center part of the formed-image and the center c of the refraction means is the normal direction of the circle-shape s10 (an example of a convex shape) having the radius R of the center C. That is, the direction of the partial image 5b of the diamond, which is the center part of the formed-image, is the normal direction of the circle-shape s10 (1b).

When viewing the display device 1 from the viewpoint 3a, the partial image 5a of the dagger is seen centrally in the refraction means 10a, the partial image 5b of the diamond is seen centrally in the refraction means 10b, and a partial image 5c of the spade is seen centrally in the refraction means 10c.

Due to the enlarging function of each refraction means 10a, 10b, 10c, the partial image 5a of the dagger looks like an enlarged partial image 6a from the viewpoint 3a in the refraction means 10a, the partial image 5b of the diamond looks like an enlarged partial image 6b in the refraction means 10b, and the partial image 5c of the spade looks like an enlarged partial image 6c in the refraction means 10c.

Therefore, by combining the partial image 6a of the refracting means 10a, the partial image 6b of the refraction means 10b and the partial image 6c of the refraction means 10c, it is possible to perform three-dimensional spatial representation such that there is a plane perpendicular to the sight line from the viewpoint 3 in the internal space of the display device 1 and on the plane it displays a display synthetic image arranged in the order of dagger, diamond, and spade which are symbols.

On the other hand, when viewing the display device 1 from the viewpoint 3b, the partial image 5a of the dagger is seen centrally in the refraction means 10b, the partial image 5b of the diamond is seen centrally in the refraction means 10c, and a partial image 5c of the spade is seen centrally in the refraction means 10d.

Due to the enlarging function of each refraction means 10b, 10c, 10d, the partial image 5a of the dagger looks like an enlarged partial image 7a from the viewpoint 3b in the refraction means 10b, the partial image 5b of the diamond looks like an enlarged partial image 6b in the refraction means 10c, and the partial image 5c of the spade looks like an enlarged partial image 7c in the refraction means 10d.

Therefore, by combining the enlarged partial image 7a of the refracting means 10b, the enlarged partial image 6b of the refraction means 10c and the enlarged partial image 7c of the refraction means 10d, it is possible to perform three-dimensional spatial representation such that there is a plane perpendicular to the sight line from the viewpoint 3 in the internal space of the display device 1 and on the plane it displays a display synthetic image arranged in the order of dagger, diamond, and spade which are symbols.

As described above, in the case of seeing from the viewpoint 3a and the case of seeing from the viewpoint 3b, it is possible to perform different three-dimensional spatial representation depending on the angle when observing such that differently arranged plane is represented in the internal space of the different display device 1 and such that on the plane it displays a display synthetic image synthesized from the enlarged partial element images of the respective refraction means and arranged in the order of dagger, diamond, and spade which are symbols.

Moreover, in the example of FIG. 17, when viewing the display device 1 while moving from the viewpoint 3a to 3b, it is possible to perform spatial representation such that the display synthetic image arranged in the order of dagger, diamond, and spade as the symbol is displayed on a plane facing the front with respect to a change in the viewpoint direction, while rotating from the plane P1 to the plane P2 with the center C of the arrangement of the refraction means as the central axis in the three-dimensional space represented in the display device.

As shown in FIG. 18, when viewing the display as shown in FIG. 17 with both eyes (viewpoint 3c and viewpoint 3d), each partial image 5b of the diamond in each refraction means near the intersection point can be seen; The respective refraction means is near the intersection point of the circle-shape s10 with the line connecting the viewpoints 3c, 3d with respect to each eye and the center C of the arrangement of the respective refraction means. Therefore, the partial image 5b of the diamond appears to have the enlarged partial image 6b displayed near the center C of the arrangement of the refraction means, which is the intersection point of the sight lines of both eyes. In this way, as well as the three-dimensional spatial representation due to large changes in the viewpoint direction of the viewpoints 3a and 3b when observing, it is also possible to provide the perception of depth such that the distance to the spatial position where the diamond as the symbol is arranged seems to exist in the display device 1, because of a slight angle difference due to the parallax of both eyes when observing from a certain direction.

[3. Operation of Control Device]

The following describes operations of the control device 50 using FIGS. 19 to 26.

(3.1 Operation Example of Image Generation)

Figure 19:
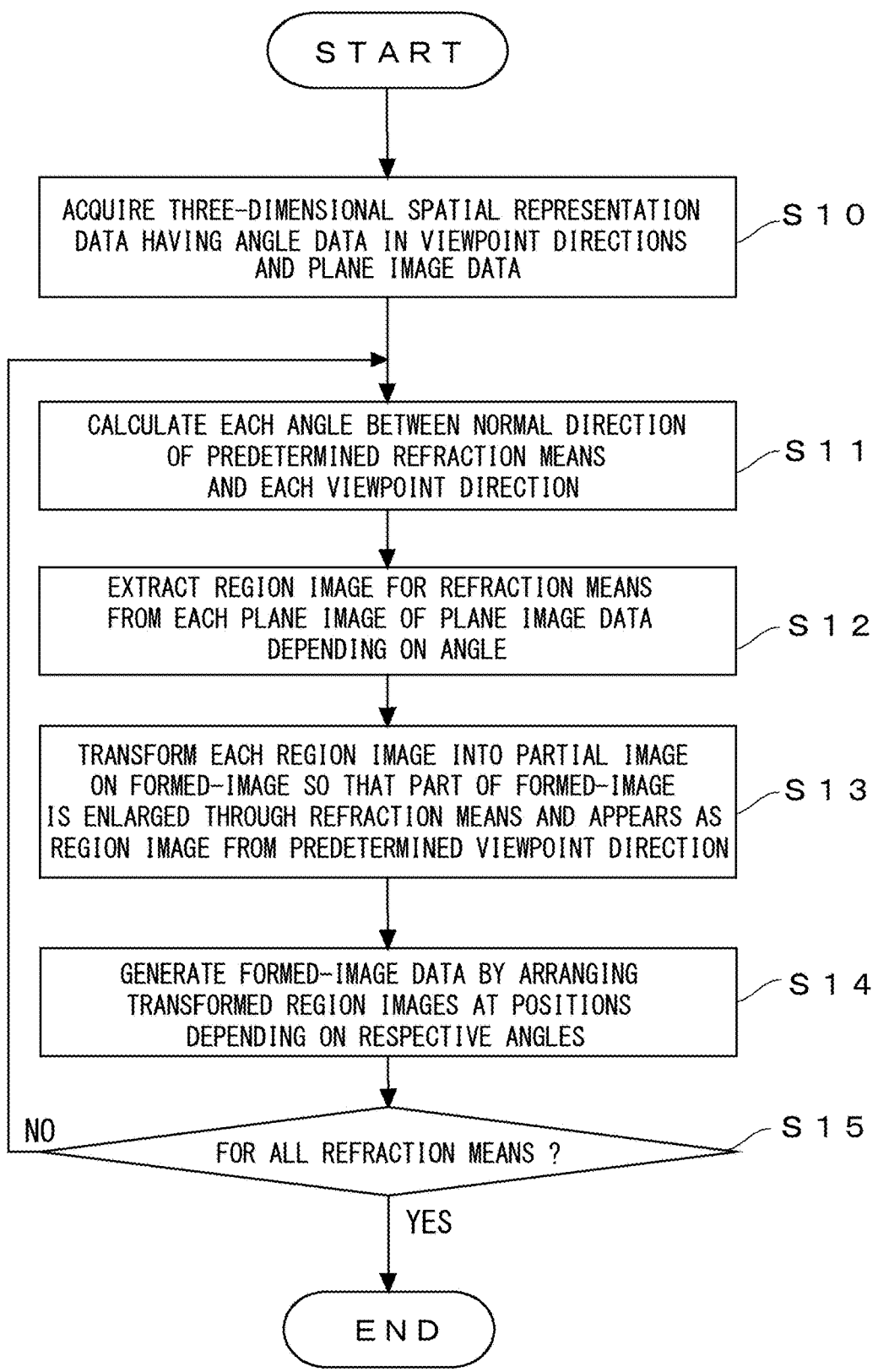
FIG. 19 is a flowchart showing an operation example of image generation in the control device.
Figure 20A:
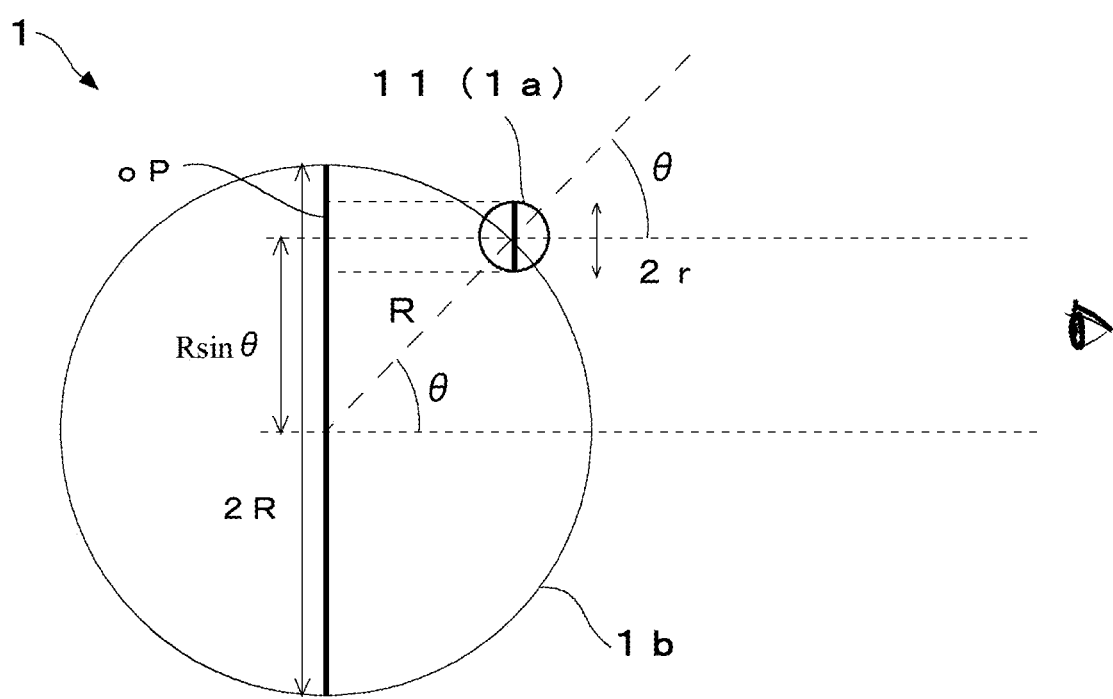
FIG. 20A is a schematic diagram showing a relationship between display synthetic image and display element image.
Figure 21A:
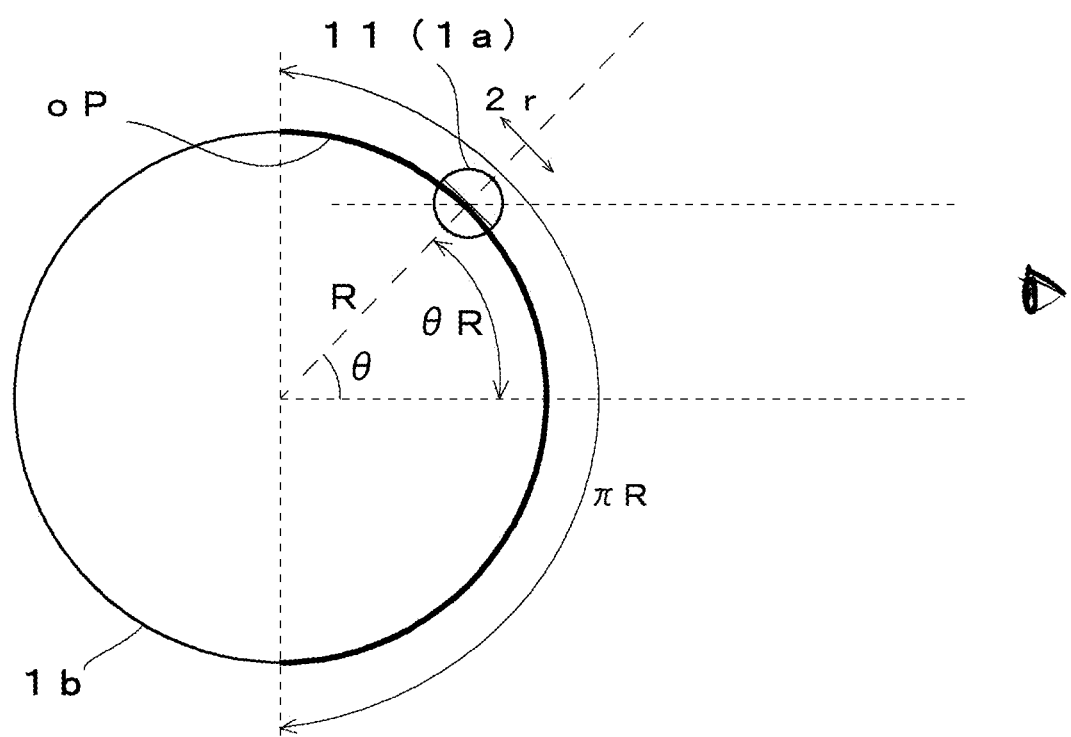
FIG. 21A is a schematic diagram showing a relationship between display synthetic image and display element image.
Figure 21B:
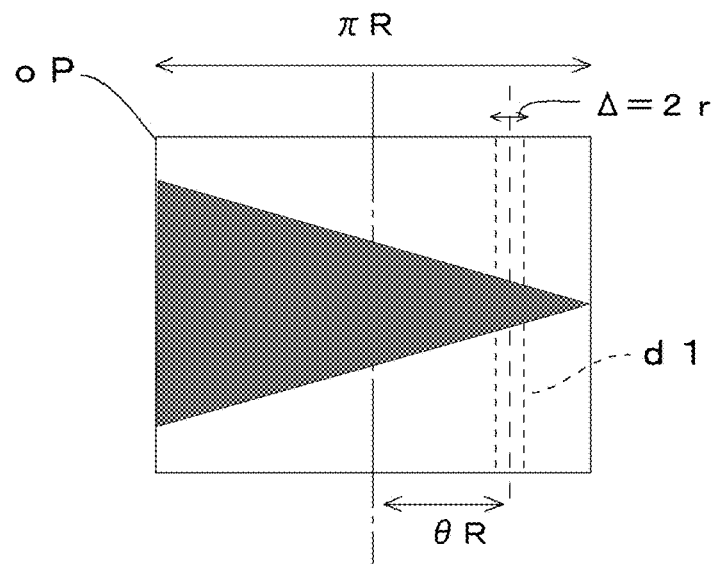
FIG. 21B is a schematic diagram showing an example of plane image viewed from a viewpoint direction of a three-dimensional spatial representation.
Figure 21C:
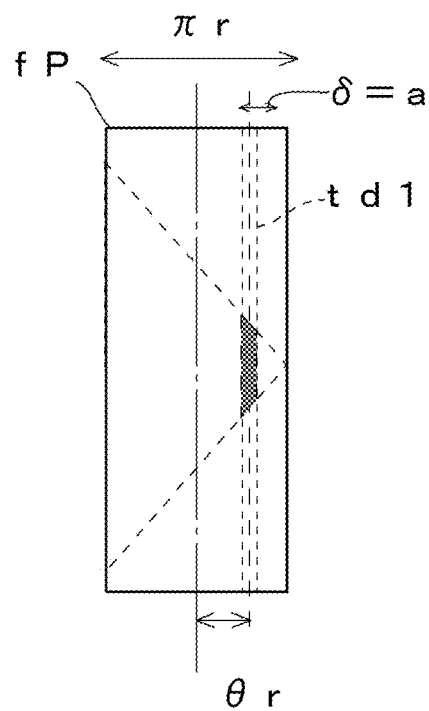
FIG. 21C is a schematic diagram showing an example of the formed-image.
Figure 22A:
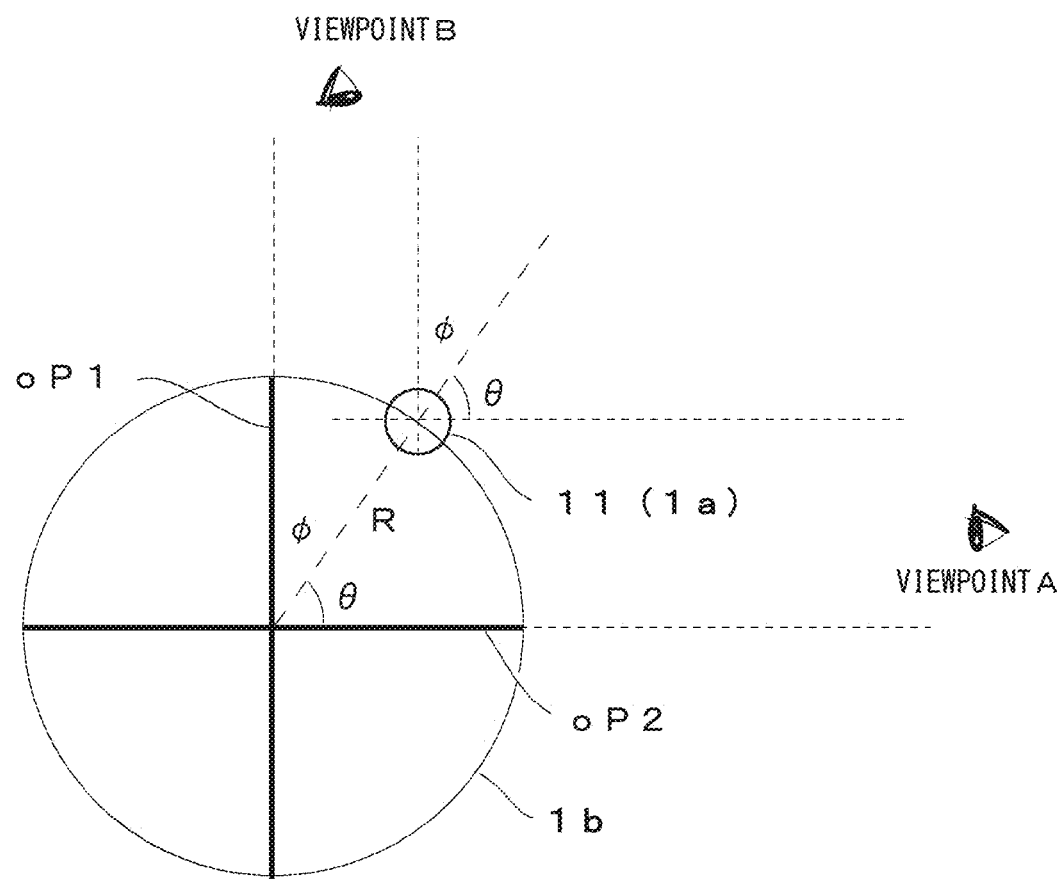
FIG. 22A is a schematic diagram showing a relationship between display synthetic image and display element image.

An operation example of image generation in the control device will be described with reference to FIGS. 19 to 22D, by exemplifying the case where one viewpoint direction is one or two and the round column lens 11 of an example of the refraction means 1a is arranged in a cylindrical shape of an example of a convex shape as shown in FIG. 3B. FIG. 19 is a flowchart showing an operation example of image generation in the control device. FIGS. 20A, 21A and 22A are schematic diagrams showing a relationship between display synthetic image and display element image. FIGS. 20B, 21B, 22B and 22C are schematic diagrams showing an example of plane image viewed from a viewpoint direction of a three-dimensional spatial representation. FIGS. 20C, 21C and 22D are schematic diagrams showing an example of the formed-image.

As shown in FIG. 19, the control device 50 acquires three-dimensional spatial representation data having angle data in one or more viewpoint directions and one or more plane image data corresponding thereto (Step S10). Specifically, the control unit 56 of the control device 50 acquires, based on the angle data of one or more viewpoint directions, plane image data when viewing the three-dimensional spatial representation from each viewpoint direction corresponding to the angle data from the storage unit 52.

Figure 20B:
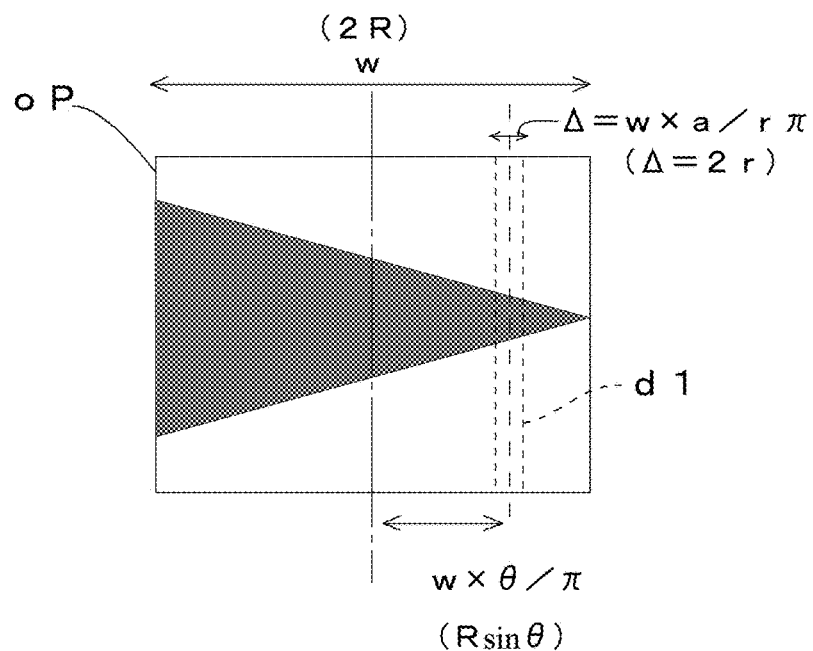
FIG. 20B is a schematic diagram showing an example of plane image viewed from a viewpoint direction of a three-dimensional spatial representation.
Figure 20C:
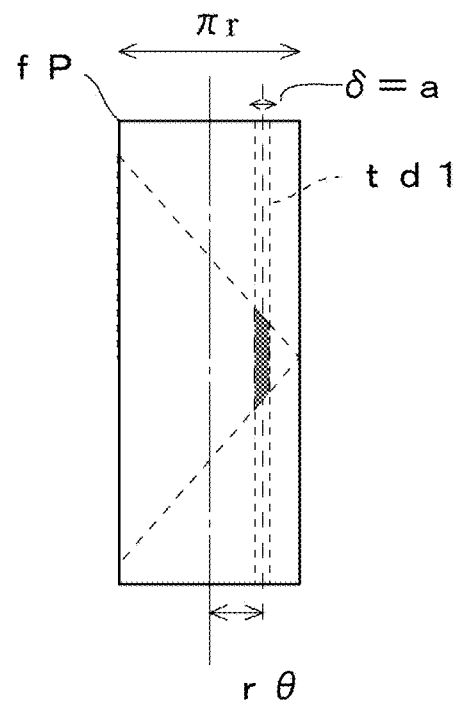
FIG. 20C is a schematic diagram showing an example of the formed-image.

For example, as shown in FIG. 20A, when a certain three-dimensional spatial representation is viewed from a certain viewpoint direction, a plane exists at a position including the central axis of the display device 1, and a plane image oP is assumed on the plane as if there appears to be an image in which a rightward triangle in the figure is drawn, for example, as shown in FIG. 20B. The width of the plane image oP is w, which corresponds to the diameter 2R of the display device 1 (the cylindrical shape arrangement support means 1b).

As shown in FIG. 21A, in the case of one viewpoint direction, a three-dimensional spatial representation may be assumed in which a plane image oP having a convex curved surface exists in the viewpoint direction on the half surface of the surface of the display device 1. As shown in FIG. 21B, the width of the plane image oP corresponds to the semi-circular arc πR of the display device 1 (the cylindrical shape arrangement support means 1b).

Figure 22B:
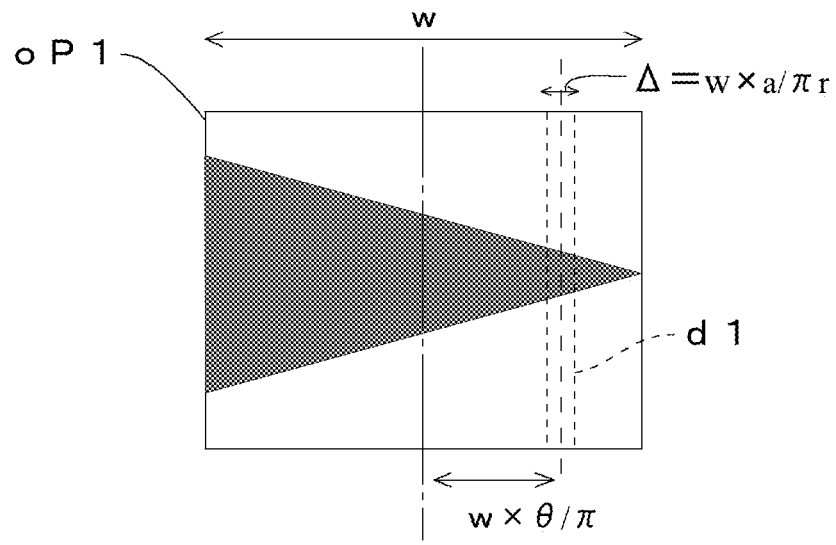
FIG. 22B is a schematic diagram showing an example of plane image viewed from a viewpoint direction of a three-dimensional spatial representation.
Figure 22C:
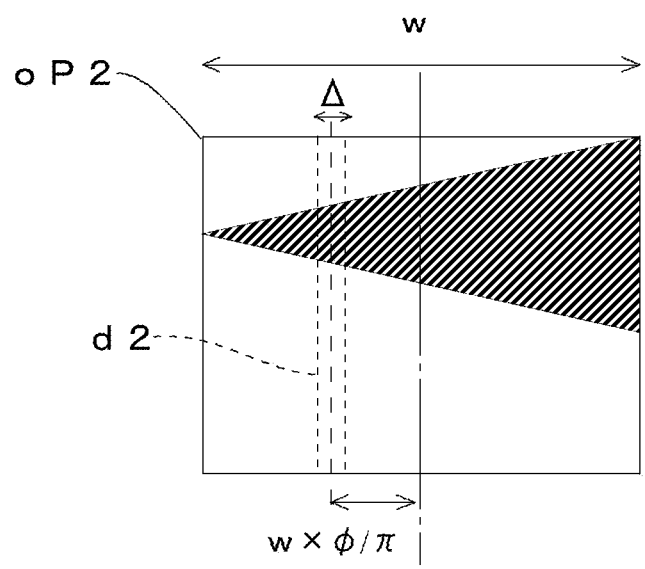
FIG. 22C is a schematic diagram showing an example of plane image viewed from a viewpoint direction of a three-dimensional spatial representation.
Figure 22D:
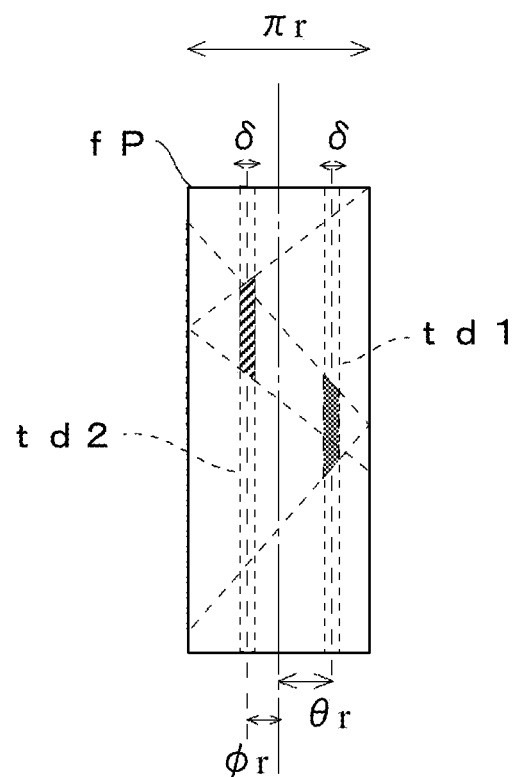
FIG. 22D is a schematic diagram showing an example of the formed-image.

As shown in FIG. 22A, there are different planes as viewed from the two viewpoint directions, and when viewed from the viewpoint A, the image of the a rightward triangle in the figure appears to be in the plane perpendicular to the sight line passing through the center of the cylinder axis, as shown in FIG. 22B; When viewed from the viewpoint B, as shown in FIG. 22C, in the case that the image of the a leftward triangle in the figure appears to be in the plane perpendicular to the sight from the viewpoint B, it looks like the plane image oP1 in FIG. 22B from the viewpoint A, and it looks like the plane image oP2 in FIG. 22C from the viewpoint B. The control unit 56 acquires three-dimensional spatial representation data combining the plane image oP1 and the plane image oP2 with the corresponding angle data.

Incidentally, herein, the case of one viewpoint direction or two viewpoint directions is illustrated, but the number in each viewpoint direction may be equal to the number of refraction means or may be larger than the number of refraction means. The number in each viewpoint direction may be equal to the number of refraction means or may be smaller than the number of refraction means or may be one. The viewpoint direction may be one angle or mangle range such as 0° to 45°, 46° to 90°.

Next, the control device 50 calculates each angle between the normal direction of the predetermined refraction means and each viewpoint direction (Step S11). Specifically, the control unit 56 of the control device 50 selects one refraction means 1a generating a formed-image, and acquires data on the position of the arrangement of the refraction means 1a in the display device 1.

As shown in FIG. 3B, in the case that the round column lens 11 is arranged in a cylindrical shape, the control unit 56 calculates the arrangement angle of arrangement of the round column lens 11 with respect to the central axis of the display device 1 as the normal direction. Incidentally, the control unit 56 may calculate, as a normal line, a straight line extending from the central axis of the display device 1 to the center of one round column lens 11.

The control unit 56 acquires, as data in the viewpoint direction, the viewpoint angle of each viewpoint 3 from the central axis of the display device 1. The control unit 56 calculates each angle between the normal direction and each viewpoint direction from the difference between the arrangement angle of the round column lens 11 and the viewpoint angle of each viewpoint 3. For example, as shown in FIGS. 20A and 21A, the control unit 56 calculates the angle θ. In the case of two viewpoint directions, as shown in FIG. 22A, the control unit 56 calculates an angle θ with respect to the viewpoint A and an angle φ with respect to the viewpoint B for the predetermined round column lens 11. Each calculated angle is an example of an angle defined by a normal direction of the convex shape of the predetermined refraction means and a predetermined viewpoint direction of the viewpoint side.

Next, the control device 50 extracts a region image for the refraction means from each plane image of the plane image data depending on the angle (Step S12). For example, the control device 50 acquires each viewpoint direction and a plane image in each viewpoint direction. More specifically, as shown in FIG. 20B, the control unit 56 of the control device 50 extracts image data of the region image d1 having the width Δ from the image data of the plane image oP at a position wθ/π from the center line of the plane image oP with respect to the angle θ. The width Δ may be wa/(rπ) or the width Δ may be 2r. As shown in FIG. 15, a is the length corresponding to the refractive index of the round column lens, and r is the radius of the round column lens. Alternatively, as shown in FIG. 21B, the control unit 56 may extract the image data of the region image d1 of the width Δ from the image data of the plane image oP at a position θRπ from the center line of the plane image with respect to the angle θ. Incidentally, the width Δ may not exactly be wa/(rπ) or 2r. These are guide values of the width Δ.

As shown in FIG. 22A, in the case of two viewpoint directions, the control unit 56 extracts an region image d1 having a width Δ from the image data of the plane image oP1 at the position of wθ/π from the center line of the plane image oP1 with respect to the angle θ, as shown in FIG. 22B, and extracts an region image d2 having a width Δ from the image data of the plane image oP2 at the position of wφ/π from the center line of the plane image oP2 with respect to the angle φ, as shown in FIG. 22C.

In this manner, the control device 50 functions as an example of the extracting means for extracting an image data of a display element image displayed on each of the refraction means so as to look like three-dimensional spatial representation, from a three-dimensional spatial representation data for three-dimensional-spatially representing a display target in the display device. The control device 50 functions as an example of the extracting means for extracting, as a region image data, each region image corresponding to each of the predetermined refraction means from the plane image data among the three-dimensional spatial representation data.

In addition, the control device 50 functions as an example of the extracting means for extracting, as a region image data, each region image corresponding to each of the predetermined refraction means from the plane image data of the three-dimensional spatial representation in which the display target can be seen from the predetermined viewpoint direction depending on the angle defined by a normal direction of the convex shape in the predetermined refraction means and a predetermined viewpoint direction of the viewpoint side. In this manner, the size (e.g. the width Δ) of the region image is defined in accordance with the size of the refraction means (e.g., the radius r of the lens).

Next, the control device 50 transforms each region image into a partial image on the formed-image so that a part of the formed-image is enlarged through the refraction means and appears as a region image from a predetermined viewpoint direction (Step S13). For example, the control device 50 transforms each region image matching the shape of the formed-image. More specifically, the control unit 56 of the control device 50 generates image data of the partial image td1 obtained by transforming the region image d1 so that the plane image oP is transformed, matching the half surface of one side of the round column lens forming the formed-image fP. For example, as shown in FIG. 20C or FIG. 21C, the control unit 56 generates image data of a partial image td1 having a width δ. The plane image oP is transformed so as to extend lengthwise in the figure, matching the size of the formed-image fP.

As shown in FIG. 22A, in the case of two viewpoint directions, the control unit 56 generates image data of partial images td1, td2 each having a width δ depending on the viewpoint direction, as shown in FIG. 22D.

Next, the control device 50 generates the formed-image data by arranging the transformed region images at positions depending on the respective angles (Step S14). Specifically, the control unit 56 of the control device 50 generates the image data of the formed-image fP in which the partial image td1 having the width δ is arranged at the position rθ from the center line of the formed-image fP, for example, as shown in FIG. 20C or FIG. 21C.

As shown in FIG. 22A, in the case of two viewpoint directions, the control unit 56 arranges a partial image td1 having a width δ of the viewpoint A at a position rθ from the center line of the formed-image fP and generates image data of the formed-image fP in which the partial image td2 having the width δ of the viewpoint B is arranged at the position of rφ, as shown in FIG. 22D.

In this manner, the control device 50 functions as an example of the image generating means for generating a formed-image data for forming the formed-image in the opposite side to the viewpoint side of the predetermined refraction means so that the display element image can be displayed by a light having passed through the predetermined refraction means. The control device 50 functions as the image generating means for transforming each of the region image so as to conform to the shape of the opposite side surface of the predetermined refraction means, arranging each of the transformed region image at a position depending on the angle corresponding to each of the region image, and generating the formed-image data for forming the formed-image of the predetermined refraction means.

Moreover, the control device 50 functions as the image generating means for transforming the region image so as to conform to the shape of the opposite side surface of the predetermined refraction means, arranging the transformed region image at a position depending on the angle corresponding to the region image, and generating the formed-image data for forming the formed-image of the predetermined refraction means.

Next, the control device 50 determines whether or not it generated the formed-image data for all the refraction means of the display device 1 (Step S15).

In the case of generation the formed-image data for all the refraction means (Step S15; NO), the control device 50 performs the processing of steps S11 to S14 on the next refraction means. Specifically, the control unit 56 performs the processing of steps S11 to S14 on the adjacent round column lens 11.

In the case of generating the forming image data for all the refraction means (Step S15; YES), the control device 50 ends the process.

The control device 50 transmits the formed-image data to the image projection means 21. The image projection means 21 projects the projection light based on the formed-image data on the image display means 20 and the formed-image corresponding to the formed-image data is formed in each refraction means 1a. According to the viewpoint direction, the display element images of the refraction means 1a are seen, and the display synthetic image depending on the viewpoint direction is displayed in the display device 1. Incidentally, in the case of the display means described later, the control device 50 transmits the formed-image data to each display means.

Incidentally, in FIG. 20A to FIG. 21C, by exemplifying one viewpoint direction, a three-dimensional spatial representation has been described in the case where a plane image appears to be present in a three-dimensional space from only a predetermined viewpoint direction. Moreover, in FIG. 22A to FIG. 22D, by exemplifying two viewpoint directions, a three-dimensional spatial representation has been described in the case where a plane image appears to be present in a three-dimensional space from only two predetermined viewpoint directions. The control device 50 may perform the processing from step S10 to step S15 on a three-dimensional spatial representation in which a plane image appears to be present in three-dimensional space from three or more viewpoint directions. Furthermore, by changing the viewpoint direction, the control device 50 can represent such that one space changes to a space that is different one after another at a viewing angle, in the case of acquiring a plurality of plane images in a three-dimensional space viewed from a plurality of series of viewpoint directions in step 10.

In this manner, the control device 50 functions as an example of the extracting means for extracting each region image corresponding to each predetermined refraction means from each plane image data of each of the three-dimensional spatial representation data viewed from each viewpoint direction as region image data, depending on each angle defined by each of a plurality of series of viewpoint directions in the viewpoint direction and the normal direction in the predetermined refraction means. Moreover, the control device 50 functions as the image generating means for transforming each of the region image so as to conform to the shape of the opposite side surface of the predetermined refraction means, arranging each of the transformed region image at a position depending on the angle corresponding to each of the region image, and generating the formed-image data for forming the formed-image of the predetermined refraction means.

(3.2 Case of Representing Solid Object)

Next, generation of a formed-image from the real object of a three-dimensional object will be described with reference to FIGS. 23A to 23E. Incidentally, in the display device, as shown in FIG. 3B, a case where the round column lens 11 of an example of the refraction means 1a is arranged in a cylindrical shape of an example of a convex shape will be described.

Figure 23A:
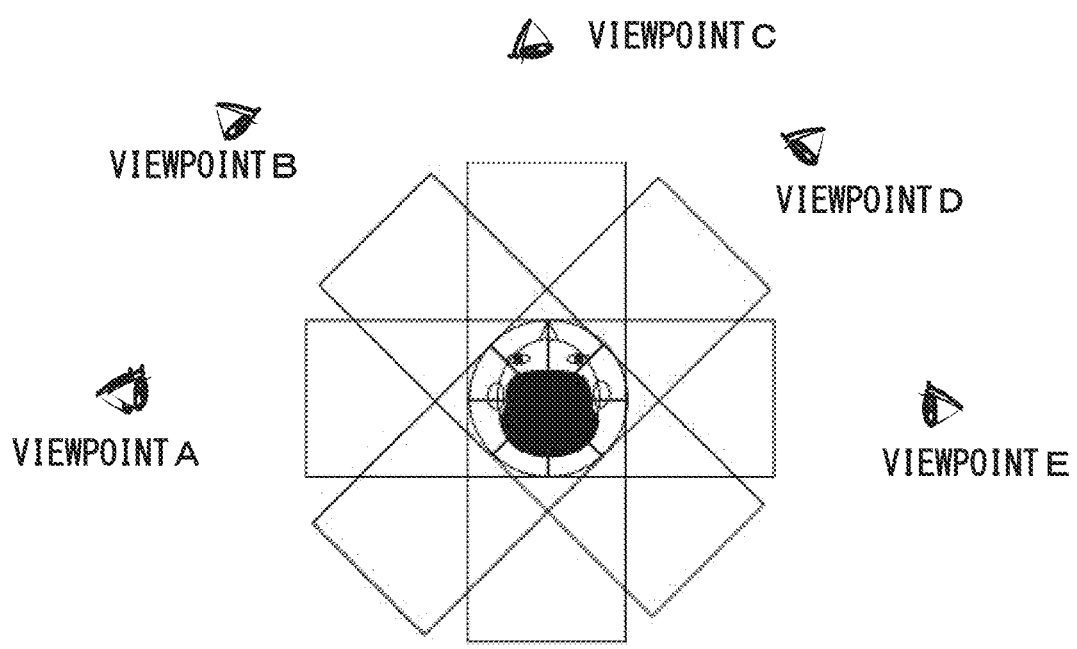
FIG. 23A is a schematic diagram showing an example of viewpoints for a three-dimensional spatial representation.
Figure 23B:
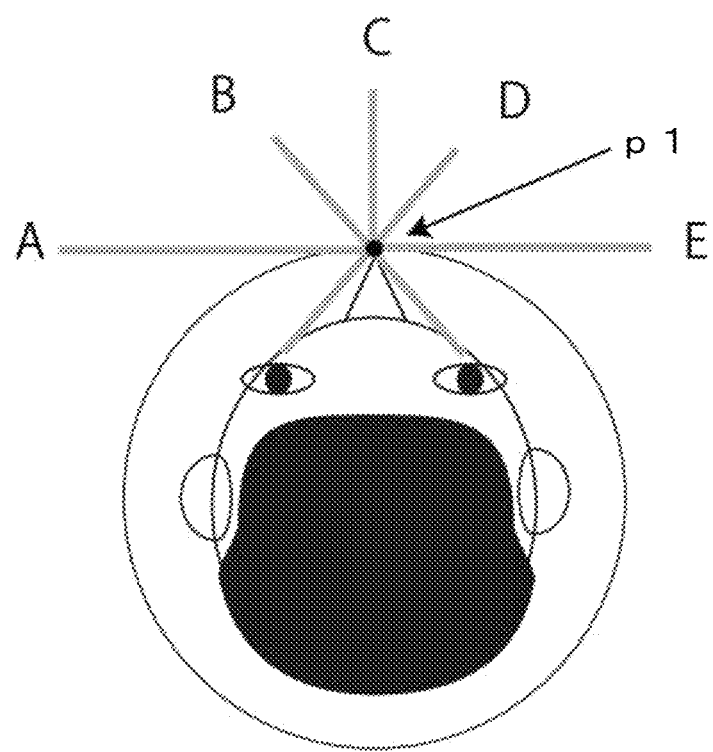
FIG. 23B is a schematic diagram showing an example of a way of defining a focus point for a three-dimensional spatial representation.
Figure 23C:
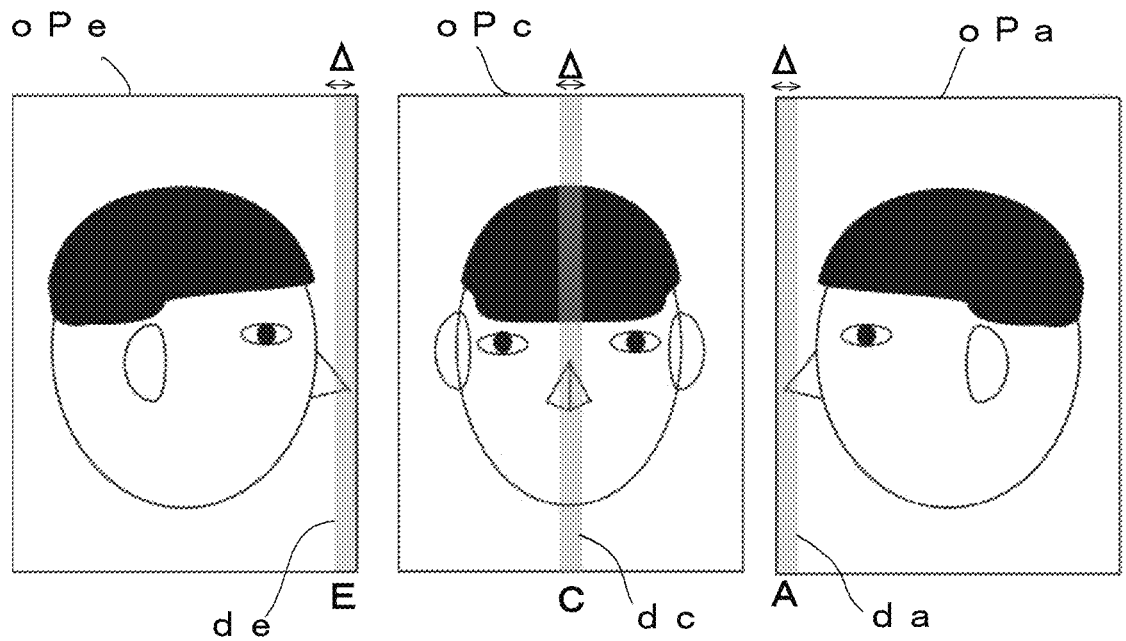
FIG. 23C is a schematic diagram showing an example of planes image viewed from a plurality of viewpoint s direction of a three-dimensional spatial representation.
Figure 23D:
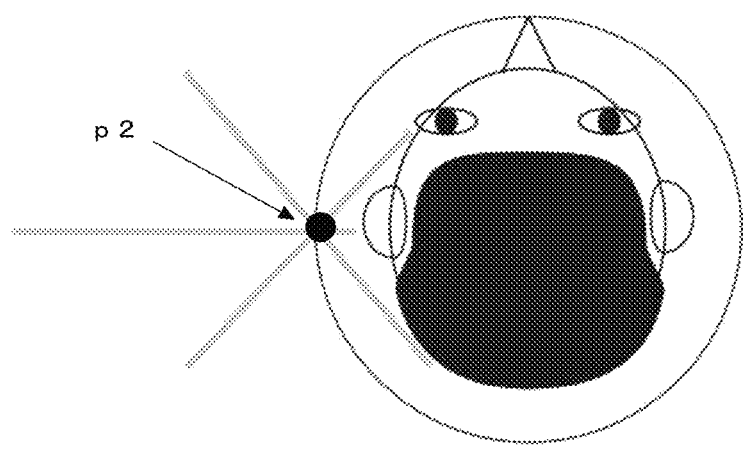
FIG. 23D is a schematic diagram showing an example of a way of defining a focus point for a three-dimensional spatial representation.
Figure 23E:
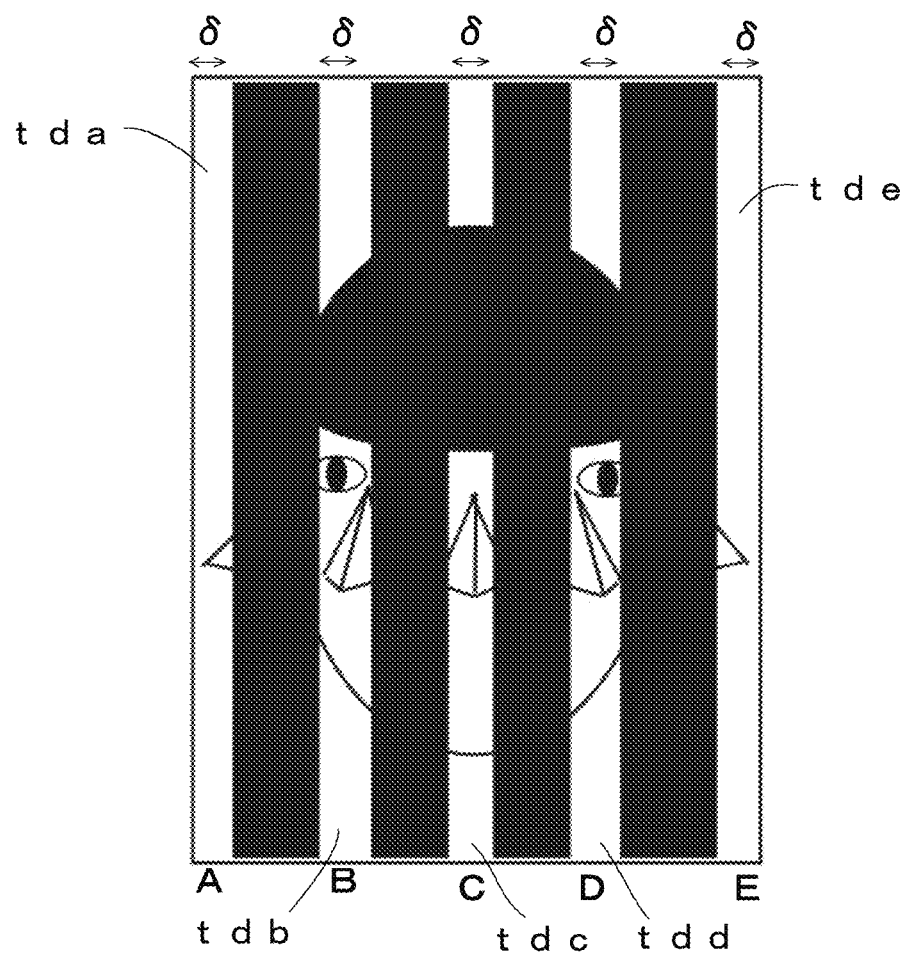
FIG. 23E is a schematic diagram showing an example of the formed-image.

FIG. 23A is a schematic diagram showing an example of viewpoints for a three-dimensional spatial representation. FIG. 23B and FIG. 23D are schematic diagrams showing an example of a way of defining a focus point for a three-dimensional spatial representation. FIG. 23C is a schematic diagram showing an example of planes image viewed from a plurality of viewpoint s direction of a three-dimensional spatial representation. FIG. 23E is a schematic diagram showing an example of the formed-image.

As shown in FIG. 23A, a three-dimensional spatial representation (for example, a human face) that is a real object of a solid will be described for the case of a viewpoint A (a viewpoint looking the face from the lateral direction), a viewpoint B (a viewpoint in an oblique direction of 45°), a viewpoint C (a viewpoint of a person looked from the front direction), a viewpoint D (a viewpoint in an oblique direction of 45°), and a viewpoint E (a viewpoint looking the face from the lateral direction).

First, in step 10, as shown in FIG. 23C, the control device 50 acquires three-dimensional spatial representation data at each viewpoint. The three-dimensional spatial representation data is composed of data of a plane image seen in case of viewing a three-dimensional spatial representation from one or more viewpoint directions and angle data of a viewpoint direction that looks like that.

The control device 50 corresponds to each refraction means and sets points around the three-dimensional spatial representation, in the case that it is designed to see the solid of the head of the person of the three-dimensional spatial representation (an example of a solid object in real space) in a column (it is assumed that the refraction means is arranged on the surface of this column), as shown in FIG. 23B. For example, in the case of generating an image seen from the front of the face, which is a three-dimensional spatial representation, the control device 50 sets the point p1 (corresponding to a predetermined refraction means) as shown in FIG. 23B corresponding to the predetermined round column lens 11.

In step S11, the control device 50 calculates the outward direction at the point p1 (predetermined refraction means) and the angle of each viewpoint direction. For example, as shown in FIG. 23B, the control device 50 calculates the angle between the angle of the round column lens 11 corresponding to the front of the face (corresponding to the direction from the center of the display device 1 to the round column lens 11 (an example in the normal direction)) and each viewpoint direction of viewpoints from A to E.

Incidentally, although the plane image to a certain viewpoint direction in the three-dimensional spatial representation may be an image obtained by photographing the three-dimensional spatial representation from each viewpoint direction, the control device 50 may generate image data of a plane image from each viewpoint direction from the three-dimensional data in three-dimensional spatial representation.

In this manner, the control device 50 functions as an example of the original data generating means for generating the three-dimensional spatial representation data for representing a three-dimensional space in the display device from a solid object in real space. For example, image data projected in a plane according to the viewpoint direction (angle) is created by a method such as photographing a solid object with a camera, and by linking the image data with angle data, it is possible to generate three-dimensional spatial representation data to be input to the information processing device.

As shown in FIG. 23C, in step 12, when seeing the column from various viewpoint directions A to E, the control device 50 extracts a partial image seen at the point p1 from each plane image (for example, the plane image oPa, the plane image oPc, the plane image oPe) data. The control device 50 extracts a region image of a width Δ (for example, the region images de, dc, da as shown in FIG. 23C) according to the angle between the angle of each viewpoint and the angle of the round column 11 corresponding to the front of the face. A region image for viewpoints from A to E is extracted from the portion close to the surface of three-dimensional real thing, that is, the nose portion (point p1) in front of the face.

Three-dimensional spatial representation is recognized, by allowing each part of the represented solid object or space to be seen from a wide viewpoint direction as long as it is not hidden in other parts as shown in FIG. 23B, and by allowing information from different angles of solids and spaces corresponding to each viewpoint direction to be seen as shown in FIG. 23C.

In the examples of FIGS. 23B and 23C it can be recognized as if the nose actually exists near the point p1 in the three-dimensional space, by being able to see the nose from the direction of 180 degrees centering on the front of the face and by seeing the nose seen from the left, the front and the right respectively on the left side, the center and the right side of the whole space as shown in FIG. 23C, when looking at the face from the left (−90 degrees), the front (0 degrees), and the right (+90 degrees). In a display device with a single convex lens, since the range visible from each viewpoint direction is narrow, it is difficult to represent, for example, the three-dimensional space of the whole image from the three angles in FIG. 23C. In the case of the nose in FIG. 23C, a nose is seen from the viewpoint direction at the front (0 degree), but when looking from the left (−90 degrees) and the right (+90 degrees), the nose cannot be seen because it is not in the center part of the plane image. Therefore, a display device and an information processing device which can confirm a wide region of a plane image from a wide viewpoint direction are required.

Incidentally, as shown in FIG. 23D, in the case of another predetermined refraction means 1a, the control device 50 sets various viewpoint directions at a point p2 corresponding to the refraction means 1a.

In this manner, the control device 50 functions as an example of the extracting means for extracting each region image corresponding to each predetermined refraction means from each plane image data of the three-dimensional spatial representation data as region image data, depending on each angle defined by each of a plurality of series of viewpoint directions in the viewpoint direction and the normal direction in the predetermined refraction means.

In step S13, as shown in FIG. 23E, the control device 50 transforms the region image of each viewpoint into a partial image of width δ.

In step S14, as shown in FIG. 23E, the control device 50 creates a formed-image by arranging a partial image of each viewpoint at a position depending on the angle between each viewpoint direction at the point p1 and the angle of the round column lens 11 corresponding to the front of the face, and generates a formed-image data of this predetermined round column lens 11. For example, transformed partial images tda, tdb, tdc, tdd, tde are arranged. Incidentally, regarding blackening in FIG. 23E, when the viewpoint direction is set finely, the transformed partial image is arranged depending on the viewpoint direction.

If "NO" in the step S15, the control device 50 likewise generates formed-image data for other points, that is, for the other round column lens 11 as well.

When formed-image data is generated for each round column lens 11, when the control device 50 transmits these formed-image data and the display device 1 displays them, it is possible to display an image in which the three-dimensional spatial representation appears to exist in the display device 1. Incidentally, in the case of a moving image in which the three-dimensional spatial representation changes with time (for example, in the case of a human face, moving the mouth or blinking), the control device 50 generates these formed-image data for each frame image In this manner, the control device 50 functions as an example of the image generating means for transforming each of the region image so as to conform to the shape of the opposite side surface of the predetermined refraction means, arranging each of the transformed region image at a position depending on the angle corresponding to each of the region image, and generating the formed-image data for forming the formed-image of the predetermined refraction means.

By the way, in the case that the refraction means is a single convex lens, the displayable range becomes narrow. Therefore, in the case that the refraction means is a single convex lens, it is difficult to realize a three-dimensional spatial representation which can confirm a wide area of representation space from wide viewpoint directions.

(3.3 Region Image in Case that Ball Lens 10 is Arranged in Spherical Shape)

Figure 24A:
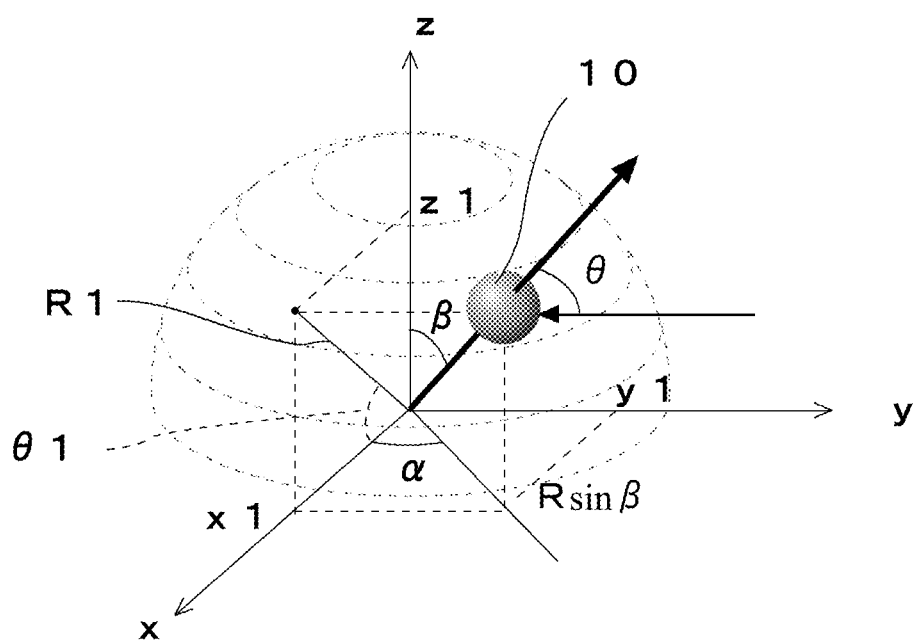
FIG. 24A is a schematic diagram showing an example of a positional relationship of arrangement of a refraction means.
Figure 24B:
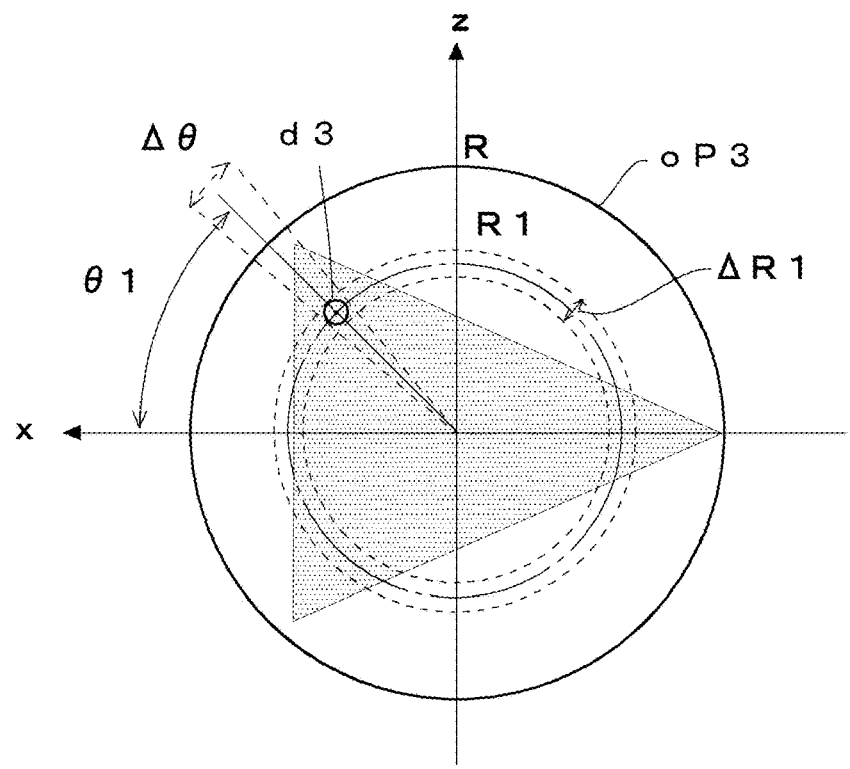
FIG. 24B is a schematic diagram showing a relationship between display synthetic image and display element image.
Figure 24C:
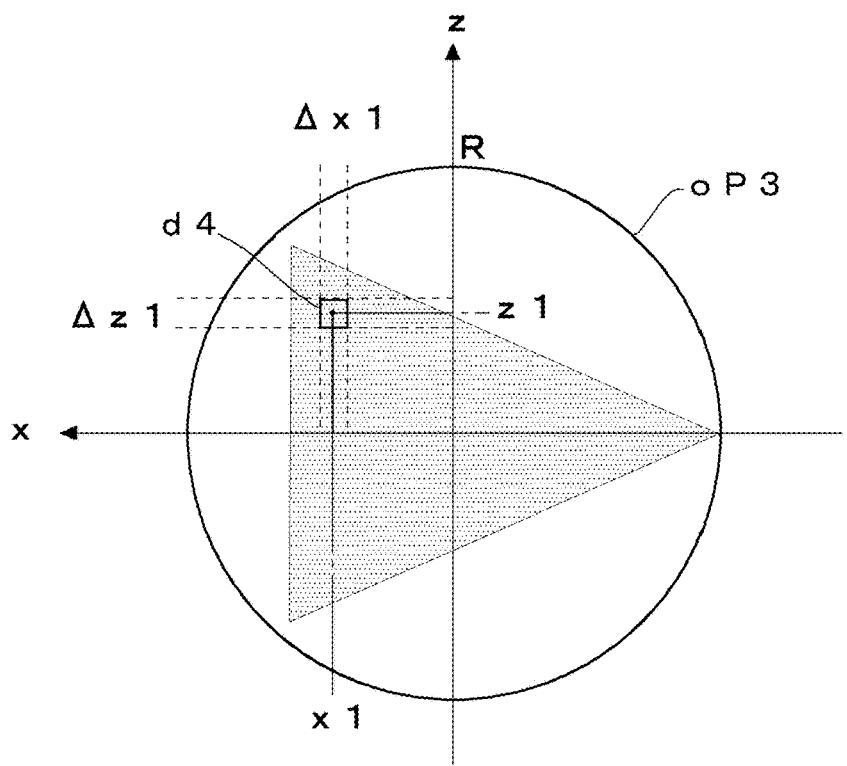
FIG. 24C is a schematic diagram showing a relationship between display synthetic image and display element image.

Next, a region image in the case that the ball lens 10 is arranged in a spherical shape will be described using FIGS. 24A to 24C. FIG. 24A is a schematic diagram showing an example of a positional relationship of arrangement of a refraction means. FIG. 24B and FIG. 24C are schematic diagrams showing a relationship between display synthetic image and display element image.

As shown in FIG. 24A, for explanation, one predetermined ball lens 10 is taken out from the display device 1 in which the ball lens 10 is three-dimensionally arranged as shown in FIG. 3A.

As shown in FIG. 24A, the coordinate of the predetermined ball lens 10 is assumed to be the coordinates (x1, y1, z1) in the xyz coordinate system. An angle formed by a line (length R) connecting the origin and a predetermined ball lens 10 and the z axis is defined as an angle β. The angle β is an angle between the line (length R) connecting the origin point and the predetermined ball lens 10 and the z axis, an angle formed by the x axis and a line obtained by projecting a line connecting the origin and a predetermined ball lens 10 onto the xy plane is defined as an angle α. When x1=R sin β cos α and z1=R cos β and the plane image is the xz plane, the positional relationship of the predetermined ball lens 10 in the plane image is θ1=arctan(z1/x1), R12=x12+z12.

As shown in FIG. 24B, in the polar coordinate display, the region image d3 has a circle-shape with a diameter of ΔR 1 or Δθ1 at the position of coordinates (R1, θ1). Incidentally, the region image d3 may be a fan-shaped region of ΔR1, Δθ at the position of coordinates (R1, θ1).

As shown in FIG. 24C, in the Cartesian coordinate display, the region image d3 has a circle-shape with a diameter Δx1 or Δz1 centered on the position of the coordinates (x1, z1). Incidentally, the region image d3 may be a rectangular region of Δx1, Δz1 at the position of the coordinates (x1, z1).

(3.4 Modified Example of Operation of Image Generation)

Figure 25:
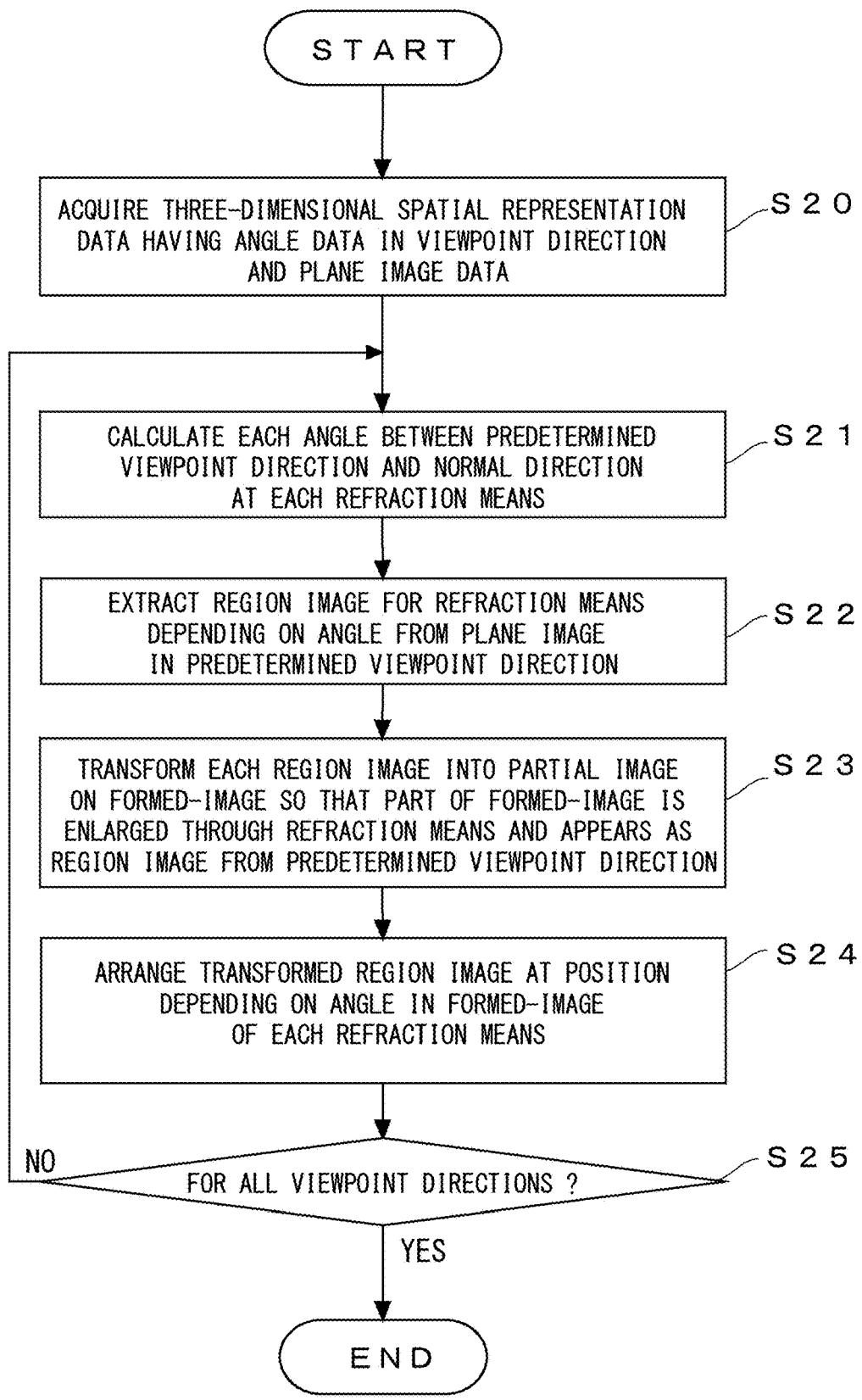
FIG. 25 is a flowchart showing a modified example of an operation of image generation in the control device.

Next, a modified example of the image generation operation will be described using FIG. 25. FIG. 25 is a flowchart showing a modified example of an operation of image generation in the control device 50.

In this modified example, the control device 50 generates a formed image by determining a predetermined viewpoint direction instead of determining predetermined refraction means, generating a partial image of the formed-image in each refraction means, and then sequentially generating partial images for each viewpoint direction.

As shown in FIG. 25, as in step S 10, the control device 50 acquires three-dimensional spatial representation data having angle data in the viewpoint direction and plane image data (Step S20).

Next, the control device 50 calculates each angle between the predetermined viewpoint direction and the normal direction at each refraction means (Step S21). The angle between the viewpoint direction and the normal direction in the refraction means is calculated as in step S 11.

Next, the control device 50 extracts a region image for the refraction means depending on the angle from the plane image in the predetermined viewpoint direction (Step S22). As in step S12, region images depending on angles are extracted from a plane image in a predetermined viewpoint direction.

Next, as in step S13, the control device 50 transforms each region image into a partial image on the formed-image so that a part of the formed-image is enlarged through the refraction means and appears as a region image from a predetermined viewpoint direction (Step S23).

Next, the controller 50 arranges the transformed region image at the position depending on the angle in the formed-image of each refraction means (Step S24). As in step S14, the control device 50 arranges the transformed region image (partial image) at a position depending on the angle, partial images are sequentially arranged in the formed-image by each refraction means, and gradually formed-images are formed.

Next, the control device 50 determines whether or not it has been executed for all the viewpoint directions (Step S25).

In the case of not being executed for all the viewpoint directions (Step S25; NO), the control device 50 performs the processing of steps S21 to S24 with respect to the next viewpoint direction.

In the case of being executed for all the viewpoint directions (Step S25; YES). The control device 50 ends the process. In this way, formed-image data is generated.

(3.5 Operation Example of Image Adjustment)

Figure 26:
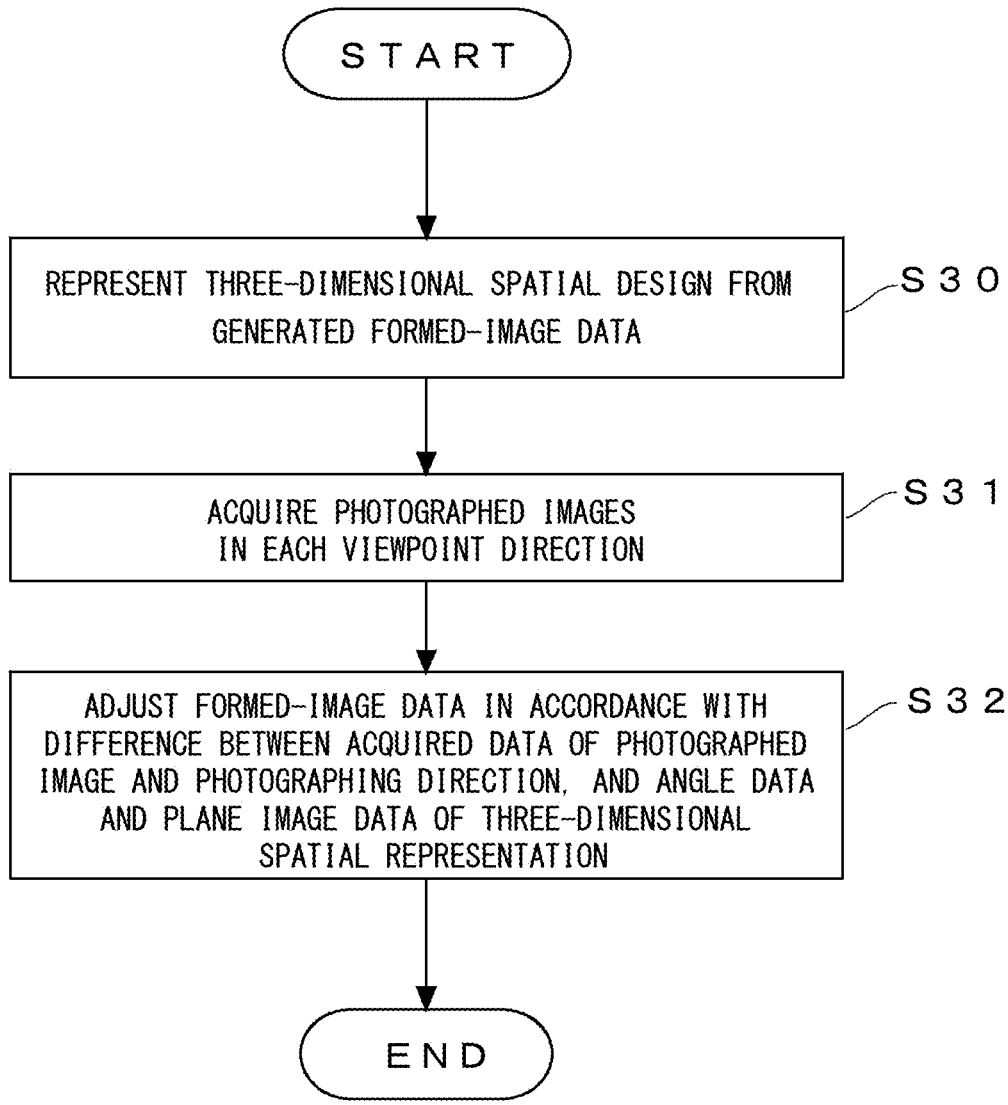
FIG. 26 is a flowchart showing an operation example of image adjustment in the control device.

Next, an operation example of image adjustment after the image is displayed in the display device 1 will be described using FIG. 26. FIG. 26 is a flowchart showing an operation example of image adjustment in the control device 50.

As shown in FIG. 26, the control device 50 represents a three-dimensional spatial design from the generated formed-image data (Step S30). Specifically, the control unit 56 of the control device 50 transmits the formed-image data to the image projection means 21 such as a projector. The image projection means 21 projects the projection light based on the formed-image data on the image display means 20 and the formed-image according to the formed-image data is formed in each refraction means 1a. According to the viewpoint direction, the display element images of each refraction means 1a are seen, the display synthetic image depending on the viewpoint direction is displayed on the display device 1, and a three-dimensional spatial design is represented.

Next, the control device 50 acquires photographed images in each viewpoint direction (Step S31). Specifically, the control unit 56 controls the position of the photographing device 9 (sets the photographing direction and the photographing distance) and transmits a command signal to the photographing device 9 to photograph, and the photographing device 9 photographs the three-dimensional spatial design represented in the display device 1 from each viewpoint direction. The control unit 56 acquires the image data of the photographed image and the data of the photographing direction from the photographing device 9.

In this manner, the control device 50 functions as an example of the image acquiring means for acquiring an image data of a photographed image obtained by photographing the three-dimensional spatial representation displayed by the generated formed-image data from a predetermined photographing direction.

A correspondence relationship between the points on the formed-image and the points of the image obtained by photographing the display device with the photographing device 9 may be grasped by a method of flickering the formed-image for each partial region.

Next, the control device 50 adjusts the formed-image data in accordance with difference between the acquired data of the photographed image and the photographing direction, and the angle data and the plane image data of the three-dimensional spatial representation (Step S32). Specifically, when the data of the photographing direction and the angle data of the three-dimensional spatial representation coincide with each other, the control unit 56 compares the photographed image data and the plane image data respectively corresponding to the angle data. The difference is obtained by comparing a partial image corresponding to each refraction means 1a (a partial image corresponding to the photographing direction of the photographing device 9) in the photographed image data and to a region image corresponding to the photographing direction of the photographing device 9 and the normal direction of each refraction means 1*a* in the plane image corresponding to the photographing direction of the photographing device 9. For example, it is the displacement magnitude and direction of the position between the partial image and the region image to be compared, or the difference in size and the difference in shape etc. between the partial image and the region image to be compared.

In case of comparing the region image with the partial image corresponding to each refraction means 1*a*, the control section 56 may extract feature points (contours, internal points, etc.) by image processing and compare the feature points with each other.

In this manner, the control device 50 functions as an example of the image adjusting means for adjusting the formed-image data in accordance with difference between data of the photographed image and the photographing direction, and the angle data and the plane image data of the three-dimensional spatial representation.

Incidentally, when adjusting the formed-image data, the control device 50 may perform adjustment using the region image extracting step in step S12 or step S22. The control device 50 may perform adjustment using the transformation step of the region image in step S13 or step S23. The control device 50 may perform adjustment using the transformed region image arrangement step in step S 14 or S 24.

In this manner, the control device 50 functions as an example of the image adjusting means for adjusting the formed-image data by adjusting the image data of the display element image extracted by the extracting means. The control device 50 functions as an example of the image adjusting means for adjusting the formed-image data by at least one of adjusting the manner of transformation or adjusting the manner of arrangement.

Herein, an example of the cause of the difference is that the material of the lens as the refraction means is not homogeneous, that the shape of the lens is not exactly the same as the design, that the arrangement of the lenses (the relationship between the lenses, the relationship between the lens and the formed-image (or the image forming means for forming it)) is not exactly the same as the design, that the position of the image forming means for forming the formed-image or the image is not exactly the same as the design, and that the lens shape and material are not the same as the original design due to changes with time. In addition, an example of the cause of the difference is that the position of the projector and the angle of the projection light are not exactly the same as the design in the case of using the image projection means (for example, a projector) and the image display means (for example, a screen) for the image forming means, that the position and shape of the screen are not exactly the same as the design, and that the position of the reflection means and the shape of the reflecting surface are not exactly the same as the design in case of the reflection means is used between the projector and the screen. It is that the position and the shape of the display are not exactly the same as the design in the case that the display is used for the image forming means, etc. Moreover, due to the installation environment of the place where the display device 1 is installed, the position of the viewpoint in the viewpoint direction is different, in which the display device 1 is normally seen. For example, in a certain viewpoint direction, in the case that there is an obstacle and the viewpoint distance from the display device 1 is close, since the synthetic display image seems to be larger, the difference may occur.

Next, the control unit 56 corrects the formed-image data so that the difference between the photographed image and the plane image is reduced. For example, in the case of the displacement between the partial image and the region image to be compared, the control section 56 corrects the formed-image data based on the magnitude and direction of the displacement.

Incidentally, after the correction, the control unit 56 may repeat the process so that the photographing device 9 performs photographing, further corrects the formed-image data, and reduces the difference as much as possible.

The control unit 56 performs image adjustment so as to change the photographing direction and minimize the difference from the plane image in each viewpoint direction as much as possible. As described above, according to the control device 50 for the display device 1 of the present example, the region image data of the display element image displayed on each refraction means is extracted so as to look like a three-dimensional spatial representation from plane image data in which display target can be seen from a predetermined viewpoint direction; in accordance with the formed-image data generated on the basis thereof, the display element image is displayed on the refraction means for refracting light and having a circle-shaped cross section in the display device 1. Accordingly, it is possible to represent a three-dimensional spatial design that can be seen from a wide viewpoint direction in the display device 1.

It is possible to represent a three-dimensional spatial design in the display device, by extracting, as a region image data, each region image corresponding to each of the predetermined refraction means from the plane image data among the three-dimensional spatial representation data, transforming each of the region image so as to conform to the shape of the opposite side surface of the predetermined refraction means, arranging each of the transformed region image at a position depending on the angle corresponding to each of the region image, and generating the formed-image data for forming the formed-image of the predetermined refraction means.

In addition, It is possible to easily change the display image to be displayed on the display device according to the viewpoint direction because of extracting the image data of the region image depending on the angle defined by the refraction means and the viewpoint direction, arranging each of the transformed region image at a position depending on the angle corresponding to each of the region image, and generating the formed-image data.

In case of extracting the region image data of the display element image according to the size of the refraction means 1*a*, it is possible to extract the region image corresponding to the size of the refraction means.

In the case of a plane image in a plurality of series of viewpoint direction, it is possible to perform three-dimensional spatial representation such that there are different planes in the display space continuously depending on the viewing angle and images are displayed there.

Moreover, in case of generating the three-dimensional spatial representation data for representing a three-dimensional space in the display device from a solid object in real space or a 3DCG data, it can be represented as if the space in which the solid object is arranged exists in the display device 1.

In the case that the control device 50 acquires an image data of a photographed image obtained by the photographing device 9 by photographing the three-dimensional spatial representation displayed from the generated formed-image data and adjusts the formed-image data in accordance with difference between the photographed image and the plane image, images with less distortion can be displayed. The display device 1 can represent an optimum three-dimensional spatial design according to the place where the display device 1 is installed.

In case of adjusting the formed-image data by adjusting a forming manner in the formed-image, the display device 1 can represent optimum three-dimensional space design.

In case of adjusting the formed-image data by adjusting the image data of the display element image extracted (for example, the region image), since it is adjusted from the stage of extracting the region image, it is possible to make large adjustments.

In case of adjusting the formed-image data by at least one of adjusting the manner of transformation or adjusting the manner of arrangement, it is possible to make fine adjustments.

In case of forming the formed-image from an image printed based on the formed-image data, the three-dimensional space design can be represented on the display device.

In addition, by changing the projection image by controlling the projection light of the image projection means 21, it is possible to easily change the three-dimensional spatial representation to be represented on the display device 1, because the projection light outputted from the image projection means 21 falls on the projection surface of the image display means 20 to form the projection image, by the projection image an image is displayed out on the back side of the projection surface of the image projection means 20, and the displayed-out image can be seen through each refraction means 1*a* from the viewpoint 3 side.

It is not necessary to re-attach or reprint an image for each refraction means. In the prior art, it is difficult to display a moving image because the degree of freedom of changing the image to be displayed is low, but according to the display device 1 according to the present example, it is possible to perform three-dimensional spatial representation in which shape and arrangement change according to moving images and time.

By temporally changing the projection light projected onto the projection surface of the image display means 20 from the image projection means 21 and projecting a moving image on the projection surface of the image display means 20, it is possible to easily realize a three-dimensional spatial representation in which the shape and arrangement change with a moving image or time in the display device 1. Moreover, since the projection light is projected from the image projection means 21 onto the projection surface of the image display means 20 to display the moving image, it is not necessary to provide the wiring for each refraction means 1*a*, so that the wiring becomes simple.

When viewing the display device 1 with both eyes, since the refraction means 1*a* is arranged in a convex shape with respect to the viewpoint 3 side, the synthetic image appears to be exit in the display device 1 due to parallax. When projection light of a moving image is projected, it appears to perform three-dimensional spatial representation in which shape and arrangement change according to moving images and time inside the display device 1 if viewed with both eyes.

In the case where the image display means 20 is provided on the surface of the refraction means 1*a* on the opposite side, there is no need to provide another image display means 20, the number of parts is reduced, and the cost can be reduced.

In the case where a projection image is projected onto the projection surface of the image display means 20 by projection light projected from a plurality of directions to form a formed-image on the refraction means 1*a*, the dead angle of projection can be reduced.

In the case of further including image projection means such as a projector, since it is not necessary to install a display such as a liquid crystal display or an organic EL display on each refraction means, the wiring becomes simple.

Since the arrangement support means 1*b* supports each refraction means 1*a* so that the center part of the formed-image faces in the normal direction of the convex shape, in the case where the same formed-image is formed in each refraction means 1*a*, the display device 1 makes it possible to represent what is the same three-dimensional space even if the viewing angle is changed. Moreover, the display device 1 makes it possible to represent various three-dimensional spatial designs according to the formed-image of each refraction means 1*a*.

In the case where the convex shape has a circular-shaped cross section, the distortion of the synthetic image displayed by the display device 1 is reduced. Moreover, even when the user changes the viewing angle, it is possible to see three-dimensional spatial designs with less distortion.

By the way, since each lens of the lenticular lens is a single convex structure having a flat surface, when the viewing angle exceeds a predetermined value, reflection of light from the inside of the lens occurs (internal reflection) on the flat surface of the lens, so there was a problem that a sufficient viewing angle could not be secured. Furthermore, in Patent Literature 1, in order to reduce the influence of external light from the surroundings, a light shielding means such as a slit formed in a lattice pattern on a black thin plate is provided. For this reason, there is a problem that the image becomes dark due to the light shielding means, and that there is a problem that images cannot be displayed or the image is hard to see and visibility deteriorates especially outside the center part of the cylindrical shape.

However, according to the display device 1 in the case where the refraction means 1*a* has a circular-shaped cross section, since the refraction means 1*a* has a circular cross section, it is possible to prevent deterioration of visibility due to reflection of external light from the surroundings of the display device 1 inside the refraction means 1*a* (internal reflection), it becomes unnecessary to provide a light shielding means such as a slit for blocking external light, the image displayed by the display device 1 becomes bright, and the visibility is improved.

In this way, by improving the visibility when the refraction means 1*a* has a circular-shape cross section, it is possible to ensure a wide display range with high visibility for the display device 1 and the practicality of the display device 1 can be enhanced.

In addition, since the viewing angle of each refraction means 1*a* is expanded, it is possible to display a large image on the entire display surface of the display device 1 as seen from the viewpoint 3 side. On the other hand, with a lens having a single convex structure, since the viewing angle of each refraction means is narrow due to internal reflection, it is impossible to display a large image displayed out on the entire display surface of the display device as seen from the viewpoint 3 side.

In addition, in the case that the shape of the refraction means 1*a* is spherical or round column-form, it is possible to substantially eliminate internal reflection of the refraction means 1*a* against external light from the surroundings of the display device 1. In this case, the viewing angle of each refraction means 1*a* increases.

In the case where the shape of the refraction means 1*a* is spherical like the ball lens 10, the degree of freedom of arrangement is improved such that the spherical refraction means 1*a* is arranged on a spherical surface or on the surface of an ellipsoid, etc.

In the case that the shape of the refraction means 1*a* is a spherical shape such as the ball lens 10 and the arrangement support means 1*b* arranges each refraction means 1*a* in a spherical shape, the display device 1 can display a similar image for the movement of the viewpoint 3 from the stereoscopic direction as well as the planar movement of viewpoint 3. In the case that the shape of the refraction means 1*a* is a spherical shape such as the ball lens 10 and the arrangement support means 1*b* arranges the refraction means 1*a* in a cylindrical shape, it is possible to install the display device 1 on a building pillar, etc.

In the case that the shape of the refraction means 1*a* is column-form like a round column lens and the arrangement support means 1*b* arranges each refraction means 1*a* in a cylindrical surface shape, it is possible to install the display device 1 on a building pillar, etc.

[Examples of Display Device]

Next, a specific example corresponding to the above-described embodiment will be described using the drawings.

(First Example of Display Device)

An example in the case where the refraction means 1*a* is the ball lens 10 will be described using FIGS. 27, 28 A and 28 B.

Figure 27:
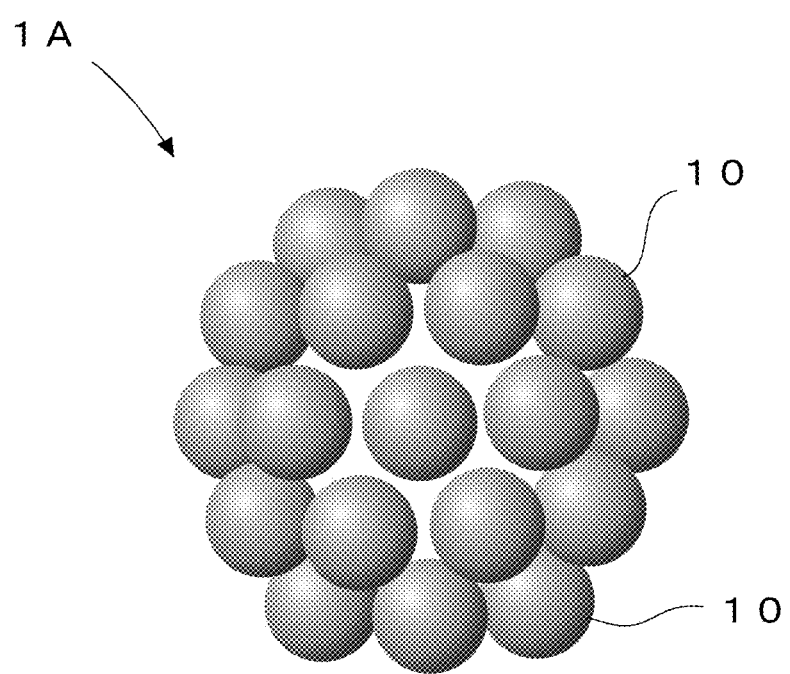
FIG. 27 is a schematic diagram showing an example of arrangements of ball lens in the first example of the display device.

As shown in FIG. 27, the display device 1A is an embodiment in which a plurality of ball lenses 10 are arranged on a spherical surface.

Incidentally, although not shown in FIG. 27, an image display means 20 having a hemisphere shape is formed as a screen surface on the hemisphere surface of each ball lens 10. On each ball lens 10, as shown in FIG. 9B, a projection image of the letter "E" is displayed out on the projection surface of the image display means 20 of each ball lens 10 from the inside of the display device 1A by projection light from the image projection means 21, the formed-image is formed on the opposite side surface to the viewpoint of the ball lens 10. The central part of the formed-image faces the center of the spherical surface of the display device 1A. That is, the direction from the center part of the formed-image to the center of the ball lens 10 is the normal direction of the spherical surface.

In addition, a hole for embedding each ball lens 10 is empty on the surface of the plastic having a spherical surface shape, and each ball lens 10 is embedded halfway.

Figure 28A:
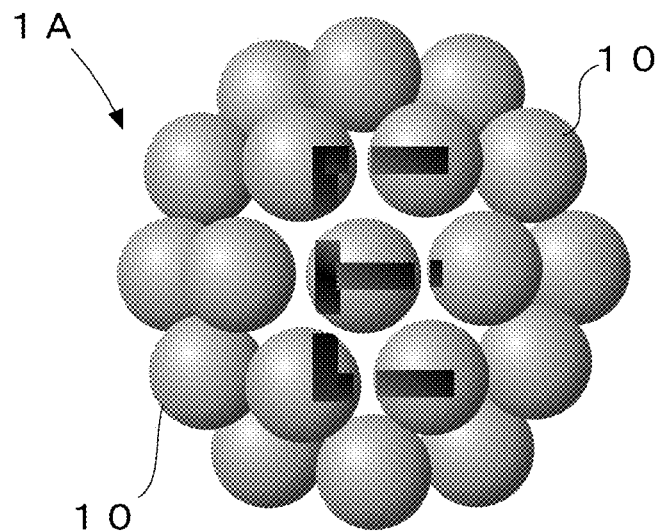
FIG. 28A is a schematic diagram showing an example of displays in the first example of the display device.

As shown in FIG. 28A, the image (synthetic display image) "E" synthesized from the partial images (display element images) of each ball lenses 10 serving the respective parts of the image "E" is displayed on the display device 1A.

Incidentally, in both eyes, the image "E" appears to be existed inside the display device 1A.

Figure 28B:
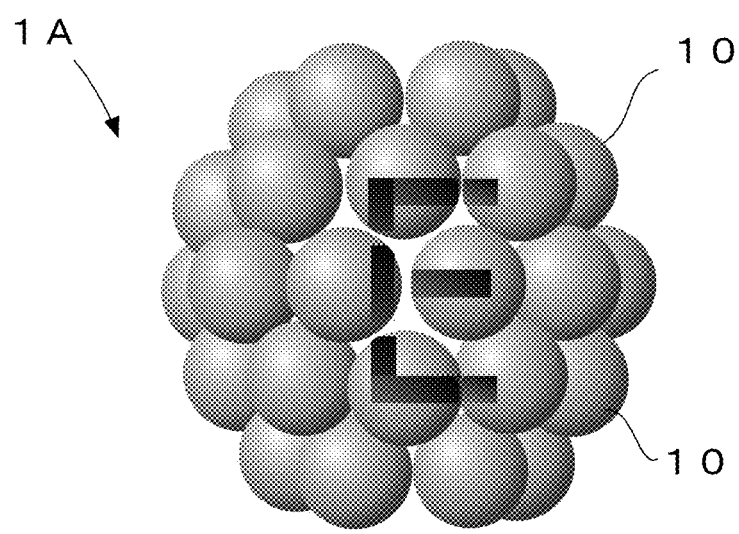
FIG. 28B is a schematic diagram showing an example of displays in the first example of the display device.

As shown in FIG. 28B, even if the viewpoint is shifted, the image "E" looks the same. Incidentally, as shown in FIG. 28B, the ball lens 10 serving the respective parts of the image "E" is different from the case shown in FIG. 28A.

When the image projection means 21 projects projection light forming different projection images on the projection surface of the image display means 20 by the control device 50, different images are displayed on the display device 1A. The display device 1A can easily display various images in addition to image "E".

Incidentally, the shape of the display device may be a hemispherical surface, etc.

Figure 29:
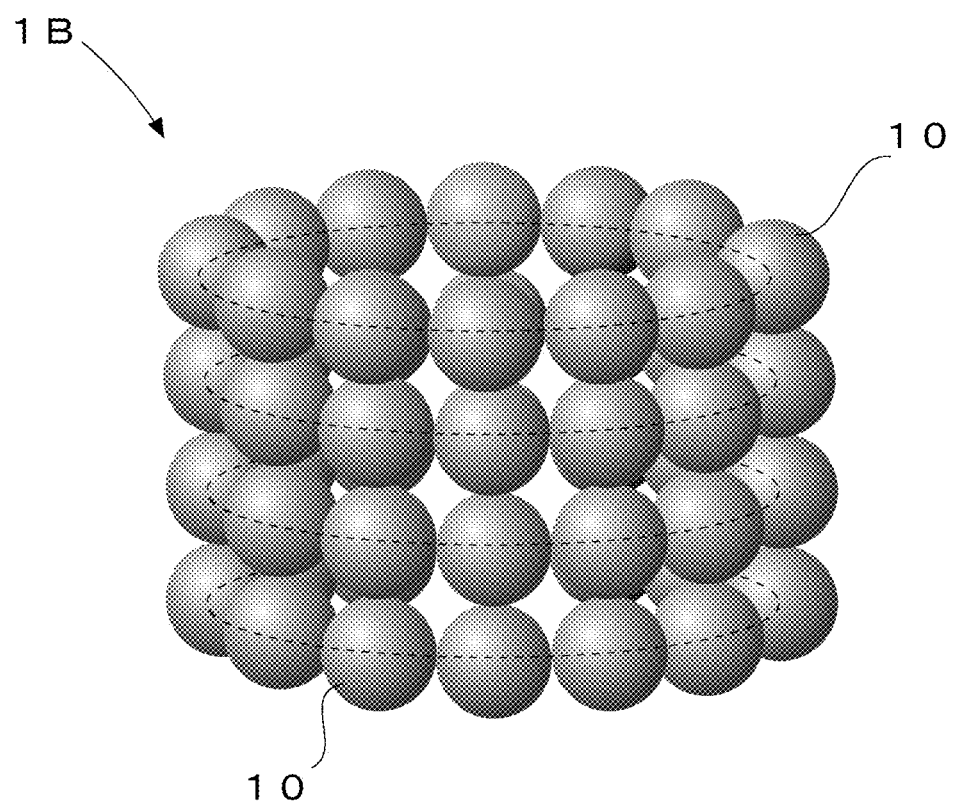
FIG. 29 is a schematic diagram showing a modified example of the display device.

Moreover, as shown in FIG. 29, the shape of the display device may be a display device 1B having a cylindrical surface shape. In this case, the ball lens 10 is arranged in a cylindrical surface shape. Even with the sight line of a tall person, the sight line of a short person, the image can be seen.

The display device 1B may have a half cylindrical shape or a part of its shape instead of a perfect cylindrical shape.

(Second Example of Display Device)

Next, an example in which a round column lens is arranged in a cylindrical surface shape will be described with reference to FIGS. 30, 31, 32 and 33.

Figure 30:
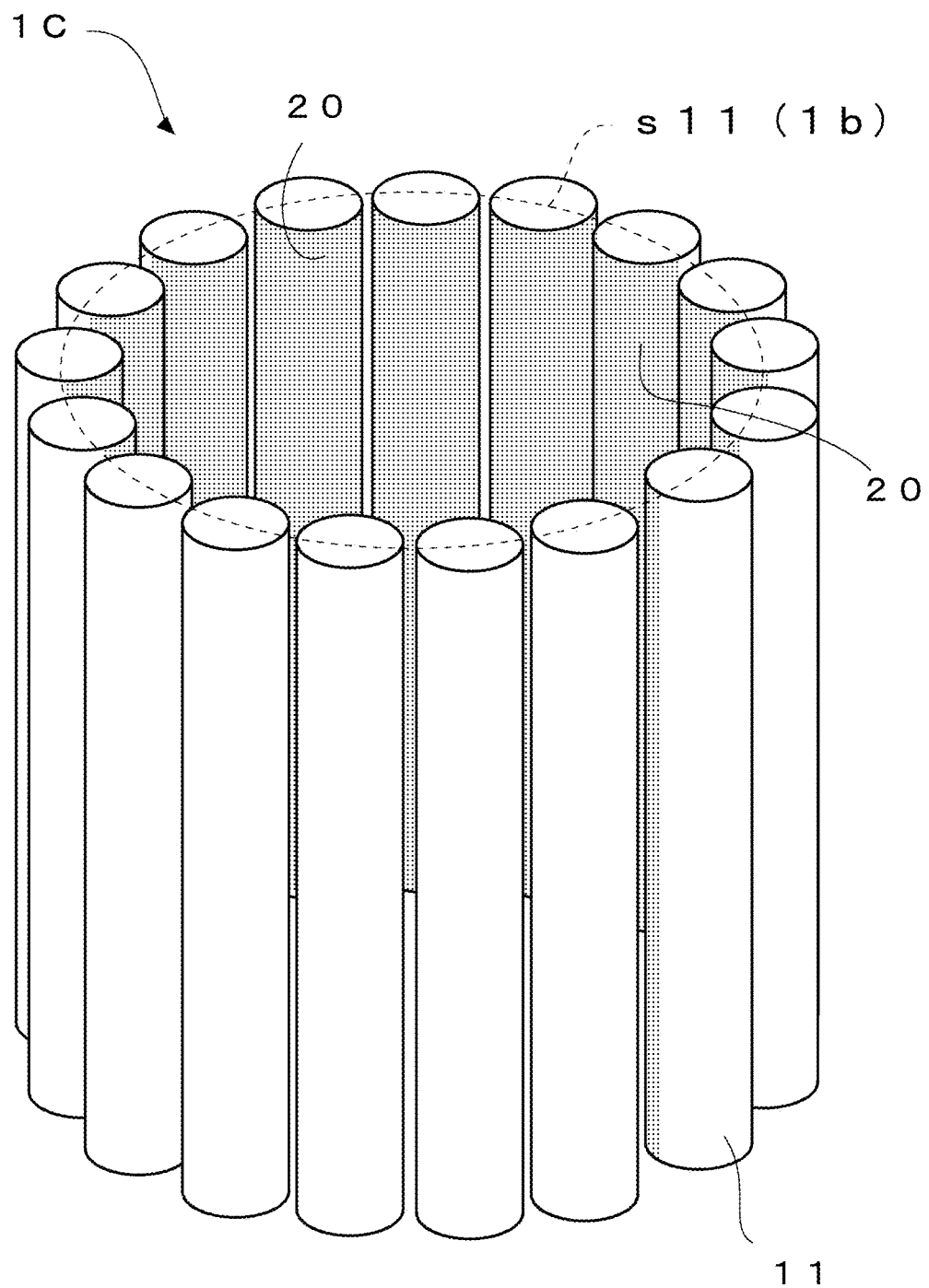
FIG. 30 is a schematic diagram showing an example of arrangements of round column lens in the second example of the display device.

As shown in FIG. 30, in the display device 1C, the round column lens 11 having the same long axis direction may be arranged in a cylindrical surface shape. The cylindrical surface s11 (1*b*) is formed by each round column lens 11.

Figure 31:
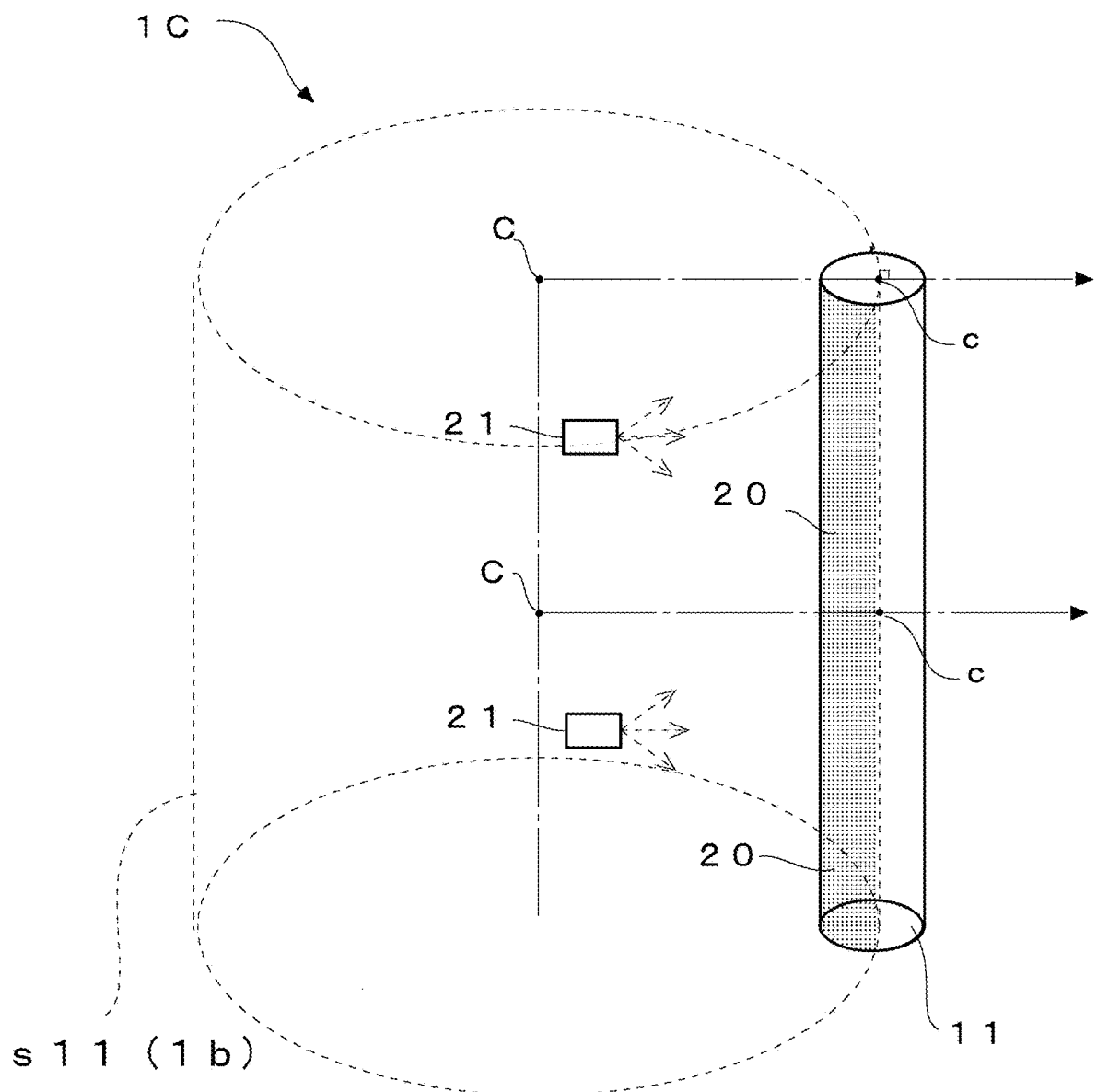
FIG. 31 is a schematic diagram showing an example of arrangements of round column lens in the second example of the display device.

As shown in FIG. 30 and FIG. 31, on one side of the round column lens 11, an image display means 20 having a half cylindrical shape is formed as a screen surface. The image display means 20 having a half cylindrical surface shape is provided in each round column lens 11 of the display device 1C.

As shown in FIG. 31, the direction of the image display means 20 having a half cylindrical surface shape is the normal direction of the cylindrical surface s11 (1*b*) of the display device 1C. That is, on the line connecting the center c of the round column lens 11 and the center C of the cylindrical surface s11, there is the central part of the image display means 20.

Herein, the arrangement support means 1*b* arranges the respective refraction means 1*a* so that the sectional shapes of the respective refraction means 1*a* from the viewpoint become the same shape.

Incidentally, the display device 1C may have a half cylindrical shape or a part of its shape instead of a perfect cylindrical shape.

As shown in FIG. 31, inside the display device 1C, a projector which is an example of the image projection means 21 is installed. A projection image is projected onto the projection surface of the image display means 20 by projection light from the image projection means 21, the projection image is displayed out on the back surface of the image projection means 20, and a formed-image is formed on the opposite side surface to the viewpoint of the round column lens 11.

Figure 32:
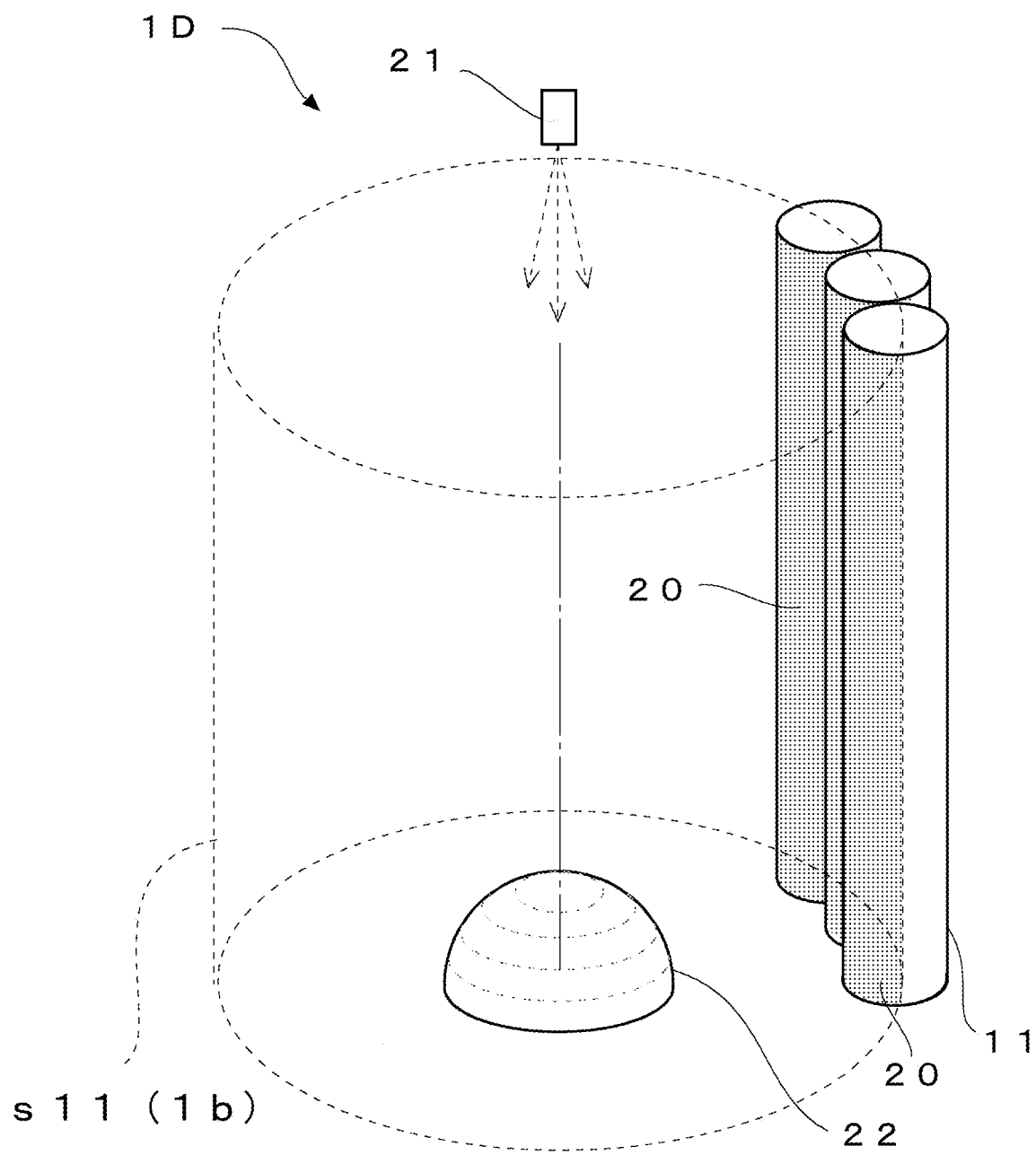
FIG. 32 is a schematic diagram showing an example of reflection means in the display device.

As shown in FIG. 32, the display device 1D may include reflection means 22 (an example of image forming means) such as a reflecting mirror. The reflection means 22 may be a metal-polished surface, a metal-plated surface, a vapor deposited surface, a surface to which a metal foil is attached, a surface having a light reflection effect like a mirror, or a refraction means for refracting light to an optical path similar to the light reflection effect.

The image projection means 21 may not be provided inside the display device 1D. As shown in FIG. 24, the reflection means 22 may be spherical of convex shape with respect to the image projection means 21. The reflection means 22 may have a shape of concave surface other than the axis toward the image projection means 21. The reflection means 22 may be a hemisphere, a cone-shape, a truncated cone, a polygonal pyramid shape such as a triangular pyramid shape, a quadrangular pyramid shape, etc., a polygonal truncated pyramid, parabola or hyperbolic, a shape obtained by combining two or more of these shapes, or a mirror-like shape at 360 degree shooting; It may be a shape that can reflect the projection light from the image projection means 21 and project the image on the projection surface of the image display means 20.

The projecting light may be projected from a plurality of directions by the reflection means, and the image may be projected on the projection surface of the image display means 20. Alternatively, a part of the projection light from the image display means 20 may be reflected by the reflection means (which may be plural) and projected on another projection surface of the image display means 20 from another angle.

The projection light projected from the image projection means 21 is reflected by the reflection means 22 and then projected on the image display means 20 to form the formed-image on the opposite side surface to the viewpoint of the round column lens 11. Incidentally, the control device 50 generates the projection image in consideration of the shape of the reflecting surface of the reflection means 22 so that the formed-image in each refraction means can be formed.

Since the image projection means 21 may not be installed inside the display device 1D, the display device 1D can be reduced in size. Since the image projection means 21 may not be installed inside the display device 1D, it may not be the compact image projection means 21. Moreover, since the image projection means 21 may not be provided from the beginning, the display device 1D can install the image projection means 21 in a later attachment, making it easy to replace.

In the case that the reflection means 22 for reflecting the projection light outputted from the image projection means 21 and projecting the reflected projection light onto the projection surface of the image display means 20 is further provided, apart from optical systems such as refractive means and image display means, since the projection system such as the image projection means etc. can be attached to the display device 1 later, these systems can be separately maintained. In addition, it is not necessary to install the image projecting means such as a projector inside the display device 1 (inside the arrangement support means 1b), so that the display device 1 can be downsized. When projecting the projection light from one image display means 20 onto the reflection means 1e and projecting it from the reflection means 22 onto the respective refraction means 1a in each direction, like the projection by the plurality of image display means 20, it is not necessary to consider the adjustment of the seam between projection images, and it is easy to generate the formed-image of the refraction means 1a.

Figure 33:
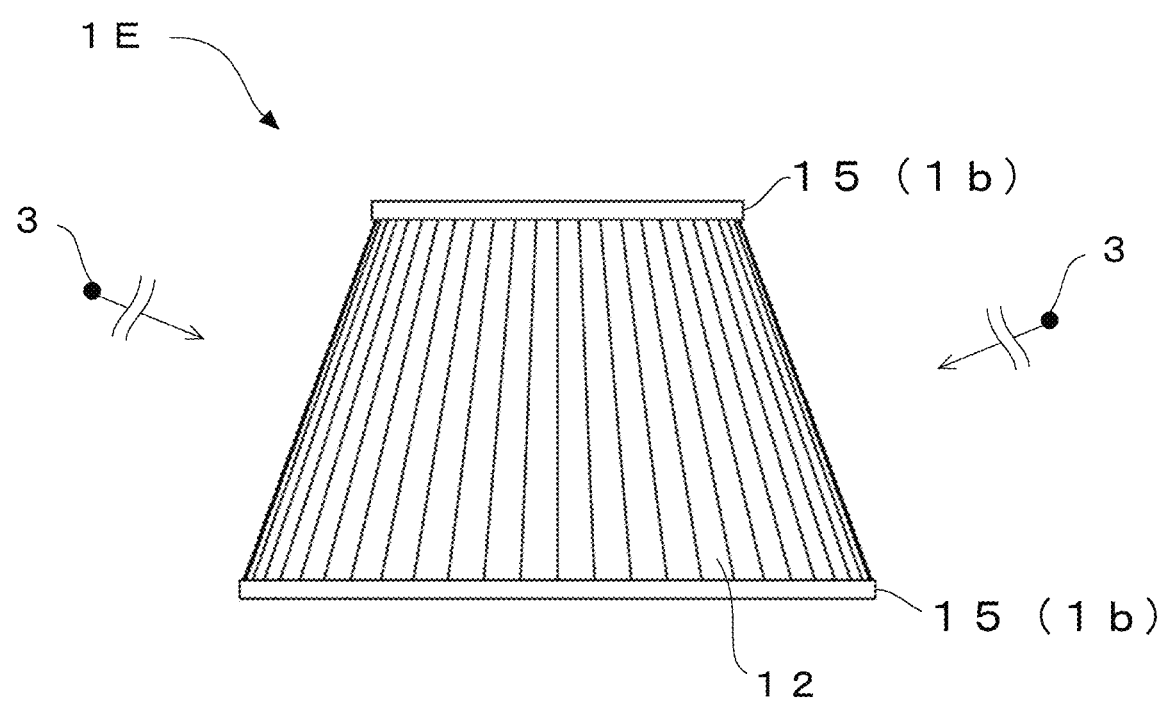
FIG. 33 is a schematic diagram showing a modified example of the display device.

As shown in FIG. 33, the display device 1E may have a truncated conical shape. A plurality of truncated cone lens 12 are arranged on the curved surface of the side surface of the truncated cone by the support base 15 as an example of the arrangement support means 1b. As shown in FIG. 33, it can be installed at a position looking down on the display device 1E from the upper viewpoint 3. In the case of the display device in which the display device 1E as shown in FIG. 15 is turned upside down in the drawing, the display device 1E can be installed at a position to look up the display device 1E from the lower viewpoint 3.

Incidentally, the image display means 20 may be a reflection type screen instead of a transmission type screen. In this case, the small image projection means 21 is installed between the image display means 20 and the refraction means 1a. Moreover, a transmission type screen and a reflection type screen may be combined.

Projection light such that a projection image is formed directly on the refraction means 1a may be projected from the image projection means 21 or the reflection means 22, instead of providing the image display means 20 on the entire surface of the surface of opposite side to the viewpoint of the refraction means 1a.

Example 2

Next, a display system using display means which is an example of image forming means will be described with reference to FIG. 34A to FIG. 34C. The present example is an example using the display means instead of the image display means 20 and the image projection means 21 of the example 1.

Figure 34A:
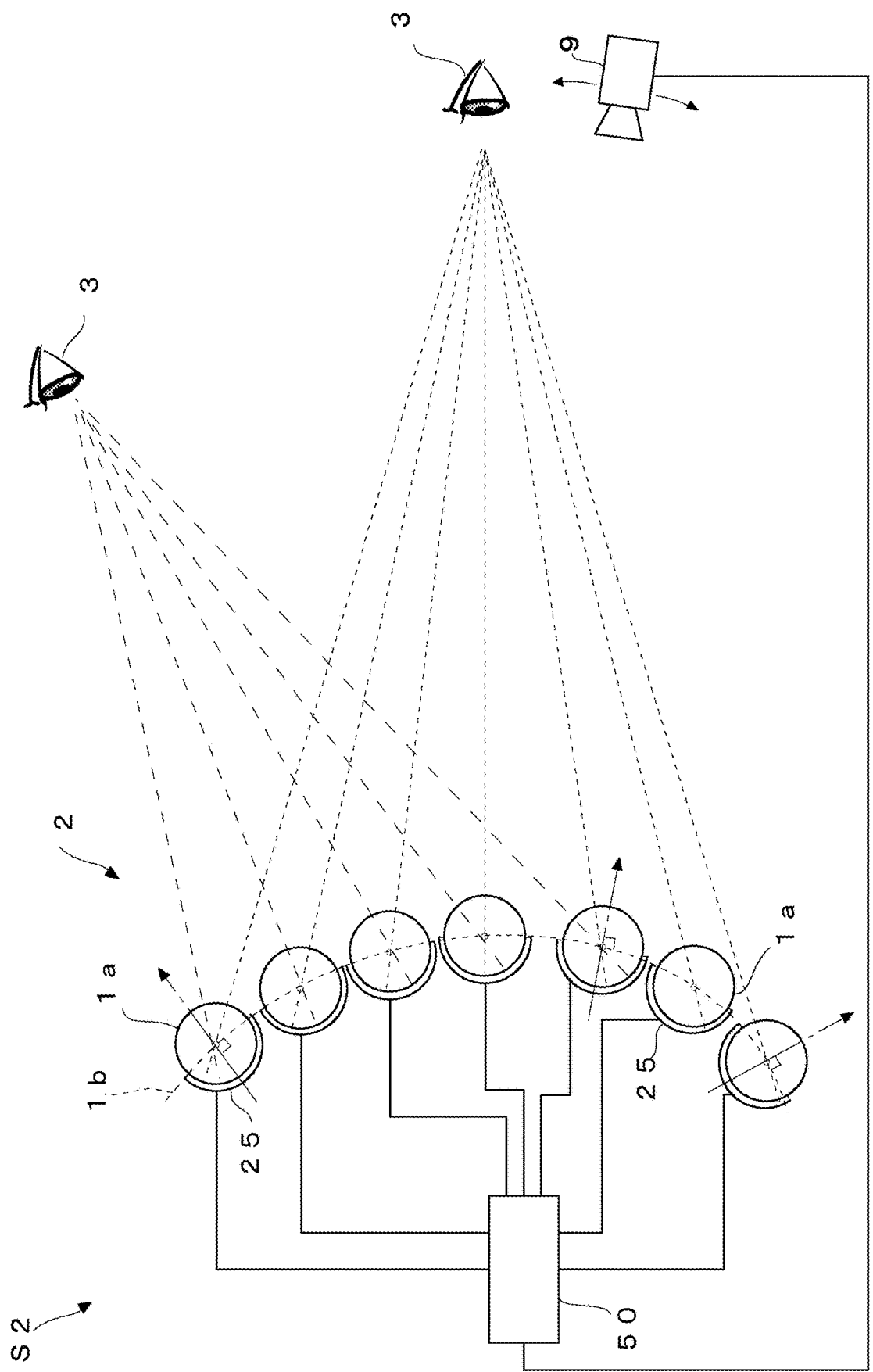
FIG. 34A is a schematic diagram schematically showing an example configuration of a display system of the second example.

As shown in FIG. 34A, the display system S2 of the present example includes a display device 2, a control device 50, and a photographing device 9. The display device 2 of the present example includes a refraction means 1a, an arrangement support means 1b, a display means 25 (an example of an image forming means) installed on the opposite side surface to the viewpoint 3 side with respect to each refraction means 1a.

The display means 25 is, for example, a display such as a liquid crystal display or an organic EL display. The display means 25 forms the formed-image in the refraction means 1a by displaying the image on the refraction means 1a.

Figure 34B:
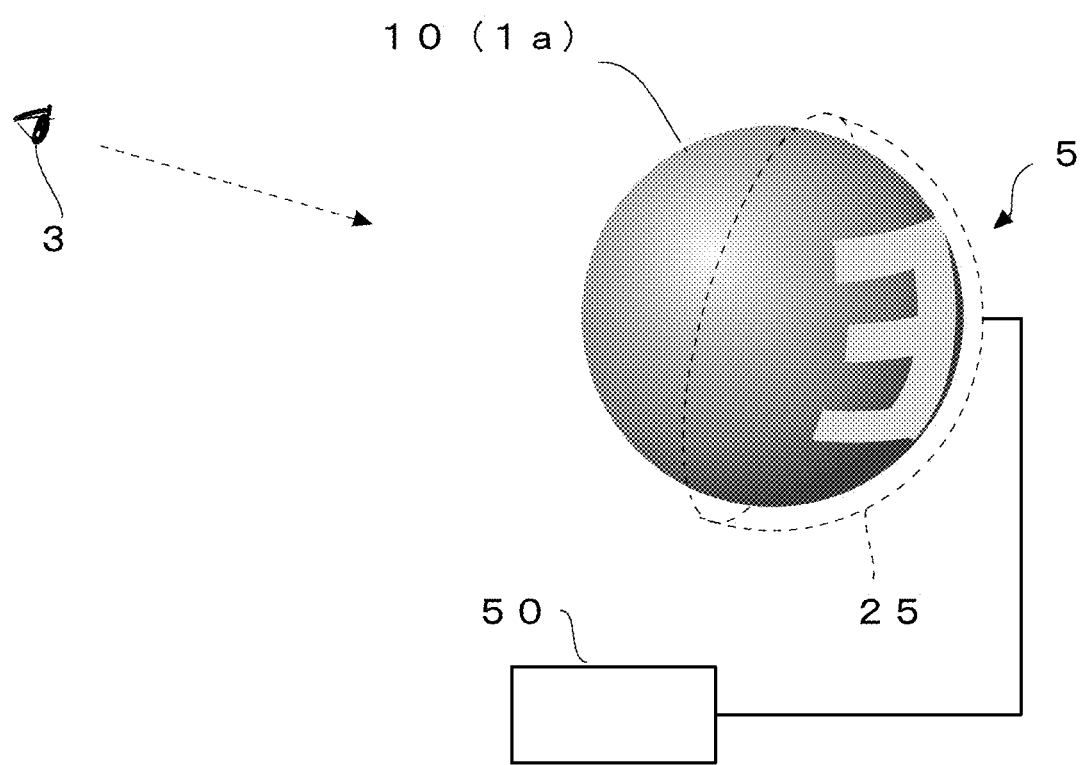
FIG. 34B is a schematic diagram showing an example of the refraction means in FIG. 34A.

As shown in FIG. 34B, the display means 25 is installed so as to cover the half-surface of the refraction means 1a made of a transparent material. The display means 25 is connected to the control device 50. Each refraction means 1a in FIG. 34A shows a cross section in the case that the transparent ball lens 10 is covered with a hemispherical display 25. Incidentally, it may be a cross section in case that the round column lens is covered with display means having a half cylindrical surface shape.

As shown in FIG. 34A, each display means 25 is connected to the control device 50. The control device 50 transmits the formed-image data to each display means 25. Each display means 25 displays the formed-image 5 based on the formed-image data. According to the viewing direction, the display element images are seen on each refraction means 1a by each display means 25, a display synthetic image depending on the viewpoint direction is displayed on the display device 2.

The control device 50 acquires the image data of the photographed image of the display c synthetic image of the display device 2 from the photographing device 9 and adjusts the image.

Figure 34C:
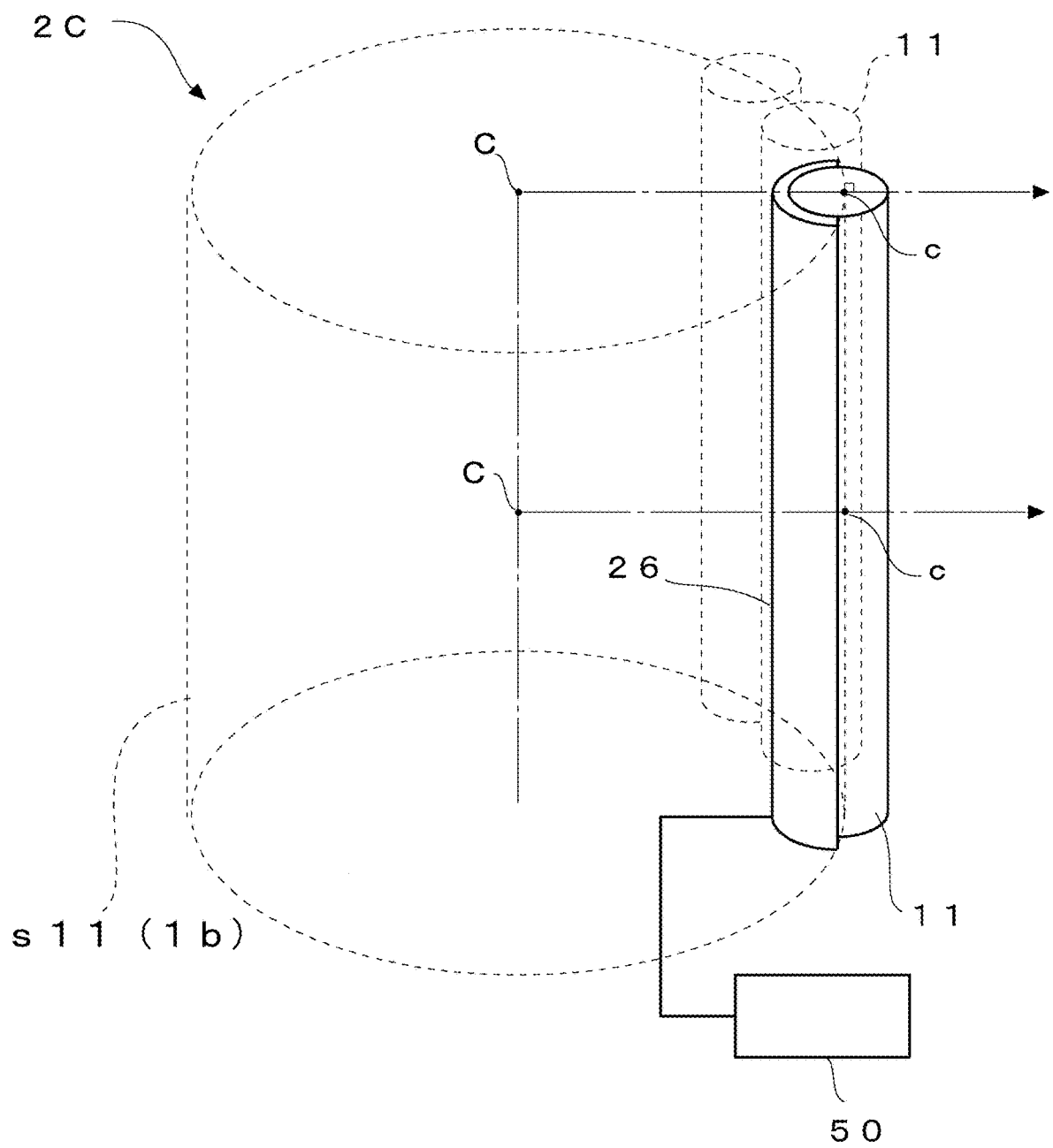
FIG. 34C is a modified example of the image forming means in the second example of the display device.

As shown in FIG. 34C, in the display device 2C, the round column lens 11 in the same direction covered by the display 26 (an example of the display means 25) having a half cylindrical surface shape on the opposite side to the viewpoint side is arranged in a cylindrical surface shape. In place of the image display means 20 in FIG. 31, a display 26 having a half cylindrical surface shape is installed. The cylindrical surface s11 (1b) is formed by each round column lens 11.

The portion of the center line in the axial direction of the round column lens 11 in the axial direction is a portion (the central part of the display 26) which is the center of the image. As shown in FIG. 34C, the direction of the display 26 is the normal direction to the cylindrical surface s11 (1b) of the display device 2C. That is, the central part of the display 26 is on the line connecting the center c of the round column lens 11 and the center C of the cylindrical surface s11.

Even in the display system S2, the same effect as in the example 1 can be obtained except for the special effect caused by the image display means 20 and the image projection means 21.

In addition, the present invention is not limited to the above embodiments. The above embodiments are merely examples. Any other embodiment that has essentially the same configuration and produces a similar effect as the technical ideas described in the claims of the present invention falls within the scope of the invention.

EXPLANATION OF REFERENCE NUMERALS 1, 1A, 1B, 1C, 1D, 1E, 2, 2C, DD: DISPLAY DEVICE
1a: REFRACTION MEANS
1b: ARRANGEMENT SUPPORT MEANS
1c: IMAGE FORMING MEANS
3: VIEWPOINT
5: FORMED-IMAGE
8: INFORMATION PROCESSING DEVICE
9: PHOTOGRAPHING DEVICE (PHOTOGRAPHING MEANS)
10: BALL LENS (REFRACTION MEANS)
11: ROUND COLUMN LENS (REFRACTION MEANS)
12: TRUNCATED CONE LENS (REFRACTION MEANS)
20: IMAGE DISPLAY MEANS (IMAGE FORMING MEANS)
21: IMAGE PROJECTION MEANS (IMAGE FORMING MEANS)
22: REFLECTION MEANS (IMAGE FORMING MEANS)
25: DISPLAY MEANS (IMAGE FORMING MEANS)
26: DISPLAY (IMAGE FORMING MEANS)
50: CONTROL DEVICE (INFORMATION PROCESSING DEVICE)
S, S1, S2: DISPLAY SYSTEM
Op: PLANE IMAGE
d1, d2, de, dc, da: REGION IMAGE

The invention claimed is:

1. An information processing device for a display device, in which the display device includes a refraction unit for refracting light and having a circle-shaped cross section; an arrangement support unit for arranging and supporting a plurality of the refraction unit in a convex shape with respect to a viewpoint side; and an image forming unit for forming a formed-image on an opposite side surface to the viewpoint side with respect to the refraction unit, the information processing device for the display device comprising:
an extracting unit for extracting an image data of a display element image displayed on each of the refraction unit so as to look like three-dimensional spatial representation, from a three-dimensional spatial representation data for three-dimensional-spatially representing a display target in the display device; and
an image generating unit for generating a formed-image data for forming the formed-image in the opposite side to the viewpoint side of the predetermined refraction unit so that the display element image can be displayed by a light having passed through the predetermined refraction unit; wherein
the three-dimensional spatial representation data includes an angle data of an angle defined by a normal direction of the convex shape in the predetermined refraction unit and a predetermined viewpoint direction of the viewpoint side, and a plane image data in which the display target can be seen from the predetermined viewpoint direction depending on the angle.

2. The information processing device for the display device according to claim 1, wherein
the extracting unit extracts, as a region image data, each region image corresponding to each of the predetermined refraction unit from the plane image data among the three-dimensional spatial representation data,
the image generating unit transforms each of the region image so as to conform to the shape of the opposite side surface of the predetermined refraction unit, arranges each of the transformed region image at a position depending on the angle corresponding to each of the region image, and generates the formed-image data for forming the formed-image of the predetermined refraction unit.

3. The information processing device for the display device according to claim 1, wherein
the extracting unit extracts the image data of the display element image depending on the size of the refraction unit.

4. The information processing device for the display device according to claim 1, further comprising:
an original data generating unit for generating the three-dimensional spatial representation data for representing a three-dimensional space in the display device from a solid object in real space or a 3DCG data.

5. The information processing device for the display device according to claim 1, further comprising:
an image acquiring unit for acquiring an image data of a photographed image obtained by photographing the three-dimensional spatial representation displayed by the generated formed-image data from a predetermined photographing direction; and
an image adjusting unit for adjusting the formed-image data in accordance with difference between data of the photographed image and the photographing direction, and the angle data and the plane image data of the three-dimensional spatial representation.

6. The information processing device for the display device according to claim 5, wherein
the image adjusting unit adjusts the formed-image data by adjusting the image data of the display element image extracted by the extracting unit.

7. The information processing device for the display device according to claim 5, wherein
the image adjusting unit adjusts the formed-image data by adjusting a forming manner in the formed-image.

8. The information processing device for the display device according to claim 1, wherein
the image forming unit forms the formed-image from an image printed based on the formed-image data.

9. An information processing method for a display device, in which the display device includes a refraction unit for refracting light and having a circle-shaped cross section; an arrangement support unit for arranging and supporting a plurality of the refraction unit in a convex shape with respect to a viewpoint side; and an image forming unit for forming a formed-image on an opposite side surface to the viewpoint side with respect to the refraction unit, the information processing method comprising:
an extracting step of extracting an image data of a display element image displayed on each of the refraction unit so as to look like three-dimensional spatial representation, from a three-dimensional spatial representation data for three-dimensional-spatially representing a display target in the display device; and
an image generating step of generating a formed-image data for forming the formed-image in the opposite side to the viewpoint side of the predetermined refraction unit so that the display element image can be displayed by a light having passed through the predetermined refraction unit; wherein the three-dimensional spatial representation data includes an angle data of an angle defined by a normal direction of the convex shape in the predetermined refraction unit and a predetermined viewpoint direction of the viewpoint side, and a plane image data in which the display target can be seen from the predetermined viewpoint direction depending on the angle.

10. A program stored on a non-transitory computer readable medium for a display device, in which the display device includes a refraction unit for refracting light and having a circle-shaped cross section; an arrangement support unit for arranging and supporting a plurality of the refraction unit a convex shape with respect to a viewpoint side; and an image forming unit for forming a formed-image on an opposite side surface to the viewpoint side with respect to the refraction unit, the program causing a computer to function as:

an extracting unit for extracting an image data of a display element image displayed on each of the refraction unit so as to look like three-dimensional spatial representation, from a three-dimensional spatial representation data for three-dimensional-spatially representing a display target in the display device; and an image generating unit for generating a formed-image data for forming the formed-image in the opposite side to the viewpoint side of the predetermined refraction unit so that the display element image can be displayed by a light having passed through the predetermined refraction unit;

wherein the three-dimensional spatial representation data includes an angle data of an angle defined by a normal direction of the convex shape in the predetermined refraction unit and a predetermined viewpoint direction of the viewpoint side, and a plane Image data in which the display target can be seen from the predetermined viewpoint direction depending on the angle.

* * * * *